(12) United States Patent
Yasui et al.

(10) Patent No.: US 7,337,772 B2
(45) Date of Patent: Mar. 4, 2008

(54) APPARATUS FOR AND METHOD OF CONTROLLING TEMPERATURE OF EXHAUST GAS SENSOR, AND RECORDING MEDIUM STORING PROGRAM FOR CONTROLLING TEMPERATURE OF EXHAUST GAS SENSOR

(75) Inventors: Yuji Yasui, Wako (JP); Yoshihisa Iwaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 912 days.

(21) Appl. No.: 10/770,376

(22) Filed: Feb. 3, 2004

(65) Prior Publication Data

US 2004/0252625 A1 Dec. 16, 2004

Related U.S. Application Data

(62) Division of application No. 10/401,892, filed on Mar. 31, 2003, now Pat. No. 6,823,839.

(30) Foreign Application Priority Data

Mar. 29, 2002 (JP) ............................... 2002-96299

(51) Int. Cl.
*F02D 41/00* (2006.01)
*B60T 7/12* (2006.01)
(52) U.S. Cl. ...................... 123/697; 123/672; 123/676; 701/114
(58) Field of Classification Search .......... 123/339.12, 123/339.14, 339.24, 672, 674, 676, 679, 123/687, 697
See application file for complete search history.

(56) References Cited

U.S. PATENT DOCUMENTS 4,147,513 A * 4/1979 Bienkowski et al. ....... 436/174

(Continued)

FOREIGN PATENT DOCUMENTS

JP 60-235050 11/1985

(Continued)

*Primary Examiner*—John T. Kwon
(74) *Attorney, Agent, or Firm*—Squire, Sanders & Dempsey L.L.P.

(57) ABSTRACT

The temperature of an exhaust gas flowing through an exhaust passage 3 is estimated or detected, and the temperature of an active element of an exhaust gas sensor 8. ($O_2$ sensor) is controlled at a predetermined target temperature by a heater using the estimated or detected temperature of the exhaust gas. For estimating the temperature of the exhaust gas in the vicinity of the exhaust gas sensor 8, the exhaust passage 3 extending up to the exhaust gas sensor 8 is divided into a plurality of partial exhaust passageways $3a$ through $3d$, the temperatures of the exhaust gas in the partial exhaust passageways $3a$ through $3d$ are estimated successively from an exhaust port 2 of an engine 1. The temperature of the exhaust gas is estimated according to an algorithm which takes into account a heat transfer between the exhaust gas and passage-defining members $6a$, $6b$, 7 which define the exhaust passage 3 and a heat radiation from the passage-defining members into the atmosphere. A control input that is applied to the heater includes at least a component depending on the temperature of the active element of the exhaust gas sensor 8 and a component depending on the temperature of the exhaust gas. Even if the temperature of the exhaust gas changes, the temperature of the active element of the exhaust gas sensor 8 can be controlled stably at the desired temperature.

64 Claims, 17 Drawing Sheets

U.S. PATENT DOCUMENTS

| | | | |
|---|---|---|---|
| 4,755,374 A | * | 7/1988 | Martin et al. ............... 204/427 |
| 5,083,427 A | * | 1/1992 | Anderson .................... 60/274 |
| 5,239,965 A | * | 8/1993 | Ninomiya ................... 123/492 |
| 5,544,639 A | * | 8/1996 | Shouda et al. .............. 123/676 |
| 5,746,053 A | * | 5/1998 | Hibino ........................ 60/277 |
| 5,836,292 A | * | 11/1998 | Aoki .......................... 123/697 |
| 6,254,749 B1 | * | 7/2001 | Yokota et al. .............. 204/424 |
| 6,679,238 B2 | * | 1/2004 | Nebiyeloul-Kifle et al. 123/676 |
| 2003/0178016 A1 | * | 9/2003 | Nebiyeloul-Kifle et al. 123/676 |

FOREIGN PATENT DOCUMENTS

| | | |
|---|---|---|
| JP | 2000-304721 | 11/2000 |

* cited by examiner

APPARATUS FOR AND METHOD OF CONTROLLING TEMPERATURE OF EXHAUST GAS SENSOR, AND RECORDING MEDIUM STORING PROGRAM FOR CONTROLLING TEMPERATURE OF EXHAUST GAS SENSOR

This is a Division of application Ser. No. 10/401,892 filed Mar. 31, 2003 now U.S. Pat. No. 6,823,839. The disclosure of the prior application(s) is hereby incorporated by reference herein in its entirety.

BACKGROUND OF THE INVENTION

1. Field of the Invention

The present invention relates to an apparatus for and a method of controlling the temperature of an exhaust gas sensor disposed in the exhaust passage of an internal combustion engine, and a recording medium storing a program for controlling the temperature of such an exhaust gas sensor.

2. Description of the Related Art

Exhaust gas sensors are often disposed in the exhaust passages of internal combustion engines for detecting a physical quantity as to an exhaust gas component state, such as an exhaust gas component concentration, for the purpose of controlling the operation of the internal combustion engine or monitoring the status of an exhaust gas purifying system. Specifically, an exhaust gas sensor is disposed at a certain location in the exhaust gas passage and has an element sensitive to an exhaust gas component state to be detected, the element being positioned for contact with an exhaust gas flowing through the exhaust passage. For example, an air-fuel ratio sensor such as an $O_2$ sensor or the like is disposed as an exhaust gas sensor upstream or downstream of an exhaust gas purifying catalyst disposed in the exhaust passage for the purpose of controlling the air-fuel ratio of the internal combustion engine in order to keep well the purifying ability of the catalyst.

Some air-fuel ratio sensors have a built-in heater for heating the active element thereof for increasing the temperature of the element and activating the element to enable the element to perform its essential functions and also removing foreign matter deposited on the element. For example, an air-fuel ratio sensor such as an $O_2$ sensor or the like usually has an electric heater for heating the active element thereof. After the internal combustion engine has started to operate, the electric heater is energized to increase the temperature of the active element of the $O_2$ sensor to activate the active element and keep the active element active.

As shown in FIG. 3 of the accompanying drawings, the $O_2$ sensor produces an output voltage Vout which changes with a large gradient with respect to a change in the air-fuel ratio of an exhaust gas, i.e., which is highly sensitive to a change in the air-fuel ratio, only in a small range $\Delta$ (near a stoichiometric air-fuel ratio) of values of the air-fuel ratio that is represented by an oxygen concentration in the exhaust gas to which the active element is sensitive. A change in the output voltage Vout of the $O_2$ sensor, i.e., a gradient of the output voltage Vout with respect to the air-fuel ratio, is smaller in air-fuel ratio ranges that are richer and leaner than the highly sensitive range $\Delta$. The output characteristics of the $O_2$ sensor, i.e., the gradient of the highly sensitive range $\Delta$, etc., vary depending on the temperature of the active element. When the air-fuel ratio is to be controlled using the output voltage from the $O_2$ sensor, therefore, it is desirable to keep the output characteristics of the $O_2$ sensor in a desired range as much as possible and hence to keep the temperature of the active element of the $O_2$ sensor in a desired temperature range as stably as possible for better air-fuel ratio control.

Not only $O_2$ sensors but also Many exhaust gas sensors have their output characteristics affected by the temperature of the active element. If the internal combustion engine is to be controlled using the output signal from the $O_2$ sensor, then it is preferable to keep the temperature of the active element of the exhaust gas sensor in a desired temperature range as stably as possible for better engine control. When the active element of the exhaust gas sensor is heated to clean the active element, it is also preferable to keep the temperature of the active element of the exhaust gas sensor in a desired temperature range for a better cleaning effect.

As disclosed in Japanese laid-open patent publication No. 2000-304721 by the applicant of the present application, it is known to estimate the temperature of the active element of an exhaust gas sensor (an air-fuel ratio sensor in the publication) and control the energization of a heater (an electric heater) based on the estimated temperature for thereby keep the temperature of the active element in a desired temperature range to obtain appropriate output characteristics from the exhaust gas sensor. According to the disclosed arrangement, the resistance of the heater is recognized from detected values of a current flowing through the heater and a voltage applied across the heater, and the temperature of the active element is estimated based on the detected resistance of the heater.

The heater is controlled based on only the estimated temperature of the active element. Consequently, when the operating state of an internal combustion engine changes frequently and hence the temperature of the exhaust gas emitted therefrom changes frequently, it is difficult to keep the temperature of the active element in a desired temperature range stably and reliably. This drawback occurs also if the temperature of the active element is detected by a temperature sensor and the heater is controlled based on the detected temperature.

SUMMARY OF THE INVENTION

It is therefore an object of the present invention to provide an apparatus for and a method of controlling the temperature of the active element of an exhaust gas sensor stably in a desired temperature range even if the temperature of an exhaust gas changes.

Another object of the present invention is to provide a recording medium storing a temperature control program controlling the temperature of the active element of an exhaust gas sensor stably in a desired temperature range even if the temperature of an exhaust gas changes.

To achieve the above objects, there is provided in accordance with a first aspect of the present invention an apparatus for controlling the temperature of an exhaust gas sensor disposed in an exhaust passage of an internal combustion engine and having an active element for contacting an exhaust gas flowing through the exhaust passage and a heater for heating the active element, the apparatus comprising exhaust gas temperature estimating means for sequentially estimating the temperature of the exhaust gas flowing through the exhaust passage, using at least a parameter representative of an operating state of the internal combustion engine, and heater control means for controlling the heater to equalize the temperature of the active element of the exhaust gas sensor with a predetermined target temperature, using an estimated value of the temperature of the exhaust gas from the exhaust gas temperature estimating means.

Similarly, there is also provided in accordance with the first aspect of the present invention a method of controlling the temperature of an exhaust gas sensor disposed in an exhaust passage of an internal combustion engine and having an active element for contacting an exhaust gas flowing through the exhaust passage and a heater for heating the active element, the method comprising the steps of sequentially estimating the temperature of the exhaust gas flowing through the exhaust passage, using at least a parameter representative of an operating state of the internal combustion engine, and controlling the heater to equalize the temperature of the active element of the exhaust gas sensor with a predetermined target temperature, using an estimated value of the temperature of the exhaust gas.

There is also provided in accordance with the first aspect of the present invention a recording medium readable by a computer and storing a temperature control program for being executed by the computer for controlling the temperature of an exhaust gas sensor disposed in an exhaust passage of an internal combustion engine and having an active element for contacting an exhaust gas flowing through the exhaust passage and a heater for heating the active element, the temperature control program comprising an exhaust gas temperature estimating program for enabling the computer to carry out a process of sequentially estimating the temperature of the exhaust gas flowing through the exhaust passage, using at least a parameter representative of an operating state of the internal combustion engine, and a heater control program for enabling the computer to carry out a process of controlling the heater to equalize the temperature of the active element of the exhaust gas sensor with a predetermined target temperature, using an estimated value of the temperature of the exhaust gas.

According to the first aspect of the present invention, since the temperature of the exhaust gas is estimated using the parameter representative of the operating state of the internal combustion engine, which is mainly responsible for a change in the temperature of the exhaust gas, the temperature of the exhaust gas can be estimated appropriately. As the heater control means controls the heater of the exhaust gas sensor using the estimated value of the temperature of the exhaust gas, the temperature of the active element of the exhaust gas sensor can be controlled stably at a predetermined target temperature (desired temperature) while reducing the effect of a change in the temperature of the exhaust gas.

With the apparatus according to the first aspect, the heater control means should preferably sequentially acquire data representative of the temperature of the active element of the exhaust gas sensor, sequentially calculate a control input for the heater by adding at least a control input component depending on the temperature of the active element of the exhaust gas sensor and a control input component depending on the estimated value of the temperature of the exhaust gas from the exhaust gas temperature estimating means, and control the heater depending on the calculated control input.

Likewise, with the method according to the first aspect, the step of sequentially estimating the temperature of the exhaust gas should preferably comprise the steps of sequentially estimating the temperature of the exhaust gas in the vicinity of an exhaust port of the internal combustion engine based on the parameter representative of the operating state of the internal combustion engine, and estimating the temperature of the exhaust gas in the vicinity of the location of the exhaust gas sensor, using at least an estimated value of the temperature of the exhaust gas in the vicinity of the exhaust port and data representative of the speed of the exhaust gas.

With the recording medium according to the first aspect, the computer control program should preferably comprise a program for enabling the computer to carry out a process of sequentially acquiring data representative of the temperature of the active element of the exhaust gas sensor, sequentially calculating a control input for the heater by adding at least a control input component depending on the temperature of the active element of the exhaust gas sensor and a control input component depending on the estimated value of the temperature of the exhaust gas, and controlling the heater depending on the calculated control input.

By thus calculating the control input so as to include a control input component depending on the temperature of the active element of the exhaust gas sensor, i.e., a feedback component, and a control input component depending on the estimated or detected value of the temperature of the exhaust gas, i.e., a feed-forward component depending on the temperature of the exhaust gas, it is possible to control the temperature of the active element of the exhaust gas sensor stably at the target temperature. Since the control input for the heater includes a feed-forward component depending on the temperature of the exhaust gas, the effect of a change in the temperature of the exhaust gas can be compensated for to stabilize the temperature of the active element.

While the data representative of the temperature of the active element may be data directly detected by a temperature sensor attached to the active element, i.e., a detected value of the temperature of the active element, the temperature of the active element may be estimated according to a suitable algorithm which takes into account a heat transfer between the heater and the active element, a heat transfer between the active element and the exhaust gas, etc., and the estimated value may be used as the data representative of the temperature of the active element. The control input may also include, in addition to the above control input components, a component depending on the temperature of the heater and a component depending on the target temperature for the active element. The control input component depending on the temperature of the active element may be a control input component depending on the difference between the temperature of the active element and the target temperature.

With the apparatus according to the first aspect, the temperature of the exhaust gas which is estimated by the exhaust gas temperature estimating means should preferably include at least the temperature of the exhaust gas in the vicinity of the location of the exhaust gas sensor, and the heater control means should preferably use the estimated value of the temperature of the exhaust gas in the vicinity of the location of the exhaust gas sensor in order to control the heater.

Likewise, with the method according to the first aspect, the temperature of the exhaust gas which is estimated should preferably include at least the temperature of the exhaust gas in the vicinity of the location of the exhaust gas sensor, and the estimated value of the temperature of the exhaust gas in the vicinity of the location of the exhaust gas sensor should preferably be used in order to control the heater.

With the recording medium according to the first aspect, the temperature of the exhaust gas which is estimated should preferably include at least the temperature of the exhaust gas in the vicinity of the location of the exhaust gas sensor, and the heater control program should preferably comprise a program for enabling the computer to carry out a process of using the estimated value of the temperature of the exhaust gas in the vicinity of the location of the exhaust gas sensor in order to control the heater.

According to the present invention as described above, the temperature of the exhaust gas in the vicinity of the location of the exhaust gas sensor., i.e., the temperature of the exhaust gas which directly affects the temperature of the active element of the exhaust gas sensor, is sequentially estimated. By using the estimated value for the control of the heater, it is possible to control the temperature of the active element of the exhaust gas sensor more stably at the target temperature.

The inventors' knowledge shows that the temperature of the exhaust gas in the vicinity of the exhaust port of the internal combustion engine, i.e., the temperature of the exhaust gas in the vicinity of the inlet of the exhaust passage, is closely correlated to the operating state of the internal combustion engine. It is therefore possible to estimate the temperature of the exhaust gas in the vicinity of the exhaust port with relatively high accuracy based on the parameter representative of the operating state of the internal combustion engine.

The exhaust gas sensor is often located in a position that is spaced a certain distance downstream from the exhaust port of the internal combustion engine. At each point of time, the exhaust gas present in the exhaust port reaches the location of the exhaust gas sensor with a time lag or delay depending on the speed of the exhaust gas. Stated otherwise, at each point of time, the temperature of the exhaust gas in the vicinity of the exhaust port generally does not affect the temperature of the exhaust gas in the vicinity of the location of the exhaust gas sensor at the same point of time, but affects the temperature in the vicinity of the location of the exhaust gas sensor after elapse of a time depending on the speed of the exhaust gas. The time lag or delay specifically depends on the distance between the exhaust port and the location of the exhaust gas sensor in the direction in which the exhaust gas flows, and the speed of the exhaust gas. The distance between the exhaust port and the location of the exhaust gas sensor is of a constant value.

With the apparatus according to the first aspect, the exhaust gas temperature estimating means should preferably sequentially estimate the temperature of the exhaust gas in the vicinity of an exhaust port of the internal combustion engine based on the parameter representative of the operating state of the internal combustion engine, and estimate the temperature of the exhaust gas in the vicinity of the location of the exhaust gas sensor, using at least an estimated value of the temperature of the exhaust gas and data representative of the speed of the exhaust gas. With the method according to the first aspect, similarly, the above process of the exhaust gas temperature estimating means should preferably be carried out by the step of sequentially estimating the temperature of the exhaust gas. With the recording medium according to the first aspect, the exhaust gas temperature estimating program should preferably be a program for enabling the computer to carry out the above process of the exhaust gas temperature estimating means.

It is thus possible to properly estimate the temperature of the exhaust gas from time to time in the vicinity of the location of the exhaust gas sensor, taking into account the time lag required for the exhaust gas to reach the location of the exhaust gas sensor from the exhaust port of the internal combustion engine. By controlling the heater with the estimated value of the temperature of the exhaust gas, the active element of the exhaust gas sensor can be controlled better in temperature.

Though the data representative of the speed of the exhaust gas may be provided by a detected value produced by a flow sensor, the data may be provided by a value estimated from detected data of the rotational speed and the intake pressure (the pressure in the intake pipe) of the internal combustion engine. If the exhaust sensor is positioned in the vicinity of the exhaust port of the internal combustion engine, then the estimated value of the temperature of the exhaust gas in the vicinity of the exhaust port based on the operating state of the internal combustion engine may directly be used as the estimated value of the temperature of the exhaust gas in the vicinity of the location of the exhaust gas sensor.

The correlation between the operating state of the internal combustion engine and the temperature of the exhaust gas in the vicinity of the exhaust port is high particularly in a steady operating state of the internal combustion engine, i.e., an operating state where the rotational speed is constant. However, when the operating state of the internal combustion engine changes, the temperature of the exhaust gas in the vicinity of the exhaust port tends to suffer a transient variation due to a heat exchange between the exhaust gas and an object near the exhaust port of the internal combustion engine.

With the apparatus according to the first aspect for estimating the temperature of the exhaust gas in the vicinity of the exhaust port, the exhaust gas temperature estimating means should preferably sequentially determine a basic value of the temperature of the exhaust gas (which corresponds to an estimated value of the temperature of the exhaust gas in the vicinity of the exhaust port under a steady operating state of the internal combustion engine) based on a preset correlation between the parameter and the temperature of the exhaust gas from the parameter representative of the operating state of the internal combustion engine, and determine a value which follows the basic value with a response delay, as the estimated value of the temperature of the exhaust gas in the vicinity of the exhaust port. With the method according to the first aspect, similarly, the above process of the exhaust gas temperature estimating means should preferably be carried out by the step of sequentially estimating the temperature of the exhaust gas. With the recording medium according to the first aspect, the exhaust gas temperature estimating program should preferably be a program for enabling the computer to carry out the above process of the exhaust gas temperature estimating means.

According to the above arrangement, the accuracy of the estimated value of the temperature of the exhaust gas in the vicinity of the exhaust port of the internal combustion engine can be increased, and hence the accuracy of the estimated value of the temperature of the exhaust gas in the vicinity of the location of the exhaust gas sensor can be increased.

The temperature of the exhaust gas in the vicinity of the exhaust port is highly correlated to the rotational speed of the internal combustion engine and the amount of intake air introduced into the internal combustion engine (the amount of intake air introduced into the internal combustion engine per unit time). Therefore, the parameter representative of the operating state of the internal combustion engine which is used to estimate the temperature of the exhaust gas in the vicinity of the exhaust port should preferably include at least a parameter representative of the rotational speed of the internal combustion engine and a parameter representative of an amount of intake air introduced into the internal combustion engine.

In estimating the temperature of the exhaust gas in the vicinity of the location of the exhaust gas sensor using the estimated value of the temperature of the exhaust gas in the vicinity of the exhaust port of the internal combustion engine and the data representative of the speed of the exhaust gas, if the location of the exhaust gas sensor is widely spaced from the exhaust port, then the temperature of the exhaust gas ranging from the exhaust port to the location of the exhaust gas sensor is generally of a temperature distribution having non-monotonous changes in the direction in which the exhaust gas flows,. i.e., a temperature distribution of staggering temperature changes along the direction in which the exhaust gas flows, as the operating state of the internal combustion engine varies. The temperature of the exhaust gas from time to time in each section of the exhaust passage basically depends on the temperature of the exhaust gas that is present upstream of that section in an immediately prior time and the speed of the exhaust gas. In order to sequentially estimate with accuracy the temperature of the exhaust gas at a certain location in the exhaust passage, therefore, it is preferable to sequentially recognize the temperature of the exhaust gas at a location which is slightly spaced upstream from that location. The temperature of the exhaust gas at a location that is slightly spaced downstream from the exhaust port of the internal combustion engine basically depends on the temperature of the exhaust gas in the vicinity of the exhaust port and the speed of the exhaust gas.

With the apparatus according to the first aspect of the present invention, the exhaust passage from the exhaust port to a position in the vicinity of the location of the exhaust gas sensor is divided into a plurality of partial exhaust passageways along the direction in which the exhaust gas flows. The exhaust gas temperature estimating means should preferably comprise means for estimating the temperature of the exhaust gas in a most upstream one of the partial exhaust passageways using the estimated value of the temperature of the exhaust gas in the vicinity of the exhaust port and the data representative of the speed of the exhaust gas, estimating the temperatures of the exhaust gas in the partial exhaust passageways other than the most upstream partial exhaust passageway using estimated values of the temperatures of the exhaust gas in adjacent partial exhaust passageways upstream thereof and the data representative of the speed of the exhaust gas, and obtaining an estimated value of the temperature of the exhaust gas in a most downstream one of the partial exhaust passageways as the estimated value of the temperature of the exhaust gas in the vicinity of the location of the exhaust gas sensor. With the method according to the first aspect, similarly, the above process of the exhaust gas temperature estimating means should preferably be carried out by the step of sequentially estimating the temperature of the exhaust gas. With the recording medium according to the first aspect, the exhaust gas temperature estimating program should preferably be a program for enabling the computer to carry out the above process of the exhaust gas temperature estimating means.

With the above arrangement, the temperatures of the exhaust gas in the respective partial exhaust passageways between a position in the vicinity of the exhaust port of the internal combustion engine and a position in the vicinity of the location of the exhaust gas sensor can successively be determined accurately. By obtaining the estimated value of the temperature of the exhaust gas in the most downstream one of the partial exhaust passageways as the estimated value of the temperature of the exhaust gas in the vicinity of the location of the exhaust gas sensor, the accuracy of the estimated value of the temperature of the exhaust gas in the vicinity of the location of the exhaust gas sensor can be increased.

To achieve the above object, there is provided in accordance with a second aspect of the present invention an apparatus for controlling the temperature of an exhaust gas sensor disposed in an exhaust passage of an internal combustion engine and having an active element for contacting an exhaust gas flowing through the exhaust passage and a heater for heating the active element, the apparatus comprising an exhaust gas temperature sensor disposed in the exhaust passage for detecting the temperature of the exhaust gas flowing through the exhaust passage, and heater control means for controlling the heater to equalize the temperature of the active element of the exhaust gas sensor with a predetermined target temperature, using a detected value of the temperature of the exhaust gas from the exhaust gas temperature sensor.

Similarly, there is also provided in accordance with the second aspect of the present invention a method of controlling the temperature of an exhaust gas sensor disposed in an exhaust passage of an internal combustion engine and having an active element for contacting an exhaust gas flowing through the exhaust passage and a heater for heating the active element, the method comprising the steps of detecting the temperature of the exhaust gas flowing through the exhaust passage with an exhaust gas temperature sensor disposed in the exhaust passage, and controlling the heater to equalize the temperature of the active element of the exhaust gas sensor with a predetermined target temperature, using a detected value of the temperature of the exhaust gas.

There is also provided in accordance with the second aspect of the present invention a recording medium readable by a computer and storing a temperature control program for being executed by the computer for controlling the temperature of an exhaust gas sensor disposed in an exhaust passage of an internal combustion engine and having an active element for contacting an exhaust gas flowing through the exhaust passage and a heater for heating the active element, the temperature control program comprising a heater control program for enabling the computer to carry out a process of controlling the heater to equalize the temperature of the active element of the exhaust gas sensor with a predetermined target temperature, using a detected value of the temperature of the exhaust gas from an exhaust gas sensor which is disposed in the exhaust passage to detect the temperature of the exhaust gas.

According to the second aspect of the present invention, since the heater of the exhaust gas sensor is controlled using the detected value of the temperature of the exhaust gas from the exhaust gas temperature sensor, the temperature of the active element of the exhaust gas sensor can be controlled stably at a predetermined target temperature (desired temperature) while reducing the effect of a change in the temperature of the exhaust gas.

In a preferred configuration of the apparatus, the method, and the recording medium according to the second aspect, the exhaust gas temperature sensor is disposed in the vicinity of the active element of the exhaust gas sensor. Stated otherwise, the detected value of the temperature of the exhaust gas is from the exhaust gas temperature sensor which is disposed in the vicinity of the active element of the exhaust gas sensor.

The temperature of the exhaust gas in the vicinity of the location of the exhaust gas sensor, i.e., the temperature of the exhaust gas which directly affects the temperature of the active element of the exhaust gas sensor, is detected by the exhaust gas temperature sensor. By using the detected value for the control of the heater, it is possible to control the temperature of the active element of the exhaust gas sensor more stably at the target temperature.

With the apparatus according to the first aspect where the exhaust gas temperature sensor is disposed in the vicinity of the location of the active element of the exhaust gas sensor, the heater control means should preferably sequentially acquire data representative of the temperature of the active element of the exhaust gas sensor, sequentially calculate a control input for the heater by adding at least a control input component depending on the temperature of the active element of the exhaust gas sensor and a control input component depending on the detected value of the temperature of the exhaust gas from the exhaust gas temperature sensor, and control the heater depending on the calculated control input. With the method according to the second aspect, similarly, the above process of the heater control means should preferably be carried out when the heater is controlled. With the recording medium according to the second aspect, the heater control program should preferably be a program for enabling the computer to carry out the above process of the heater control means.

Since a control input for the heater includes a control input component depending on the temperature of the active element of the exhaust gas sensor (a feedback component), and a control input component depending on the detected value of the temperature of the exhaust gas (a feedforward component), it is possible to control the temperature of the active element of the exhaust gas sensor stably at the target temperature as described above with respect to the control of the heater according to the first aspect.

In the exhaust system of an internal combustion engine, an exhaust gas temperature sensor may be disposed in a certain location in the exhaust passage for a purpose different from the control of the temperature of the active element of the exhaust gas sensor, e.g., a purpose of recognizing the state of an exhaust gas purifying apparatus. The exhaust gas temperature sensor is not necessarily disposed in the vicinity of the location of the exhaust gas sensor, but is often disposed in a location spaced from the exhaust gas sensor in the direction of a flow of the exhaust gas in the exhaust passage.

With the apparatus according to the second aspect of the present invention, if the exhaust gas temperature sensor is disposed in the exhaust passage in spaced relation to the exhaust gas sensor, then the apparatus should preferably comprise exhaust gas temperature estimating means for sequentially estimating the temperature of the exhaust gas in the vicinity of the location of the exhaust gas sensor using the detected value of the temperature of the exhaust gas from the exhaust gas temperature sensor, and the heater control means should preferably comprise means for controlling the heater using an estimated value of the temperature of the exhaust gas in the vicinity of the location of the exhaust gas sensor, rather than the detected value of the temperature of the exhaust gas.

Likewise, with the method according to the second aspect of the present invention, if the exhaust gas temperature sensor is disposed in the exhaust passage in spaced relation to the exhaust gas sensor, then the method should preferably comprise the step of sequentially estimating the temperature of the exhaust gas in the vicinity of the location of the exhaust gas sensor using the detected value of the temperature of the exhaust gas, and the step of controlling the heater should preferably comprise the step of controlling the heater using an estimated value of the temperature of the exhaust gas in the vicinity of the location of the exhaust gas sensor, rather than the detected value of the temperature of the exhaust gas.

With the recording medium according to the second aspect of the present invention, if the exhaust gas temperature sensor is disposed in the exhaust passage in spaced relation to the exhaust gas sensor, then the temperature control program should preferably further comprise an exhaust gas temperature estimating program for enabling the computer to carry out a process of sequentially estimating the temperature of the exhaust gas in the vicinity of the location of the exhaust gas sensor using the detected value of the temperature of the exhaust gas from the exhaust gas temperature sensor, and the heater control program should preferably comprise a program for controlling the heater using an estimated value of the temperature of the exhaust gas in the vicinity of the location of the exhaust gas sensor, rather than the detected value of the temperature of the exhaust gas.

According to the above inventive features, since the temperature of the exhaust gas in the vicinity of the location of the exhaust gas sensor is estimated using the detected value of the temperature of the exhaust gas from the exhaust gas temperature sensor, the temperature of the exhaust gas in the vicinity of the location of the exhaust gas sensor can appropriately be recognized without the need for another exhaust gas temperature sensor disposed in the vicinity of the location of the exhaust gas sensor. By controlling the heater of the exhaust gas sensor using the estimated value of the temperature of the exhaust gas in the vicinity of the location of the exhaust gas sensor, it is possible to control the temperature of the active element of the exhaust gas sensor stably at a predetermined temperature.

If the temperature of the exhaust gas in the vicinity of the location of the exhaust gas sensor is estimated using the detected value of the temperature of the exhaust gas as described above, then the temperature of the active element of the exhaust gas sensor can be controlled stably at the target temperature by calculating the control input in the same manner as with the first aspect and controlling the heater depending on the control input.

In determining the estimated value of the temperature of the exhaust gas in the vicinity of the location of the exhaust gas sensor using the detected value of the temperature of the exhaust gas, if the exhaust gas temperature sensor is positioned upstream of the exhaust gas sensor, then the exhaust gas present in the location of the exhaust gas sensor at each point of time reaches the location of the exhaust gas sensor with a time lag or delay depending on the speed of the exhaust gas. If the exhaust gas temperature sensor is positioned downstream of the exhaust gas sensor, then the exhaust gas present in the location of the exhaust gas sensor at each point of time reaches the location of the exhaust gas temperature sensor with a time lag or delay depending on the speed of the exhaust gas.

Therefore, with the apparatus according to the second aspect which has the exhaust gas temperature estimating means, the exhaust gas temperature estimating means should preferably comprise means for estimating the temperature of the exhaust gas in the vicinity of the location of the exhaust gas sensor using at least the detected value of the temperature of the exhaust gas from the exhaust gas temperature sensor and data representative of the speed of the exhaust gas. Similarly, with the method according to the second aspect which carries out the step of estimating the temperature of the exhaust gas, the process of the above exhaust gas temperature estimating means should preferably be carried out by the step of estimating the temperature of the exhaust gas. With the recording medium according to the second aspect which stores the exhaust gas temperature estimating program, the exhaust gas temperature estimating program should preferably be a program for enabling the computer to carry out the process of exhaust gas temperature estimating means.

It is thus possible to properly estimate the temperature of the exhaust gas from time to time in the vicinity of the location of the exhaust gas sensor, taking into account a time lag or delay caused until the exhaust gas reaches a downstream one of the exhaust gas temperature sensor and the exhaust gas sensor from the downstream sensor. The temperature of the active element of the exhaust gas sensor can well be controlled by controlling the heater using the estimated value of the temperature of the exhaust gas.

In the description of the present invention which follows, the apparatus according to the second aspect refers to an apparatus including the exhaust gas temperature estimating means unless stated otherwise. Similarly, in the description of the present invention which follows, the method according to the second aspect includes the step of estimating the temperature of the exhaust gas, and the recording medium according to the second aspect includes the exhaust gas temperature estimating program.

In the second aspect of the present invention which estimates the temperature of the exhaust gas in the vicinity of the location of the exhaust gas sensor, if the exhaust gas temperature sensor and the exhaust gas sensor are relatively widely spaced from each other, then it is preferable to apply the same idea as if the exhaust passage from the exhaust port of the internal combustion engine to the location of the exhaust gas sensor is divided into a plurality of partial exhaust passageways according to the first aspect.

Specifically, with the apparatus according to the second aspect, the exhaust passage from a position in the vicinity of the location of the exhaust gas temperature sensor to a position in the vicinity of the location of the exhaust gas sensor is divided into a plurality of partial exhaust passageways along the direction in which the exhaust gas flows. The exhaust gas temperature estimating means should preferably comprise means for estimating the temperature of the exhaust gas in one of the partial exhaust passageways which is closest to the exhaust gas temperature sensor using the detected value of the temperature of the exhaust gas from the exhaust gas temperature sensor and data representative of the speed of the exhaust gas, estimating the temperatures of the exhaust gas in the partial exhaust passageways other than the partial exhaust passageway which is closest to the exhaust gas temperature sensor using the estimated value of the temperature of the exhaust gas in the partial exhaust passageway which is adjacent to the partial exhaust passageways on the side of the exhaust gas temperature sensor and data representative of the speed of the exhaust gas, and acquiring the temperature of the exhaust gas in the partial exhaust passageway which is closest to the exhaust gas sensor as the estimated value of the temperature of the exhaust gas in the vicinity of the location of the exhaust gas sensor.

Similarly, with the method according to the second aspect, it is preferable for the same process as the process of the exhaust gas temperature estimating means to be carried out by the step of estimating the temperature of the exhaust gas to obtain the estimated value of the temperature of the exhaust gas in the vicinity of the location of the exhaust gas sensor. Similarly, with the recording medium according to the second aspect, it is preferable for the exhaust gas temperature estimating program to be a program for enabling the computer to carry out the same process as the process of the exhaust gas temperature estimating means.

According to the above inventive features, it is possible to determine successively with accuracy the temperatures of the exhaust gas in the respective partial exhaust passageways between the position in the vicinity of the location of the exhaust gas temperature sensor and the position in the vicinity of the location of the exhaust gas sensor, starting from the position in the vicinity of the location of the exhaust gas temperature sensor. The accuracy of the estimated value of the temperature of the exhaust gas in the vicinity of the location of the exhaust gas sensor by obtaining the estimated value of the temperature of the exhaust gas in the partial exhaust passageway closest to the exhaust gas sensor, as the estimated value of the temperature of the exhaust gas in the vicinity of the location of the exhaust gas sensor.

With the apparatus according to the first and second aspects which estimate the temperature of the exhaust gas in the vicinity of the location of the exhaust gas sensor as described above, the exhaust gas temperature estimating means should preferably comprise means for estimating the temperature of the exhaust gas in the vicinity of the location of the exhaust gas sensor according to an estimating algorithm which is constructed taking into account at least a heat transfer between a passage-defining member which defines the exhaust passage from a position in the vicinity of the location of the exhaust gas sensor to a position in the vicinity of the exhaust gas temperature sensor and the exhaust gas flowing through the passage-defining member.

Particularly, with the apparatus according to the first aspect, the exhaust gas temperature estimating means should preferably comprise means for estimating the temperature of the exhaust gas in the vicinity of the location of the exhaust gas sensor according to an estimating algorithm which is constructed taking into account at least a heat transfer between a passage-defining member which defines the exhaust passage upstream of a position in the vicinity of the location of the exhaust gas sensor and the exhaust gas flowing through the passage-defining member. Similarly, with the apparatus according to the second aspect, the exhaust gas temperature estimating means should preferably comprise means for estimating the temperature of the exhaust gas in the vicinity of the location of the exhaust gas sensor according to an estimating algorithm which is constructed taking into account at least a heat transfer between a passage-defining member which defines the exhaust passage from a position in the vicinity of the location of the exhaust gas sensor to a position in the vicinity of the exhaust gas temperature sensor and the exhaust gas flowing through the passage-defining member.

With any of the apparatus according to the first and second aspects of the present invention, for estimating the temperatures of the exhaust gas in the respective partial exhaust passageways as described above, the exhaust gas temperature estimating means should preferably comprise means for estimating the temperatures of the exhaust gas in the partial exhaust passageways according to an estimating algorithm which is constructed taking into account at least a heat transfer between passage-defining members which define the partial exhaust passageways and the exhaust gas flowing through the passage-defining members.

Specifically, when the exhaust gas flows through the exhaust passage, a heat transfer occurs between the passage-defining member which defines the exhaust passage and the exhaust gas, and affects the temperature of the exhaust gas. The accuracy of the estimated value of the temperature of the exhaust gas can thus be increased by estimating the temperature of the exhaust gas according to an estimating algorithm which takes into account at least a heat transfer between the exhaust gas and the passage-defining member through which the exhaust gas flows.

The heat transfer between the passage-defining member and the exhaust gas should preferably be taken into account also in the method and the recording medium according to the present invention. More specifically, with the methods according to the first and second aspects of the present invention, it is preferable for the same process as the process of the exhaust gas temperature estimating means, i.e., the process of estimating the temperature of the exhaust gas according to the estimating algorithm which takes the heat transfer into account, to be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

With the apparatus according to the first and second aspects which estimate the temperature of the exhaust gas in the vicinity of the location of the exhaust gas sensor, the exhaust gas temperature estimating means should preferably comprise means for estimating the temperature of the exhaust gas in the vicinity of the location of the exhaust gas sensor according to an estimating algorithm which is constructed taking into account at least a heat radiation from a passage-defining member which defines the exhaust passage in the vicinity of the location of the exhaust gas sensor, into the atmosphere outside of the passage-defining member. More preferably, the exhaust gas temperature estimating means should comprise means for estimating the temperature of the exhaust gas in the vicinity of the location of the exhaust gas sensor according to an estimating algorithm which is constructed taking into account count at least a heat transfer between a passage-defining member which defines the exhaust passage in the vicinity of the location of the exhaust gas sensor and the exhaust gas flowing through the passage-defining member and a heat radiation from the passage-defining member into the atmosphere outside of the passage-defining member.

With the apparatus according to the first aspect of the present invention, the exhaust gas temperature estimating means should preferably comprise, in particular, means for estimating the temperature of the exhaust gas in the vicinity of the location of the exhaust gas sensor according to an estimating algorithm which is constructed taking into account at least a heat radiation from a passage-defining member which defines the exhaust passage upstream of a position in the vicinity of the location of the exhaust gas sensor, into the atmosphere outside of the passage-defining member. More preferably, the, exhaust gas temperature estimating means should comprise means for estimating the temperature of the exhaust gas in the vicinity of the location of the exhaust gas sensor according to an estimating algorithm which is constructed taking into account at least a heat transfer between a passage-defining member which defines the exhaust passage upstream of a position in the vicinity of the location of the exhaust gas sensor and the exhaust gas flowing through the passage-defining member and a heat radiation from the passage-defining member into the atmosphere outside of the passage-defining member.

Likewise, with the apparatus according to the second aspect of the present invention, the exhaust gas temperature estimating means should preferably comprise means for estimating the temperature of the exhaust gas in the vicinity of the location of the exhaust gas sensor according to an estimating algorithm which is constructed taking into account at least a heat radiation from a passage-defining member which defines the exhaust passage from a position in the vicinity of the location of the exhaust gas sensor to a position in the vicinity of the exhaust gas temperature sensor, into the atmosphere outside of the passage-defining member, or more preferably, an estimating algorithm which is constructed taking into account at least a heat transfer between a passage-defining member which defines the exhaust passage from a position in the vicinity of the location of the exhaust gas sensor to a position in the vicinity of the exhaust gas temperature sensor and the exhaust gas flowing through the passage-defining member, and a heat radiation from the passage-defining member into the atmosphere outside of the passage-defining member.

With any of the apparatus according to the first and second aspects of the present invention, for estimating the temperatures of the exhaust gas in the respective partial exhaust passageways as described above, the exhaust gas temperature estimating means should preferably comprise means for estimating the temperatures of the exhaust gas in the partial exhaust passageways according to an estimating algorithm which is constructed taking into account at least a heat radiation from passage-defining members which define the partial exhaust passageways into the atmosphere outside of the passage-defining members, or more preferably an estimating algorithm which is constructed taking into account a heat transfer between passage-defining members which define the partial exhaust passageways and the exhaust gas flowing through the passage-defining members, and the above heat radiation.

Specifically, when the exhaust gas flows through the exhaust passage, a heat radiation occurs from the passage-defining member which defines the exhaust passage into the atmosphere, and affects the temperature of the exhaust gas. The accuracy of the estimated value of the temperature of the exhaust gas can thus be increased by estimating the temperature of the exhaust gas according to an estimating algorithm which takes into account at least a heat radiation from the passage-defining member through which the exhaust gas flows into the atmosphere. In particular, the accuracy of the estimated value of the temperature of the exhaust gas can effectively be increased if the heat transfer between the exhaust gas and the passage-defining member is also taken into account.

The heat radiation from the passage-defining member into the atmosphere should preferably be taken into account also in the method and the recording medium according to the present invention. More specifically, with the methods according to the first and second aspects of the present invention, it is preferable for the same process as the process of the exhaust gas temperature estimating means, i.e., the process of estimating the temperature of the exhaust gas according to the estimating algorithm which takes the heat radiation into account (more preferably the estimating algorithm which takes the heat radiation and the heat transfer into account, to be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

With the apparatus according to the first aspect of the present invention, if the exhaust passage upstream of a position in the vicinity of the location of the exhaust gas sensor includes a catalyst for purifying the exhaust gas, as a passage-defining member which defines a portion of the exhaust passage, then the exhaust gas temperature estimating means should preferably comprise means for estimating the temperature of the exhaust gas in the vicinity of the location of the exhaust gas sensor according to an estimating algorithm which is constructed taking into account at least heating of the catalyst. Similarly, with the apparatus according to the second aspect of the present invention, if the exhaust passage from a position in the vicinity of the location of the exhaust gas sensor to a position in the vicinity of the exhaust gas temperature sensor includes a catalyst for purifying the exhaust gas, as a passage-defining member which defines a portion of the exhaust passage, then the exhaust gas temperature estimating means should preferably comprise means for estimating the temperature of the exhaust gas in the vicinity of the location of the exhaust gas sensor according to an estimating algorithm which is constructed taking into account at least heating of the catalyst. It is more preferable to estimate the temperature of the exhaust gas in the vicinity of the location of the exhaust gas sensor according to an estimating algorithm which takes into account not only heating of the catalyst, but also the heat transfer between the passage-defining member and the exhaust gas and the heat transfer from the passage-defining member into the atmosphere.

With any of the apparatus according to the first and second aspects of the present invention, for estimating the temperatures of the exhaust gas in the respective partial exhaust passageways as described above, if at least one of the partial exhaust passageways includes a catalyst for purifying the exhaust gas, as a passage-defining member which defines a portion of the exhaust passage, then the exhaust gas temperature estimating means should preferably comprise means for estimating the temperature of the exhaust gas in the partial exhaust passageway which includes the catalyst according to an estimating algorithm which is constructed taking into account at least heating of the catalyst. More preferably, the exhaust gas temperature estimating means should comprise means for estimating the temperature of the exhaust gas in the partial exhaust passageway which includes the catalyst according to an estimating algorithm which is constructed taking into account not only heating of the catalyst, but also a heat transfer between a passage-defining member which defines the partial exhaust passageway and the exhaust gas flowing through the passage-defining member, and a heat radiation from the passage-defining member into the atmosphere outside of the passage-defining member, and estimating the temperature of the exhaust gas in one of the partial exhaust passageways which does not include the catalyst according to an estimating algorithm which is constructed taking into account at least a heat transfer between a passage-defining member which defines the one partial exhaust passageway and the exhaust gas flowing through the passage-defining member, and a heat radiation from the passage-defining member into the atmosphere outside of the passage-defining member.

Specifically, the catalyst for purifying the exhaust gas is heated by its action to purify the exhaust gas (an oxidizing/reducing action), and the heating of the catalyst affects the temperature of the exhaust gas. Therefore, the accuracy of the estimated value of the temperature of the exhaust gas can be increased by estimating the temperature of the exhaust gas according to an estimating algorithm which takes heating of the catalyst into account. Particularly, the accuracy of the estimated value of the temperature of the exhaust gas can effectively be increased if the heat transfer between the exhaust gas and the passage-defining member and the heat radiation from the passage-defining member into the atmosphere are also taken into account.

The heating of the catalyst should preferably be taken into account also in the method and the recording medium according to the present invention. More specifically, with the methods according to the first and second aspects of the present invention, it is preferable for the same process as the process of the exhaust gas temperature estimating means, i.e., the process of estimating the temperature of the exhaust gas according to the estimating algorithm which takes the heating of the catalyst into account (more preferably the estimating algorithm which takes the heating of the catalyst, the heat transfer, and the heat radiation into account, to be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

With the apparatus according to the first and second aspects of the present invention, for estimating the temperature of the exhaust gas in the vicinity of the location of the exhaust gas sensor taking into account the heat transfer between the exhaust gas and the passage-defining member, the exhaust gas temperature estimating means should preferably comprise means for sequentially acquiring at least data representative of the temperature of a passage-defining member which defines the exhaust passage in the vicinity of the location of the exhaust gas sensor, and estimating the temperature of the exhaust gas in the vicinity of the location of the exhaust gas sensor using the data representative of the temperature of the passage-defining member. The above arrangement holds true for the methods according to the first and second aspects, and the same process as the process of the exhaust gas temperature estimating means should preferably be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

By thus sequentially acquiring data representative of the temperature of the passage-defining member which defines the exhaust passage in the vicinity of the location of the exhaust gas sensor, and estimating the temperature of the exhaust gas in the vicinity of the location of the exhaust gas sensor using the data, the temperature of the exhaust gas in the vicinity of the location of the exhaust gas sensor can be estimated in a manner taking into account a change in the temperature of the exhaust gas due to the heat transfer between the passage-defining member and the exhaust gas in the vicinity of the location of the exhaust gas sensor, and the accuracy of the estimated value can be increased.

With the apparatus according to the first and second aspects of the present invention, for estimating the temperatures of the exhaust gas in the respective partial exhaust passageways as described above, the exhaust gas temperature estimating means should preferably comprise means for sequentially acquiring data representative of the temperatures of passage-defining members which define the partial exhaust passageways, and estimating the temperatures of the exhaust gas in the partial exhaust passageways using the data representative of the temperatures of the passage-defining members. The above arrangement holds true for the methods according to the first and second aspects, and the same process as the process of the exhaust gas temperature estimating means should preferably be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

Thus, the temperatures of the exhaust gas in the respective partial exhaust passageways can be estimated in a manner taking into account a change in the temperature of the exhaust gas due to the heat transfer between the passage-defining members which define the respective partial exhaust passageways and the exhaust gas, and the accuracy of the estimated values can be increased. As a result, the accuracy of the estimated value of the temperature of the exhaust gas in the vicinity of the location of the exhaust gas sensor can also be increased.

The data representative of the temperature of the passage-defining member may be detected by a temperature sensor or may be estimated appropriately from other parameters or the like.

With the apparatus according to the first and second aspects of the present invention, for estimating the temperature of the exhaust gas in the vicinity of the location of the exhaust gas sensor using the data representative of the temperature of the passage-defining member in the vicinity of the location of the exhaust gas sensor, more specifically, the exhaust gas temperature estimating means should preferably comprise means for sequentially determining a change in the temperature of the exhaust gas in the vicinity of the location of the exhaust gas sensor based on a thermal model in which a change per predetermined time in the temperature of the exhaust gas in the vicinity of the location of the exhaust gas sensor is exhaust pressed as at least the sum of a temperature change component depending on a temperature gradient in the direction in which the exhaust gas flows in the vicinity of the location of the exhaust gas sensor and the speed of-the exhaust gas, and a temperature change component depending on the difference between the temperature of the exhaust gas in the vicinity of the location of the exhaust gas sensor and the temperature of the passage-defining member, and estimating the temperature of the exhaust gas in the vicinity of the location of the exhaust gas sensor by cumulatively adding the determined change in the temperature to an initial value set when the internal combustion engine has started to operate. The above arrangement holds true for the methods according to the first and second aspects, and the same process as the process of the exhaust gas temperature estimating means should preferably be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

For estimating the temperatures of the exhaust gas in the respective partial exhaust passageways using the data representative of the temperatures of the passage-defining members which define the respective partial exhaust passageways, the exhaust gas temperature estimating means should preferably comprise means for sequentially determining changes in the temperature of the exhaust gas in the partial exhaust passageways based on a thermal model in which changes per predetermined time in the temperatures of the exhaust gas in the partial exhaust passageways are exhaust pressed as at least the sum of temperature change components depending on temperature gradients in the direction in which the exhaust gas flows in the partial exhaust passageways and the speed of the exhaust gas, and temperature change components depending on the difference between the temperatures of the exhaust gas in the partial exhaust passageways and the temperatures of the passage-defining members which defines the partial exhaust passageways, and estimating the temperatures of the exhaust gas in the partial exhaust passageways by cumulatively adding the determined changes in the temperature to initial values set for the respective partial exhaust passageways when the internal combustion engine has started to operate. The above arrangement holds true for the methods according to the first and second aspects, and the same process as the process of the exhaust gas temperature estimating means should preferably be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

In the thermal model, a temperature change component depending on a temperature gradient in the direction in which the exhaust gas flows and the speed of the exhaust gas refers to a temperature change component of the exhaust gas (a temperature change component in a location to be handled in the thermal model) which is caused as the exhaust gas whose temperature is not constant in the direction in which the exhaust gas flows (primarily due to a change in the operating state of the internal combustion engine). A temperature change component depending on the difference between the temperature of a passage-defining member and the temperature of the exhaust gas refers to a temperature change component of the exhaust gas (a temperature change component in a location to be handled in the thermal model) which is caused by a heat transfer between the passage-defining member and the exhaust gas. Therefore, a change per given time in the temperature of the exhaust gas can accurately be determined based on the thermal model. It is then possible to determine an estimated value of the temperature of the exhaust gas with high accuracy by cumulatively adding the change in the temperature of the exhaust gas to an initial model that has been set at the time the internal combustion engine has started to operate, i.e., a predicted value of the temperature of the exhaust gas in a location to be handled in the thermal model at the time the internal combustion engine has started to operate. The temperature of the exhaust gas in the vicinity of the location of the exhaust gas sensor can hence be estimated accurately.

With respect to a temperature gradient of the exhaust gas which is required to determine a change per given time in the temperature of the exhaust gas based on the thermal model, if the exhaust sensor is disposed in a position downstream of and relatively close to the exhaust port of the internal combustion engine according to the first aspect of the present invention, then a temperature gradient of the exhaust gas in the vicinity of the location of the exhaust gas sensor can be determined from the latest estimated value (the latest one of already determined values) of the temperature of the exhaust gas in the vicinity of the location of the exhaust gas sensor and the latest estimated value (the latest one of already determined values) of the temperature of the exhaust gas at the exhaust port. Similarly, according to the second aspect of the present invention,.if the exhaust sensor is disposed in a position relatively close to the exhaust gas temperature sensor, then a temperature gradient of the exhaust gas in the vicinity of the location of the exhaust gas sensor can be determined from the latest estimated value of the temperature of the exhaust gas in the vicinity of the location of the exhaust gas sensor and the latest detected value of the temperature of the exhaust gas from the exhaust gas temperature sensor.

If the temperatures of the exhaust gas in the respective partial exhaust passageways are estimated according to the first aspect of the present invention, then temperature gradients of the exhaust gas in the partial exhaust passageways can be determined from the latest estimated values of the temperatures of the exhaust gas in the partial exhaust passageways and the latest estimated values of the temperatures of the exhaust gas in adjacent ones of the partial exhaust passageways. This arrangement also holds true for the estimation of the temperatures of the exhaust gas in the respective partial exhaust passageways according to the second aspect of the present invention.

A temperature change component depending on the difference between the temperature of a passage-defining member and the temperature of the exhaust gas can be determined from the latest value of data representative of the temperature of the passage-defining member and the latest estimated value of the temperature of the exhaust gas.

With the apparatus according to the first and second aspects of the present intention which employ the data representative of the temperature of the passage-defining member for estimating the temperature of the exhaust gas, the exhaust gas temperature estimating means should preferably comprise means for sequentially estimating the temperature of the passage-defining member using at least the estimated value of the temperature of the exhaust gas in the vicinity of the location of the exhaust gas sensor and data representative of an atmospheric temperature outside of the passage-defining member, and using the estimated temperature of the passage-defining member as the data representative of the temperature of the passage-defining member. In particular, for estimating the temperatures of the exhaust gases in passage-defining members, the exhaust gas temperature estimating means should preferably comprise means for sequentially estimating the temperatures of the passage-defining members which define the partial exhaust passageways using at least the estimated values of the temperatures of the exhaust gas in the partial exhaust passageways and data representative of an atmospheric temperature outside of the passage-defining members, and using the estimated temperatures of the passage-defining members as the data representative of the temperatures of the passage-defining members. The above arrangement holds true for the methods according to the first and second aspects, and the same process as the process of the exhaust gas temperature estimating means should preferably be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

By thus estimating the temperature of the passage-defining member together with the temperature of the exhaust gas, the data representative of the temperature of the passage-defining member can be acquired without using a temperature sensor, and hence the cost can be reduced. By using the estimated value of the temperature of the exhaust gas and the data representative of the atmospheric temperature for estimating the temperature of the passage-defining member, the temperature of the passage-defining member can be estimated in a manner taking into account a heat transfer between the passage-defining member and the exhaust gas flowing therein and a heat radiation from the passage-defining member into the atmosphere, and the temperature of the passage-defining member thus estimated is highly accurate.

The internal combustion engine is usually associated with an atmospheric temperature sensor for detecting an atmospheric temperature for the purpose of controlling operation of the internal combustion engine. A detected value from the atmospheric temperature sensor may be used as the above data representative of the atmospheric temperature.

For estimating the temperature of the passage-defining member in the vicinity of the location of the exhaust gas sensor, more specifically, the exhaust gas temperature estimating means should preferably comprise means for sequentially estimating a change in the temperature of the passage-defining member based on a thermal model in which a change per predetermined time in the temperature of the passage-defining member is expressed as including at least a temperature change component depending on the difference between the temperature of the exhaust gas in the vicinity of the location of the exhaust gas sensor and the temperature of the passage-defining member and a temperature change component depending on the difference between the temperature of the passage-defining member and the atmospheric temperature, and estimating the temperature of the passage-defining member by cumulatively adding the estimated value of the change in the temperature of the passage-defining member to an initial value set when the internal combustion engine has started to operate. The above arrangement holds true for the methods according to the first and second aspects, and the same process as the process of the exhaust gas temperature estimating means should preferably be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

For estimating the temperatures of the passage-defining members which define the respective partial exhaust passageways, more specifically, the exhaust gas temperature estimating means should preferably comprise means for sequentially estimating changes in the temperatures of the passage-defining members which define the partial exhaust passageways based on a thermal model in which changes per predetermined time in the temperatures of the passage-defining members are expressed as including at least temperature change components depending on the difference between the temperatures of the exhaust gas in the passage-defining members and the temperatures of the passage-defining members and temperature change components depending on the difference between the temperatures of the passage-defining members and the atmospheric temperature, and estimating the temperatures of the passage-defining members by cumulatively adding the estimated values of the changes in the temperatures of the passage-defining members to initial values set for the respective partial exhaust passageways when the internal combustion engine has started to operate. The above arrangement holds true for the methods according to the first and second aspects, and the same process as the process of the exhaust gas temperature estimating means should preferably be carried out by the step of estimating the temperature of the exhaust gas. Similarly, with the recording mediums according to the first and second aspects, the exhaust gas temperature estimating program should preferably be a program for enabling the computer to carry out the same process as the process of the exhaust gas temperature estimating means.

In the thermal model, a temperature change component depending on the difference between the temperature of the exhaust gas and the temperature of a passage-defining member refers to a temperature change component of the passage-defining member (a temperature change component in a location to be handled in the thermal model) which is caused by a heat transfer between the passage-defining member and the exhaust gas. A temperature change component depending on the difference between the temperature of the passage-defining member and the atmospheric temperature refers to a temperature change component of the passage-defining member (a temperature change component in a location to be handled in the thermal model) which is caused by a heat radiation from the passage-defining member into the atmosphere. Therefore, a change per given time in the temperature of the passage-defining member can accurately be determined based on the thermal model. It is then possible to determine an estimated value of the temperature of the passage-defining member with high accuracy by cumulatively adding the change in the temperature of the passage-defining member to an initial model that has been set at the time the internal combustion engine has started to operate, i.e., a predicted value of the temperature of the passage-defining member in a location to be handled in the thermal model at the time the internal combustion engine has started to operate. The temperature of the exhaust gas can hence be estimated accurately using the estimated value of the temperature of the passage-defining member.

A temperature change component depending on the difference between the temperature of the passage-defining member and the temperature of the exhaust gas can be determined from the latest estimated value (the latest one of already determined values) of the temperature of the passage-defining member and the latest estimated value (the latest one of already determined values) of the temperature of the exhaust gas. A temperature change component depending on the difference between the temperature of the passage-defining member and the atmospheric temperature can be determined from the latest estimated value of the temperature of the passage-defining member and the latest value of the data representative of the atmospheric temperature.

With any of the apparatus, the method, and the recording mediums according to the first and second aspects of the present invention, for estimating the temperatures of the exhaust gas in the respective partial exhaust passageways and the temperatures of the passage-defining members, if at least one of the partial exhaust passageways includes a catalyst for purifying the exhaust gas, as a passage-defining member which defines a portion of the exhaust passage, then the thermal model which corresponds to the passage-defining member including the catalyst should preferably comprise a model in which a change per predetermined time in the temperature of the passage-defining member which defines the partial exhaust passageway is exhaust pressed as the sum of at least a temperature change component depending on the difference between the temperature of the exhaust gas in the partial exhaust passageway and the temperature of the passage-defining member, a temperature change component depending on the difference between the temperature of the passage-defining member and the atmospheric temperature, and a temperature change component depending on the speed of the exhaust gas.

In the above thermal model, a temperature change component depending on the speed of the exhaust gas refers to a temperature change component of the catalyst (a passage-defining member) based on heating of the catalyst due to its own exhaust gas purifying action. Specifically, as the speed of the exhaust gas increases, the amount of the exhaust gas with which the catalyst reacts per given time increases, resulting in an increase in the amount of heat generated by the catalyst. Accordingly, the temperature change component of the catalyst based on its heating depends on the speed of the exhaust gas. Based on the thermal model, it is possible to estimate accurately a change per given time in the temperature of the passage-defining member which defines the partial exhaust passageway including the catalyst, thus increasing the accuracy of the estimated mated value of the temperature of the passage-defining member For estimating the temperature of the exhaust gas and the temperature of the passage-defining member by cumulatively adding a change per given time in the temperature to an initial value, the initial value should preferably be set depending on at least the atmospheric temperature and/or the engine temperature of the internal combustion engine when the internal combustion engine starts to operate. Thus, initial values of the temperature of the exhaust gas and the temperature of the passage-defining member can properly be set when the internal combustion engine starts to operate.

With the apparatus, the method, and the recording mediums according to the first and second aspects of the present invention (including those which do not estimate the temperature of the exhaust gas according to the second aspect), the exhaust gas sensor may comprise an $O_2$ sensor disposed downstream of a catalytic converter for purifying the exhaust gas, for example. For well controlling the air-fuel ratio of the exhaust gas to keep the output voltage of the $O_2$ sensor at a predetermined level in order for the catalytic converter to perform its desired exhaust gas purifying capability, the temperature of the active element of the $O_2$ sensor should preferably be controlled at a predetermined target temperature equal to or higher than 750° C., e.g., 800° C.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
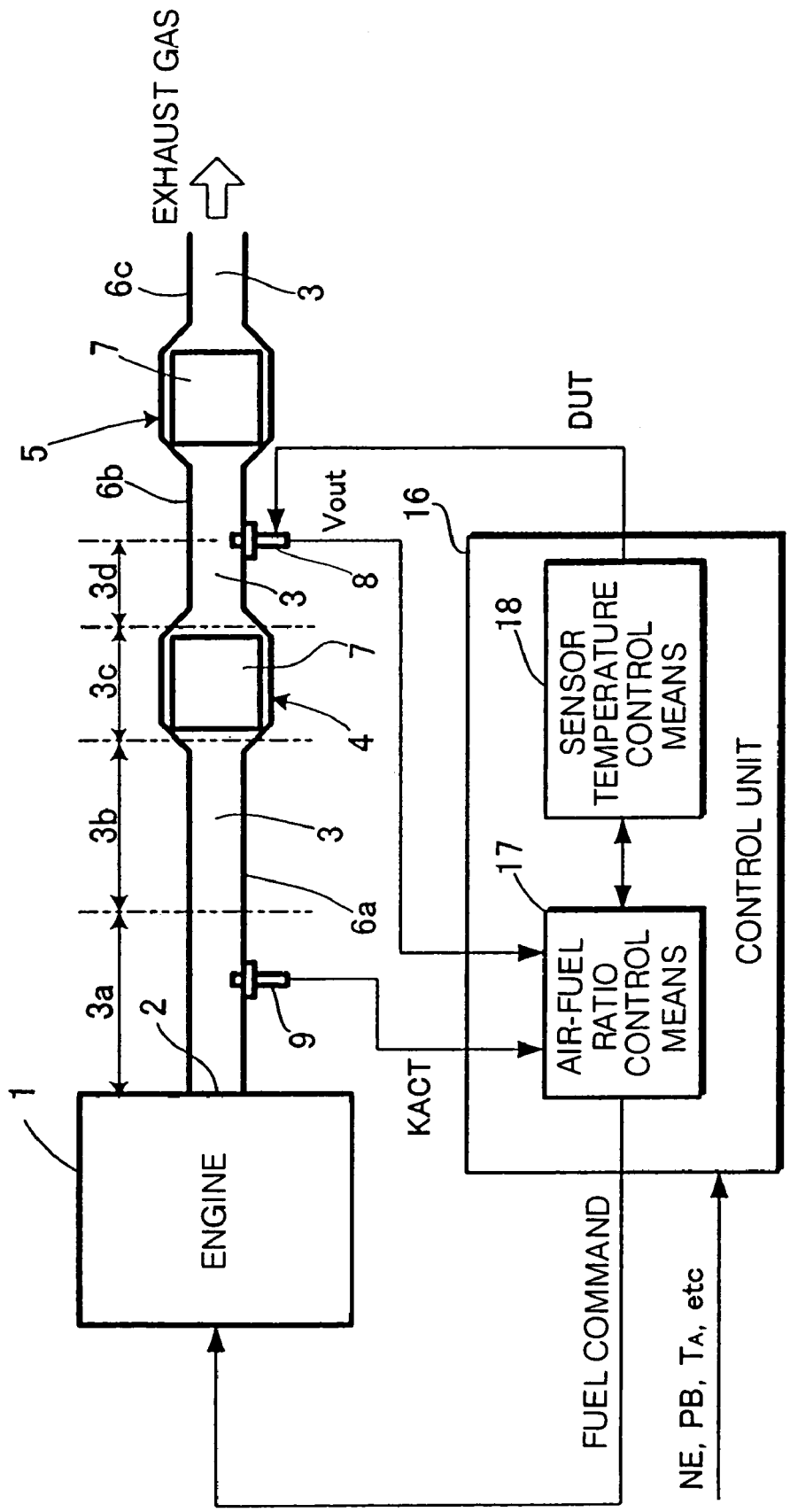
FIG. 1 is a block diagram of an apparatus for controlling the temperature of an exhaust gas sensor according to a first embodiment of the present invention.

An apparatus for controlling the temperature of an exhaust gas sensor according to a first embodiment of the present invention will be described below with reference to FIGS. 1 through 11. FIG. 1 shows in block form an overall arrangement of the apparatus according to the first embodiment of the present invention. In FIG. 1, an engine (an internal combustion engine) 1 mounted on an automobile, a hybrid vehicle, or the like combusts a mixture of fuel and air and generates an exhaust gas, which is discharged into the atmosphere through an exhaust passage 3 communicating with an exhaust port 2 of the engine 1. The exhaust passage 3 incorporates therein two catalytic converters 4, 5 disposed successively downstream for purifying the exhaust gas emitted from the engine 1 and flowing through the exhaust passage 3. The exhaust passage 3 includes a section upstream of the catalytic converter 4 (between the exhaust port 2 and the catalytic converter 4), a section between the catalytic converters 4, 5, and a section downstream of the catalytic converter 5. These sections of the exhaust passage 3 are provided by respective exhaust pipes 6a, 6b, 6c each in the form of a tubular passage-defining member.

Each of the catalytic converters 4, 5 contains a catalyst 7 (three-way catalyst in the present embodiment). The catalyst 7 has a passage-defining honeycomb structure and allows the exhaust gas to flow therethrough. Though the catalytic converters 4, 5 may be of a unitary structure with two catalytic beds, each comprising a three-way catalyst, disposed respectively in upstream and downstream regions thereof.

In the present embodiment, the air-fuel ratio in the exhaust gas emitted from the engine 1 is controlled in order for the upstream catalytic converter 4, in particular, to have a good exhaust gas purifying capability (the ability of the catalytic converter 4 to purify CO, HC, and NOx). For controlling the air-fuel ratio in the exhaust gas, an $O_2$ sensor 8 is mounted on the exhaust passage 3 between the catalytic converters 4, 5, i.e., on the exhaust passage defined by the exhaust pipe 6b, and a wide-range air-fuel ratio sensor 9 is mounted on the exhaust passage 3 upstream of the catalytic converter 4, i.e., on the exhaust passage defined by the exhaust pipe 6a.

Figure 2:
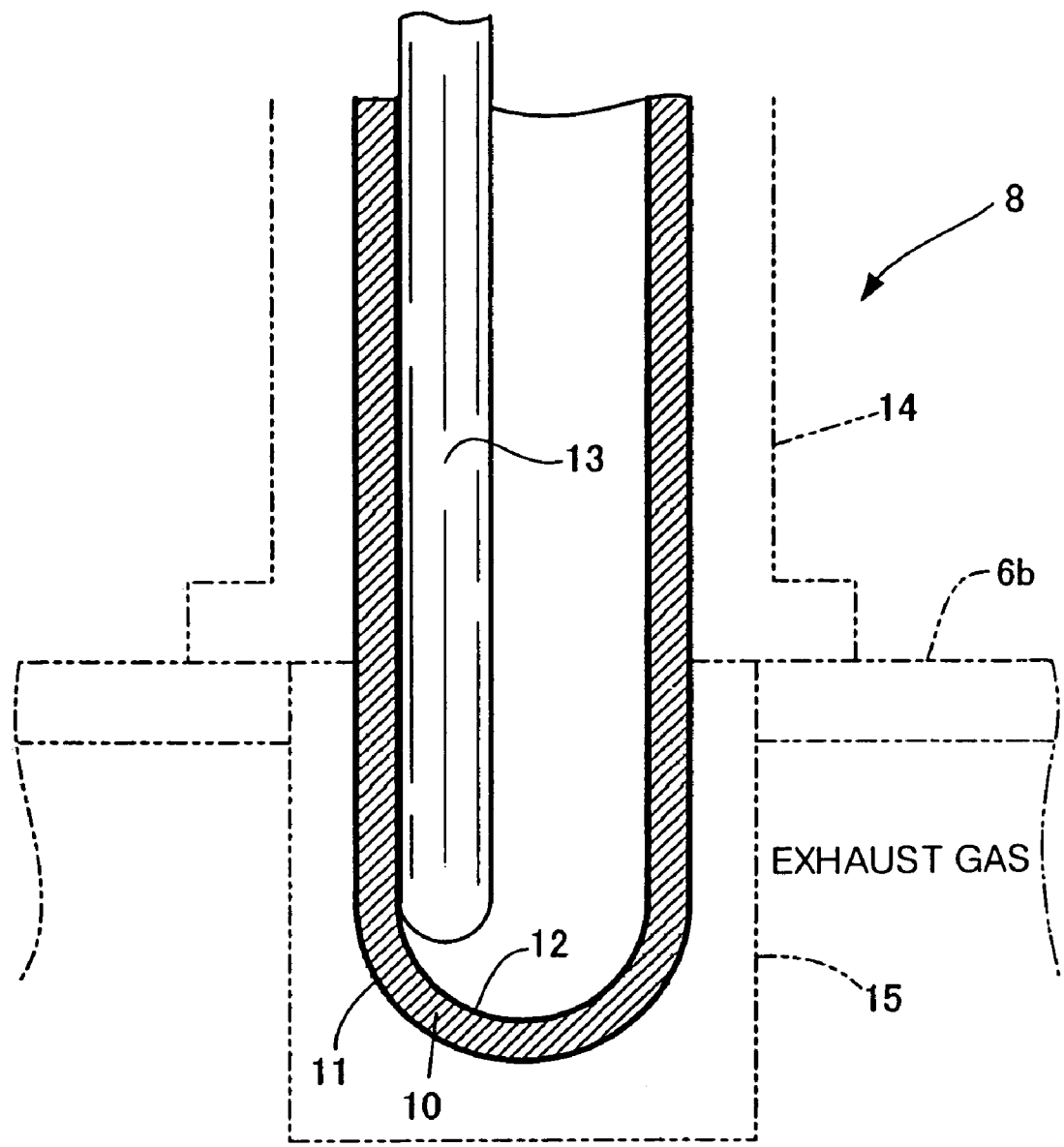
FIG. 2 is a fragmentary cross-sectional view of an $O_2$ sensor (exhaust gas sensor) in the apparatus shown in FIG. 1.

The $O_2$ sensor 8 corresponds to an exhaust gas sensor according to the present invention. Basic structural details and characteristics of the $O_2$ sensor 8 will be described below. As shown in FIG. 2, the $O_2$ sensor 8 has an active element 10 (sensitive element) in the form of a hollow bottomed cylinder made primarily of a solid electrolyte permeable to oxygen ions, e.g., stabilized zirconia ($ZrO_2$+ $Y_2O_3$). The active element 10 has outer and inner surfaces coated with porous platinum electrodes 11, 12, respectively. The $O_2$ sensor 8 also has a rod-shaped ceramic heater 13 inserted as an electric heater into the active element 10 for heating the active element 10 for activation and controlling the temperature of the active element 10. The active element 10 is filled with air containing oxygen at a constant concentration, i.e., under a constant partial pressure, in a space around the ceramic heater 13. The $O_2$ sensor 8 is placed in a sensor casing 14 mounted on the exhaust pipe 6b such that the tip end of the active element 10 has its outer surface positioned in contact with the exhaust gas flowing in the exhaust pipe 6b.

The tip end of the active element 10 is covered with a tubular protector 15 which protects the active element 10 against the impingement of foreign matter thereon. The tip end of the active element 10 which is positioned in the exhaust pipe 6b contacts the exhaust gas through a plurality of holes (not shown) defined in the protector 15.

The $O_2$ sensor 8 thus constructed operates as follows: An electromotive force depending on the concentration of oxygen in the exhaust gas is generated between the platinum electrodes 11, 12 based on the difference between the concentration of oxygen in the exhaust gas which is brought into contact with the outer surface of the tip end of the active element 10 and the concentration of oxygen in the air in the active element 10. The generated electromotive force is amplified by an amplifier (not shown), and then produced as the output voltage Vout from the $O_2$ sensor 8.

Figure 3:
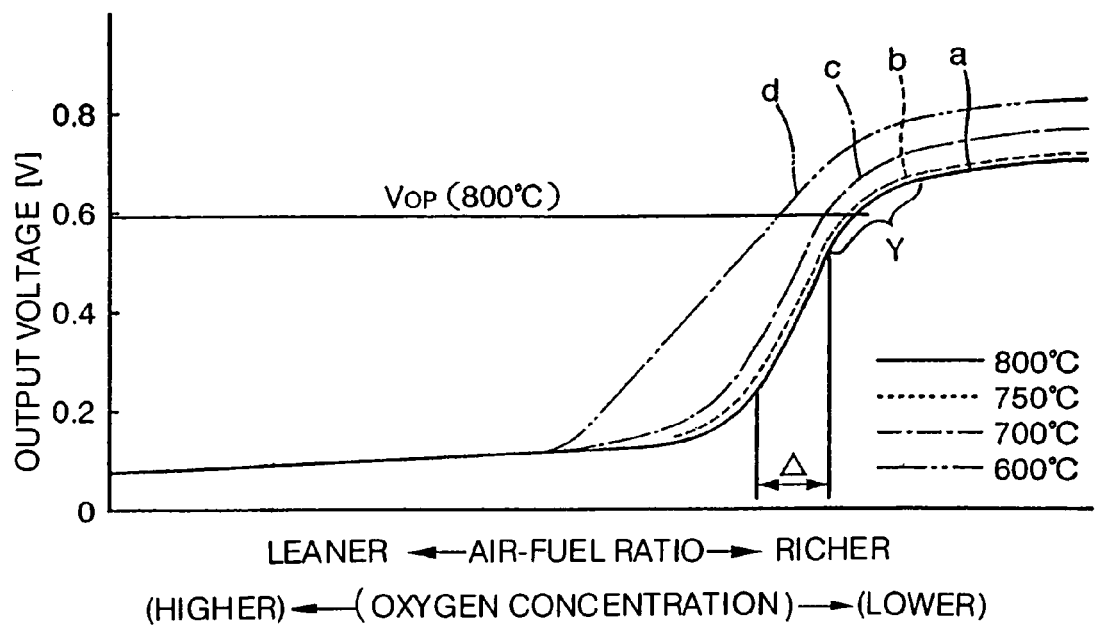
FIG. 3 is a graph illustrative of the output characteristics of the $O_2$ sensor shown in FIG. 2.

The output voltage Vout of the $O_2$ sensor 8 has characteristics (output characteristics) with respect to the concentration of oxygen in the exhaust gas or the air-fuel ratio in the exhaust gas which is recognized from the concentration of oxygen, as represented by a solid-line curve "a" (so-called "Z curve") in FIG. 3. The solid-line curve "a" represents the output characteristics of the $O_2$ sensor 8 when the temperature of the active element 10 is 800° C. The relationship between the temperature of the active element 10 and the output characteristics of the $O_2$ sensor 8 will be described later on.

As indicated by the curve "a" in FIG. 3, the output characteristics of the $O_2$ sensor 8 are generally of such a nature that the output voltage Vout changes substantially linearly with high sensitivity with respect to the air-fuel ratio of the exhaust gas only when the air-fuel ratio represented by the concentration of oxygen in the exhaust gas is present in a narrow air-fuel ratio range Δ near a stoichiometric air-fuel ratio. In the air-fuel ratio range Δ (hereinafter referred to as "high-sensitivity air-fuel ratio range Δ"), the gradient of a change in the output voltage Vout with respect to a change in the air-fuel ratio, i.e., the gradient of the curve of the output characteristics of the $O_2$ sensor 8, is large. In an air-fuel ratio range richer than the high-sensitivity air-fuel ratio range Δ and an air-fuel ratio range leaner than the high-sensitivity air-fuel ratio range Δ, the gradient of a change in the output voltage Vout with respect to a change in the air-fuel ratio, i.e., the gradient of the curve of the output characteristics of the $O_2$ sensor 8, is smaller.

The wide-range air-fuel ratio sensor 9, which will not be described in detail below, comprises an air-fuel ratio sensor disclosed in Japanese laid-open patent publication No. 4-369471 by the applicant of the present application, for example. The wide-range air-fuel ratio sensor 9 is a sensor for generating an output voltage KACT which changes linearly with respect to the air-fuel ratio in the exhaust gas. The output voltage Vout of the $O_2$ sensor 8 and the output voltage KACT of the wide-range air-fuel ratio sensor 9 will hereinafter be referred to as "output Vout" and "output KACT", respectively.

As shown in FIG. 1, the apparatus according to the present embodiment also has a control unit 16 for controlling the air-fuel ratio in the exhaust gas and controlling the temperature of the active element 10 of the $O_2$ sensor 8. The control unit 16 comprises a microcomputer including a CPU, a RAM, and a ROM (not shown). For carrying out a control process to be described later on, the control unit 16 is supplied with the outputs Vout and KACT from the $O_2$ sensor 8 and the wide-range air-fuel ratio sensor 9, and also with data representing the rotational speed NE of the engine 1, the intake pressure PB (the absolute pressure in the intake pipe of the engine 1), and a detected value of the atmospheric temperature TA, from sensors (not shown) combined with the engine 1. The ROM of the control unit 16 corresponds to a recording medium according to the present invention.

The control unit 16 has as its functional means an air-fuel ratio control means 17 for controlling the air-fuel ratio in the exhaust gas emitted from the engine 1, and a sensor temperature control means 18 for controlling the temperature of the active element 10 of the $O_2$ sensor 8.

The air-fuel ratio control means 17 controls the air-fuel ratio in the exhaust gas supplied from the engine 1 to the catalytic converter 4 in order to achieve a good purifying ability (purification rate) of the catalytic converter 4 to purify CO (carbon monoxide), HC (hydrocarbon), and NOx (nitrogen oxide). When the $O_2$ sensor 8 of the above output characteristics is disposed downstream of the catalytic converter 4, a good purifying ability of the catalytic converters to purify CO, HC, and NOx can be achieved irrespective of the deteriorated state of the catalytic converter 4 by controlling the air-fuel ratio in the exhaust gas supplied to the catalytic converter 4, i.e., the air-fuel ratio in the exhaust gas upstream of the catalytic converter 4, to settle the output Vout of the $O_2$ sensor 8 at a certain predetermined value Vop (see FIG. 3).

Specifically, the air-fuel ratio control means 17 uses the predetermined value Vop as a target value for the output Vout of the $O_2$ sensor 8, and controls the air-fuel ratio in the exhaust gas supplied from the engine 1 to the catalytic converter 4 in order to settle and keep the output Vout of the $O_2$ sensor 8 at the target value Vop. Such an air-fuel ratio control process is carried out by determining a target air-fuel ratio in the exhaust gas supplied to the catalytic converter 4 according to a feedback control process in order to converge the output Vout of the $O_2$ sensor 8 to the target value Vop, and adjusting the amount of fuel to be supplied to the engine 1 according to a feedback control process in order to converge the output KACT (a detected value of the air-fuel ratio) of the wide-range air-fuel ratio sensor 9 to the target air-fuel ratio. Specific details of the air-fuel ratio control process carried by the air-fuel ratio control means 17 do not constitute an essential feature of the present invention, and will not be described below. The air-fuel ratio control process carried by the air-fuel ratio control means 17 is carried out as described in paragraphs [0071]-[0362] in the specification of Japanese laid-open patent publication No. 11-324767 or U.S. Pat. No. 6,188,953, for example.

The output characteristics of the $O_2$ sensor 8 change depending on the temperature of the active element 10 thereof. In FIG. 3, the solid-line curve "a", a broken-line curve "b", a dot-and-dash-line curve "c", and a two-dot-and-dash-line curve "d" represent the output characteristics of the $O_2$ sensor 8 when the active element 10 has temperatures of 800° C., 750° C., 700° C., and 600° C., respectively. As can be seen from FIG. 3, if the temperature of the active element 10 changes in a temperature range lower than 750° C., then the gradient (sensitivity) of a change in the output Vout of the $O_2$ sensor 8 in the vicinity of the stoichiometric air-fuel ratio (the high-sensitivity air-fuel ratio range Δ) and the level of the output Vout at air-fuel ratios richer than the high-sensitivity air-fuel ratio range Δ tend to change. If the temperature of the active element 10 is 750° C. or higher, then a change in the output characteristics of the $O_2$ sensor 8 with respect to a change in the temperature of the active element 10 is so small that the output characteristics of the $O_2$ sensor 8 are substantially constant.

Since the output characteristics of the $O_2$ sensor 8 change depending on the temperature of the active element 10 as described above, the control properties (stability and quick response) of the air-fuel ratio control means 17 are likely to be lowered depending on the temperature of the active element 10. This is because in controlling the air-fuel ratio in the exhaust gas in order to keep the output Vout of the $O_2$ sensor 8 at the target value Vop, the output characteristics of the $O_2$ sensor 8 in the vicinity of the stoichiometric air-fuel ratio, i.e., the output characteristics of the $O_2$ sensor 8 in the high-sensitivity air-fuel ratio range Δ, are liable to greatly affect those control properties. The target value Vop for the output Vout of the $O_2$ sensor 8 to keep well the ability of the catalyst 7 of the catalytic converter 4 to purify the exhaust gas also changes depending on the temperature of the active element 10 in a temperature range lower than 750° C. Therefore, it is preferable to keep the temperature of the active element 10 of the $O_2$ sensor 8 basically at a constant level for the purpose of well controlling the air-air ratio with the air-fuel ratio control means 17, i.e., controlling the output Vout of the $O_2$ sensor 8 at the target value Vop, and achieving a good purifying ability of the catalytic converter 4.

If the temperature of the active element 10 of the O₂ sensor 8 is 750° C. or higher, then the output characteristics of the O₂ sensor 8 are substantially constant and stable. According to the inventors' knowledge, if the temperature of the active element 10 is kept at a temperature equal or higher than 750° C., e.g., 800° C., then the target value Vop for the output Vout of the O₂ sensor 8 to keep well the ability of the catalyst 7 of the catalytic converter 4 to purify the exhaust gas is present in an area denoted by Y on the curve "a" in FIG. 3, i.e., an inflection point Y where the gradient of the curve "a" representing the output characteristics of the O₂ sensor 8 switches from a larger value to a smaller value as the air-fuel ratio becomes richer. At this time, the air-fuel ratio can be controlled to keep the output Vout of the O₂ sensor 8 at the target value Vop. The reason for the above air-fuel control appears to be that the sensitivity of the out-put Vout of the O₂ sensor 8 to the air-fuel ratio at the inflection point Y is neither excessively high nor small, but is appropriate.

According to the present embodiment, the sensor temperature control means 18 controls the ceramic heater 13 to keep the temperature of the active element 10 of the O₂ sensor 8 at a desired temperature which is basically equal to or higher than 750° C., e.g., 800° C. A control process carried out by the sensor temperature control means 18 will be described below.

Figure 4:
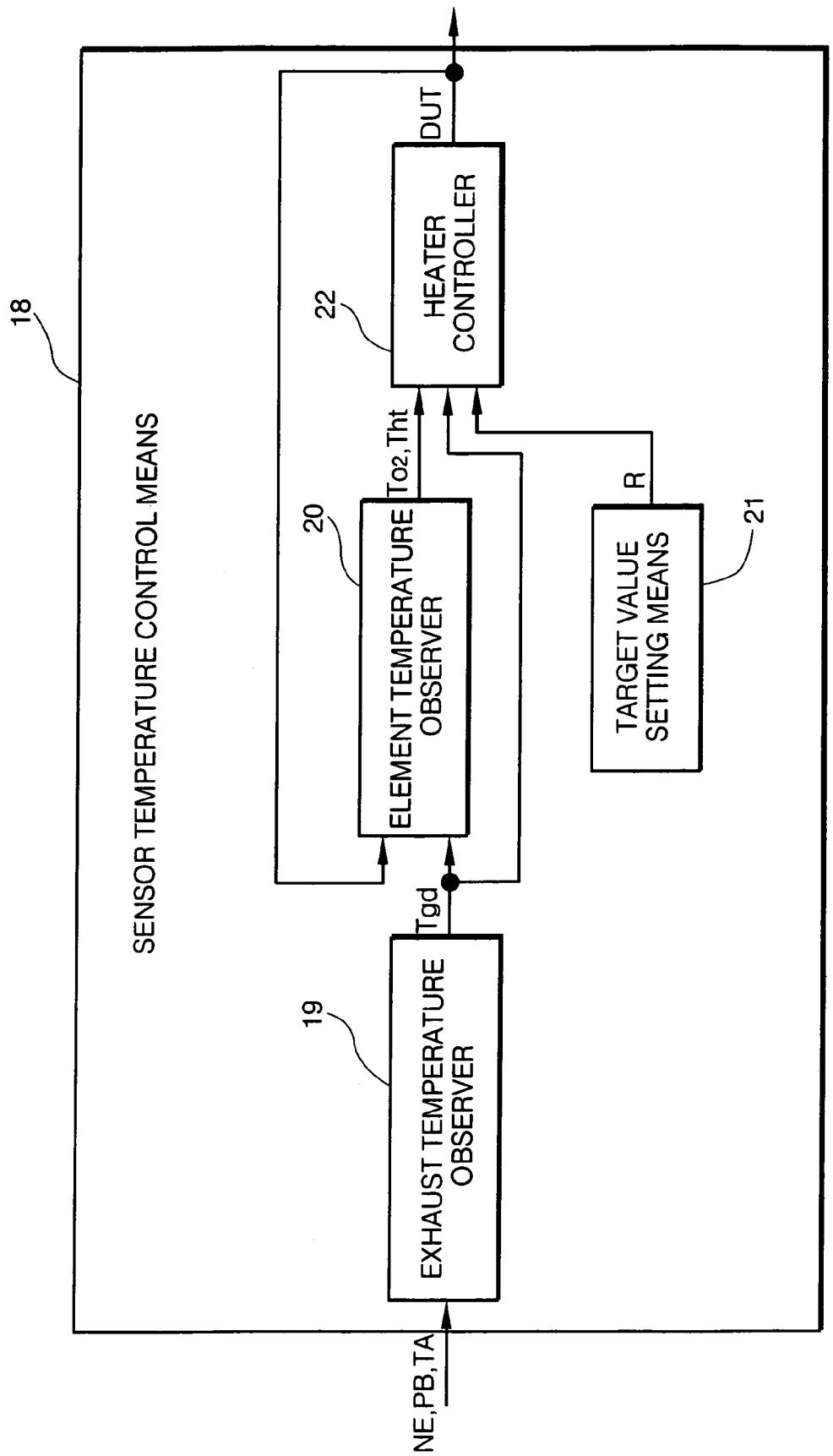
FIG. 4 is a block diagram showing a functional arrangement of a sensor temperature control means in the apparatus shown in FIG. 1.
Figure 5:
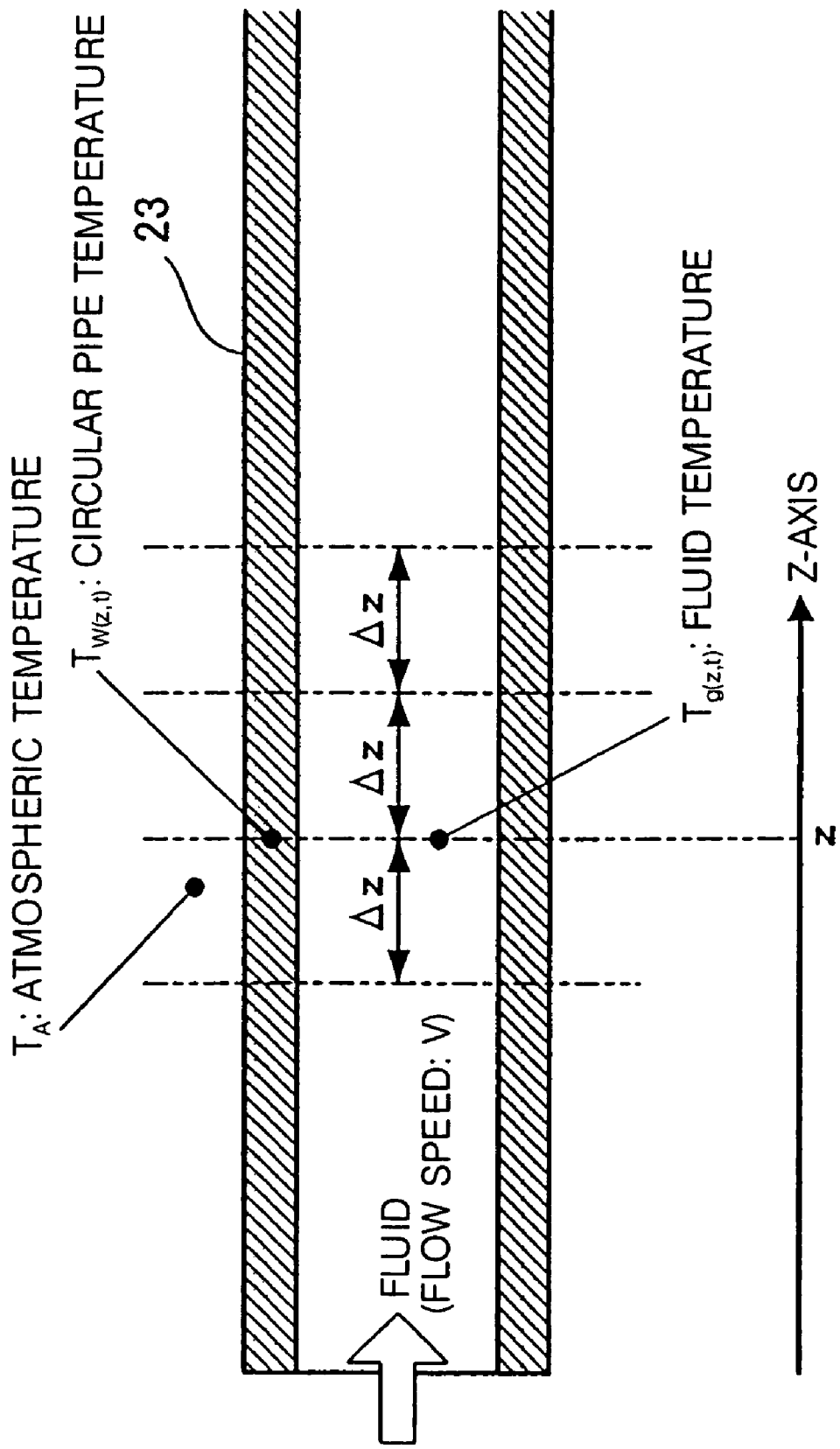
FIG. 5 is a cross-sectional view showing how an exhaust temperature observer in the sensor temperature control means shown in FIG. 4 operates.

As shown in FIG. 4, the sensor temperature control means 18 has as its major functions an exhaust temperature observer 19 (exhaust gas temperature estimating means) for sequentially estimating an exhaust gas temperature Tgd in the exhaust passage 3 near the O₂ sensor 8, i.e., at an intermediate portion of the exhaust pipe 6b, an element temperature observer 20 for estimating the temperature $T_{O2}$ of the active element 10 of the O₂ sensor 8 and the temperature Tht of the ceramic heater 13 using the estimated value of the exhaust gas temperature Tgd, a target value setting means 21 for setting a target value R for the temperature of the active element 10, and a heater controller 22 (heater control means) for controlling energization of the ceramic heater 13, i.e., controlling the electric energy supplied to the ceramic heater 13, using the estimated values of the temperature $T_{O2}$ of the active element 10 and the temperature Tht of the ceramic heater 13, the target value R, and the estimated value of the exhaust gas temperature Tgd.

In the present embodiment, the ceramic heater 13 is controlled for its energization (PWM control) by giving a pulsed voltage to a heater energization circuit (not shown). The amount of electric energy supplied to the ceramic heater 13 is determined by the duty cycle DUT of the pulsed voltage (the ratio of the pulse duration to one period of the pulsed voltage). The heater controller 22 uses the duty cycle DUT of the pulsed voltage applied to the heater energization circuit as a control input (manipulated variable) for controlling the ceramic heater 13, and adjusts the duty cycle DUT to control the amount of electric energy supplied to the ceramic heater 13 and hence the amount of heat generated by the ceramic heater 13. The duty cycle DUT generated by the heater controller 22 is also used in a processing sequence of the element temperature observer 20.

According to the present embodiment, the portion of the exhaust passage 3 which extends from the exhaust port 2 of the engine 1 to the position where the O₂ sensor 8 is located, i.e., the exhaust passage 3 upstream of the O₂ sensor 8, is divided into a plurality of (four in the present embodiment) partial exhaust passageways 3a, 3b, 3c, 3d along the direction in which the exhaust passage 3 exhaust tends, i.e., the direction in which the exhaust gas flows. The exhaust temperature observer 19 estimates, in a predetermined cycle time (period), the temperature of the exhaust gas at the exhaust port 2 (the inlet of the exhaust passage 3) and the temperatures of the exhaust gas in the respective partial exhaust passageways 3a, 3b, 3c, 3d, or specifically, the temperatures of the exhaust gas in the downstream ends of the respective partial exhaust passage-ways 3a, 3b, 3c, 3d, successively in the downstream direction. Of the partial exhaust passageways 3a, 3b, 3c, 3d, the partial exhaust passageways 3a, 3b are two partial exhaust passageways divided from the exhaust passage 3 up-stream of the catalytic converter 4, i.e., the exhaust passage defined by the exhaust pipe 6a, the partial exhaust passageway 3c is a partial exhaust passageway extending from the inlet to outlet of the catalytic converter 4, i.e., the exhaust passage defined in the catalyst 7 in the catalytic converter 4, and the partial exhaust passageway 3d is a partial exhaust passageway extending from the outlet of the catalytic converter 4 to the position where the O₂ sensor 8 is located. The exhaust temperature observer 19 has its algorithm constructed as follows:

The temperature of the exhaust gas at the exhaust port 2 of the engine 1 basically depends on the rotational speed NE and the intake pressure PB of the engine 1 while the engine 1 is operating in a steady state in which the rotational speed NE and the intake pressure PB are kept constant. Therefore, the temperature of the exhaust gas at the exhaust port 2 can basically be estimated from detected values of the rotational speed NE and the intake pressure PB, which serve as parameters indicative of the operating state of the engine 1, based on a predetermined map which has been established by way of experimentation, for example. If the operating state (the rotational speed NE and the intake pressure PB) of the engine 1 varies, then the temperature of the exhaust gas at the exhaust port 2 suffers a time lag or delay in the response to the exhaust gas temperature determined by the map (hereinafter referred to as "basic exhaust gas temperature TMAP(NE,PB)").

According to the present embodiment, the exhaust temperature observer 19 determines, in a predetermined cycle time (processing period), the basic exhaust gas temperature TMAP(NE,PB) from the detected values (latest detected values) of the rotational speed NE and the intake pressure PB of the engine 1 based on the map, and thereafter sequentially estimates an exhaust gas temperature Texg at the exhaust port 2 as a value which follows, with a time lag of first order, the basic exhaust gas temperature TMAP(NE, PB) as expressed by the following equation (1):

$$Texg(k)=(1-Ktex)\cdot Texg(k-1)+Ktex\cdot TMAP(NE,PB) \qquad (1)$$

where k represents the ordinal number of a processing period of the exhaust temperature observer 19, and Ktex a coefficient (lag coefficient) predetermined by way of experimentation or the like (0<Ktex<1). In the present embodiment, the intake pressure PB of the engine 1 serves as a parameter representative of the amount of intake air introduced into the engine 1. Therefore, if a flow sensor is used for directly detecting the amount of intake air introduced into the engine 1, then the output of the flow sensor, i.e., a detected value of the amount of intake air, may be used instead of the detected value of the intake pressure PB.

Using the estimated value of the exhaust gas temperature Texg at the exhaust port 2, the temperatures of the exhaust gas in the respective partial exhaust passageways 3a, 3b, 3c, 3d are estimated as described below. For illustrative purpose, a general heat transfer that occurs when a fluid flows through a circular tube 3 (see FIG. 5) which extends in the direction of a Z-axis in the atmosphere while exchanging heat with the tube wall of the circular tube 3 will be described below. It is assumed that the fluid temperature Tg and the temperature Tw of the tube wall (hereinafter referred to as "circular tube temperature Tw") are functions Tg(t,z), Tw(t,z) of the time t and the position z in the direction of the Z-axis, the thermal conductivity of the tube wall of the circular tube 23 is infinite in the radial direction and nil in the direction of the Z-axis. It is also assumed that the heat transfer between the fluid and the tube wall of the circular tube 23 and the heat transfer between the tube wall of the circular tube 23 and the external atmosphere are proportional to their temperature differences according to the Newton law of cooling. At this time, the following equations (2-1), (2-2) are satisfied:

$$S_g \cdot \rho_g \cdot C_g \cdot \left(\frac{\partial Tg}{\partial t} + V \cdot \frac{\partial Tg}{\partial z}\right) = \alpha 1 \cdot U \cdot (Tw - Tg) \quad (2\text{-}1)$$

$$S_w \cdot \rho_w \cdot C_w \cdot \frac{\partial Tw}{\partial t} = \alpha 1 \cdot U \cdot (Tg - Tw) + \alpha 2 \cdot U \cdot (T_A - Tw) \quad (2\text{-}2)$$

where $S_g$, $\rho_g$, $C_q$ represent the density and specific heat of the fluid and the cross-sectional area of the fluid passage, respectively, $S_w$, $\rho_w$, $C_w$ the density, specific heat, and cross-sectional area of the tube wall of the circular tube 23, respectively, V the speed of the fluid flowing through the circular tube 23, $T_A$ the atmospheric temperature outside of the circular tube 23, U the inner circumferential length of the circular tube 23, $\alpha_1$ the heat transfer coefficient between the fluid and the tube wall of the circular tube 23, and $\alpha_2$ the heat transfer coefficient between the tube wall of the circular tube 23 and the atmosphere. It is assumed that the atmospheric temperature $T_A$ is kept constant around the circular tube 23.

The above equations (2-1), (2-2) are modified into the following equations (3-1), (3-2):

$$\frac{\partial Tg}{\partial t} = -V \cdot \frac{\partial Tg}{\partial z} + a \cdot (Tw - Tg) \quad (3\text{-}1)$$

$$\frac{\partial Tw}{\partial t} = b \cdot (Tg - Tw) + c \cdot (T_A - Tw) \quad (3\text{-}2)$$

where a, b, c represent constants, $a = \alpha_1 \cdot U/(S_g \cdot \rho_g \cdot C_g)$, $b = \alpha_1 \cdot U/(S_w \cdot \rho_w \cdot C_w)$, $c = \alpha_2 \cdot U/(S_w \cdot \rho_w \cdot C_w)$.

The first term on the right side of the equation (3-1) is a shifting flow term representing a time-dependent rate of change of the fluid temperature Tg (a change in the temperature per unit time) depending on the temperature gradient in the flowing direction of the fluid and the speed of the fluid in a position z. The second term on the right side of the equation (3-1) is a heat transfer term representing a time-dependent rate of change of the fluid temperature Tg (a change in the temperature per unit time) depending on the difference between the fluid temperature Tg and the circular tube temperature Tw in the position z, i.e., a time-dependent rate of change of the fluid temperature Tg which is caused by the heat transfer between the fluid and the tube wall of the circular tube 23. Therefore, the equation (3-1) indicates that the time-dependent rate $\partial Tg/\partial t$ of change of the fluid temperature Tg in the position z depends on the temperature change component of the shifting flow term and the temperature change component of the heat transfer term, i.e., the sum of those temperature change components.

The first term on the right side of the equation (3-2) is a heat transfer term representing a time-dependent rate of change of the circular tube temperature Tw (a change in the temperature per unit time) depending on the difference between the circular tube temperature Tw and the fluid temperature Tg in the position z, i.e., a time-dependent rate of change of the circular tube temperature Tw which is caused by the heat transfer between the fluid and the tube wall of the circular tube 23 in the position z. The second term on the right side of the equation (3-2) is a heat radiation term representing a time-dependent rate of change of the circular tube temperature Tw (a change in the temperature per unit time) depending on the difference between the circular tube temperature Tw and the atmospheric temperature $T_A$ outside of the circular tube 23 in the position z, i.e., a time-dependent rate of change of the circular tube temperature Tw depending on the heat radiation from the tube wall of the circular tube 23 into the atmosphere in the position z. The equation (3-2) indicates that the time-dependent rate $\partial Tw/\partial t$ of change of the circular tube temperature Tw in the position z depends on the temperature change component of the heat transfer term and the temperature change component of the heat radiation term, i.e., the sum of those temperature change components.

According to the calculus of finite differences, the equations (3-1), (3-2) can be rewritten into the following equations (4-1), (4-2):

$$Tg(t + \Delta t, z) = Tg(t, z) - \frac{V \cdot \Delta t}{\Delta z} \cdot (Tg(t, z) - Tg(t, z - \Delta z)) + \quad (4\text{-}1)$$
$$a \cdot \Delta t \cdot (Tw(t, z) - Tg(t, z))$$

$$Tw(t + \Delta t, z) = Tw(t, z) - b \cdot \Delta t \cdot (Tg(t, z) - Tw(t, z)) + \quad (4\text{-}2)$$
$$c \cdot \Delta t \cdot (T_A - Tw(t, z))$$

The above equations (4-1), (4-2) indicate that if the fluid temperature Tg(t,z) and the circular tube temperature Tw(t,z) in the position z at the time t, and the fluid temperature Tg(t,z−Δz) in a position z−Δz which precedes the position z (upstream thereof) at the time t are known, then the fluid temperature Tg(t+Δt,z) and the circular tube temperature Tw(t+Δt,z) in the position z at a next time t+Δt can be determined, and that the fluid temperatures Tg and the circular tube temperatures Tw in successive positions z+Δz, z+2Δz, . . . can be determined by solving the equations (4-1), (4-2) simultaneously in sequence for those positions. Specifically, if initial values of the fluid temperature Tg and the circular tube temperature Tw (initial values at t=0) are given in the positions z, z+Δz, z+2Δz, . . . , and the fluid temperature Tg(t,0) at an origin (e.g., the inlet of the circular tube 23) in the direction of the Z-axis of the circular tube 23 is given (it is assumed that z·Δz=0), then the fluid temperatures Tg and the circular tube temperatures Tw in successive positions z, z+Δz, z+2Δz, . . . at successive times t, t+Δt, t+2Δt, . . . can be calculated.

The fluid temperature Tg(t,z) in the position z can be calculated by cumulatively adding (integrating), to the initial value Tg(0,z), the temperature change component depending on the fluid speed V and the temperature gradient in the position z (the temperature change component represented by the second term of the equation (4-1)) and the temperature change component depending on the difference between the fluid temperature Tg and the circular tube temperature Tw in the position z (the temperature change component represented by the third term of the equation (4-1)), at each given time interval. The fluid temperatures in the other positions z+Δz, z+2Δz, . . . can similarly be calculated. The circular tube temperature Tw(t,z) in the position z can be calculated by cumulatively adding (integrating), to the initial value Tw(0,z), the temperature change component depending on the difference between the fluid temperature Tg and the circular tube temperature Tw in the position z (the temperature change component represented by the second term of the equation (4-2)) and the temperature change component depending on the difference between the circular tube temperature Tw and the atmospheric temperature $T_A$ in the position z (the temperature change component represented by the third term of the equation (4-2)), at each given time interval.

In the present embodiment, the exhaust temperature observer 19 uses the model equations (4-1), (4-2) and determines the temperatures of the exhaust gas in the respective partial exhaust passageways 3a, 3b, 3c, 3d as follows:

Of the partial exhaust passageways 3a, 3b, 3c, 3d, each of the partial exhaust passageways 3a, 3b is defined by the exhaust pipe 6a. In order to estimate the temperatures of the exhaust gas in the partial exhaust passageways 3a, 3b, the temperature changes depending on the speed of the exhaust gas and the temperature gradient thereof (the temperature gradient in the direction in which the exhaust gas flows9, the heat transfer between the exhaust gas and the exhaust pipe 6a, and the heat radiation from the exhaust pipe 6a into the atmosphere are taken into account in the same manner as described above with respect to the circular tube 23.

An estimated value of the exhaust gas temperature Tga in the partial exhaust passageway 3a and an estimated value of the temperature Twa (hereinafter referred to as "exhaust pipe temperature Twa") of the exhaust pipe 6a in the partial exhaust passageway 3a are determined by respective model equations (5-1), (5-2), shown below, in each cycle time of the processing sequence of the exhaust temperature observer 19. An estimated value of the exhaust gas temperature Tgb in the partial exhaust passageway 3b and an estimated value of the exhaust pipe temperature Twb in the partial exhaust passageway 3b are determined by respective model equations (6-1), (6-2), shown below, in each cycle time of the processing sequence of the exhaust temperature observer 19. More specifically, the exhaust gas temperature Tga and the exhaust pipe temperature Twa that are determined by the equations (5-1), (5-2) represent estimated values of the temperatures in the vicinity of the downstream end of the partial exhaust passageway 3a. Likewise, the exhaust gas temperature Tgb and the exhaust pipe temperature Twb that are determined by the equations (6-1), (6-2) represent estimated values of the temperatures in the vicinity of the downstream end of the partial exhaust passageway 3b.

$$Tga(k+1) = Tga(k) - Vg \cdot \frac{dt}{La} \cdot (Tga(k) - Texg(k)) + \quad (5\text{-}1)$$
$$Aa \cdot dt \cdot (Twa(k) - Tga(k))$$

$$Twa(k+1) = Twa(k) + Ba \cdot dt \cdot (Tga(k) - Twa(k)) + \quad (5\text{-}2)$$
$$Ca \cdot dt \cdot (T_A(k) - Twa(k))$$

$$Tgb(k+1) = Tgb(k) - Vg \cdot \frac{dt}{Lb} \cdot (Tgb(k) - Tga(k)) + \quad (6\text{-}1)$$
$$Ab \cdot dt \cdot (Twb(k) - Tgb(k))$$

-continued
$$Twb(k+1) = Twb(k) + Bb \cdot dt \cdot (Tgb(k) - Twb(k)) + \quad (6\text{-}2)$$
$$Cb \cdot dt \cdot (T_A(k) - Twb(k))$$

In the equations (5-1), (5-2), (6-1), (6-2), dt represents the period (cycle time) of the processing sequence of the exhaust temperature observer 19, and corresponds to Δt in the equations (4-1), (4-2). In the equations (5-1), (6-1), La, Lb represent the respective lengths (fixed values) of the partial exhaust passageways 3a, 3b, and correspond to Δz in the equation (4-1). Aa, Ba, Ca in the equations (5-1), (5-2) and Ab, Bb, Cb in the equations (6-1), (6-2) represent model coefficients corresponding respectively to a, b, c in the equations (4-1), (4-2), and the values of those model coefficients are set (identified) in advance by way of experimentation or simulation. In the equations (5-1), (6-1), Vg represents a parameter (to be determined as described later on) indicative of the speed of the exhaust gas, and corresponds to V in the equation (4-1).

The exhaust gas temperature Texg(k) (the exhaust gas temperature at the exhaust port 2) which is required to calculate a new estimated value Tga(k+1) of the exhaust gas temperature Tga according to the equation (5-1) is basically of the latest value determined according to the equation (1). Similarly, the exhaust gas temperature Tga(k) (the exhaust gas temperature in the partial exhaust passageway 3a) which is required to calculate a new estimated value Tgb(k+1) of the exhaust gas temperature Tgb according to the equation 6-1) is basically of the latest value determined according to the equation (5-1). The atmospheric temperature $T_A(k)$ which is required in the calculation of the equations (5-2), (6-2) is of the latest value of the atmospheric temperature detected by an atmospheric temperature sensor (in the present embodiment, a sensor on the engine 1 is used for this atmospheric temperature sensor), not shown. In the present embodiment, the gas speed parameter Vg which is required in the calculation of the equations (5-1), (6-1) is of a value which is calculated from latest detected values of the rotational speed NE and the intake pressure PB according to the following equation (7):

$$Vg = \frac{NE}{NEBASE} \cdot \frac{PB}{PBBASE} \quad (7)$$

where NEBASE, PBBASE represent a predetermined rotational speed and a predetermined intake pressure, which are set to, for example, the maximum rotational speed of the engine 1 and 760 mmHg (≈101 kPa), respectively. The gas speed parameter Vg calculated according to the equation (7) is proportional to the speed of the exhaust gas, with Vg≦1.

In the present embodiment, initial values Tga(0), Twa(0), Tgb(0), Twb(0) of the estimated values for the exhaust gas temperature Tga, the exhaust pipe temperature Twa, the exhaust gas temperature Tgb, and the exhaust pipe temperature Twb are set to the atmospheric temperature which is detected by the atmospheric temperature sensor (not shown) when the engine 1 has started to operated (upon an engine startup).

The partial exhaust passageway 3c is defined by the catalyst 7 in the catalytic converter 4. The catalyst 7 generates heat by itself due to its own exhaust gas purifying action (specifically, an oxidizing/reducing action), and the amount of heat (the amount of heat per unit time) generated by the catalyst 7 is substantially in proportion to the speed of the exhaust gas. This is because as the speed of the exhaust gas is higher, the exhaust gas components reacting with the catalyst 7 per unit time increase.

According to the present embodiment, for estimating the exhaust gas temperature in the partial exhaust passageway 3c with high accuracy, the generation of heat by the catalyst 7 in the catalytic converter 4 as well as the temperature change depending on the speed and temperature gradient of the exhaust gas, the heat transfer between the exhaust gas and the catalyst 7, and the heat radiation from the catalyst 7 into the atmosphere are taken into account.

An estimated value of the exhaust gas temperature Tgc in the partial exhaust passageway 3c and an estimated value of the temperature Twc (hereinafter referred to as "catalyst temperature Twc") of the catalyst 7 which defines the partial exhaust passageway 3c are determined by respective model equations (8-1), (8-2), shown below, in each cycle time of the processing sequence of the exhaust temperature observer 19. More specifically, the exhaust gas temperature Tgc and the catalyst temperature Twc that are determined by the equations (8-1), (8-2) represent estimated values of the temperatures in the vicinity of the downstream end of the partial exhaust passageway 3c, i.e., in the vicinity of the outlet of the catalytic converter 4.

$$Tgc(k+1) = Tgc(k) - Vg \cdot \frac{dt}{Lc} \cdot (Tgc(k) - Tgb(k)) + \quad (8\text{-}1)$$

$$Ac \cdot dt \cdot (Twc(k) - Tgc(k))$$

$$Twc(k+1) = Twc(k) + Bc \cdot dt \cdot (Tgc(k) - Twc(k)) + \quad (8\text{-}2)$$

$$Cc \cdot dt \cdot (T_A(k) - Twc(k)) + Dc \cdot dt \cdot Vg$$

In the equation (8-1), Lc represents the length (fixed value) of the partial exhaust passageway 3c, and corresponds to Δz in the equation (4-1). Ac, Bc, Cc in the equations (8-1), (8-2) represent model coefficients corresponding respectively to a, b, c in the equations (4-1), (4-2), and the values of those model coefficients are set (identified) in advance by way of experimentation or simulation. The fourth term on the right side of the equation (8-2) represents a temperature change component of the catalyst 7 in the catalytic converter 4 due to the heating of the catalyst 7 by itself, i.e., the temperature change per period of the processing sequence of the exhaust temperature observer 19, and is proportional to the gas speed parameter Vg. As with Ac through Cc, Dc in the fourth term represents a model coefficient is set (identified) in advance by way of experimentation or simulation. Therefore, the equation (8-2) corresponds to the combination of the right side of the equation (4-2) with a temperature change component due to the heating of a passage-defining member (the catalyst 7).

dt, Vg in the equations (8-1), (8-2) have the same meanings and values as those in the equations (5-1) through (6-2). The value of $T_A$ used in the calculation of the equation (8-2) is identical to those used in the equation (5-2), (6-2). In the present embodiment, the initial values Tgc(0), Twc(0) of the exhaust gas temperature Tgc and the catalyst temperature Twc are equal to the detected value of the atmospheric temperature at the-time the engine 1 has started to operate, as with the equations (5-1) through (6-2).

The partial exhaust passageway 3d is defined by the exhaust pipe 6b similar to the exhaust pipe 6a which define the partial exhaust passageways 3a, 3b. The exhaust gas temperature Tgd in the partial exhaust passageway 3d and the exhaust pipe temperature Twa of the exhaust pipe 6b, or more specifically the temperature at the downstream end of the partial exhaust passageway 3d, are determined respectively by the following equations (9-1), (9-2) which are similar to the equations (5-1) through (6-2):

$$Tgd(k+1) = Tgd(k) - Vg \cdot \frac{dt}{Ld} \cdot (Tgd(k) - Tgc(k)) + \quad (9\text{-}1)$$

$$Ad \cdot dt (Twd(k) - Tgd(k))$$

$$Twd(k+1) = Twd(k) + Bd \cdot dt \cdot (Tgd(k) - Twd(k)) + \quad (9\text{-}2)$$

$$Cd \cdot dt \cdot (T_A(k) - Twd(k))$$

In the equation (9-1), Ld represents the length (fixed value) of the partial exhaust passageway 3d, and corresponds to Δz in the equation (4-1). Ad, Bd, Cd in the equations (9-1), (9-2) represent model coefficients corresponding respectively to a, b, c in the equations (4-1), (4-2), and the values of those model coefficients are set (identified) in advance by way of experimentation or simulation.

dt, Vg in the equations (9-1), (9-2) have the same meanings and values as those in the equations (5-1) through (6-2). The value of $T_A$ used in the calculation of the equation (9-2) is identical to those used in the equation (5-2), (6-2), (8-2). The initial values Tgd(0), Twd(0) of the exhaust gas temperature Tgd and the catalyst temperature Twd are equal to the detected value of the atmospheric temperature at the time the engine 1 has started to operate, as with the equations (5-1) through (6-2).

The processing sequence of the exhaust temperature observer 19, as described above, determines estimated values of the exhaust gas temperatures Texg, Tga, Tgb, Tgc, Tgd in the exhaust port 2 of the engine 1 and the partial exhaust passageways 3a, 3b, 3c, 3d successively downstream in each cycle time. The estimated value of the exhaust gas temperature Tgd in the partial exhaust passageway 3d which is located most downstream corresponds to the temperature of the exhaust gas in the vicinity of the location of the $O_2$ sensor 8. The estimated value of the exhaust gas temperature Tgd is obtained as the estimated value of the exhaust gas temperature in the vicinity of the location of the $O_2$ sensor 8.

Figure 6:
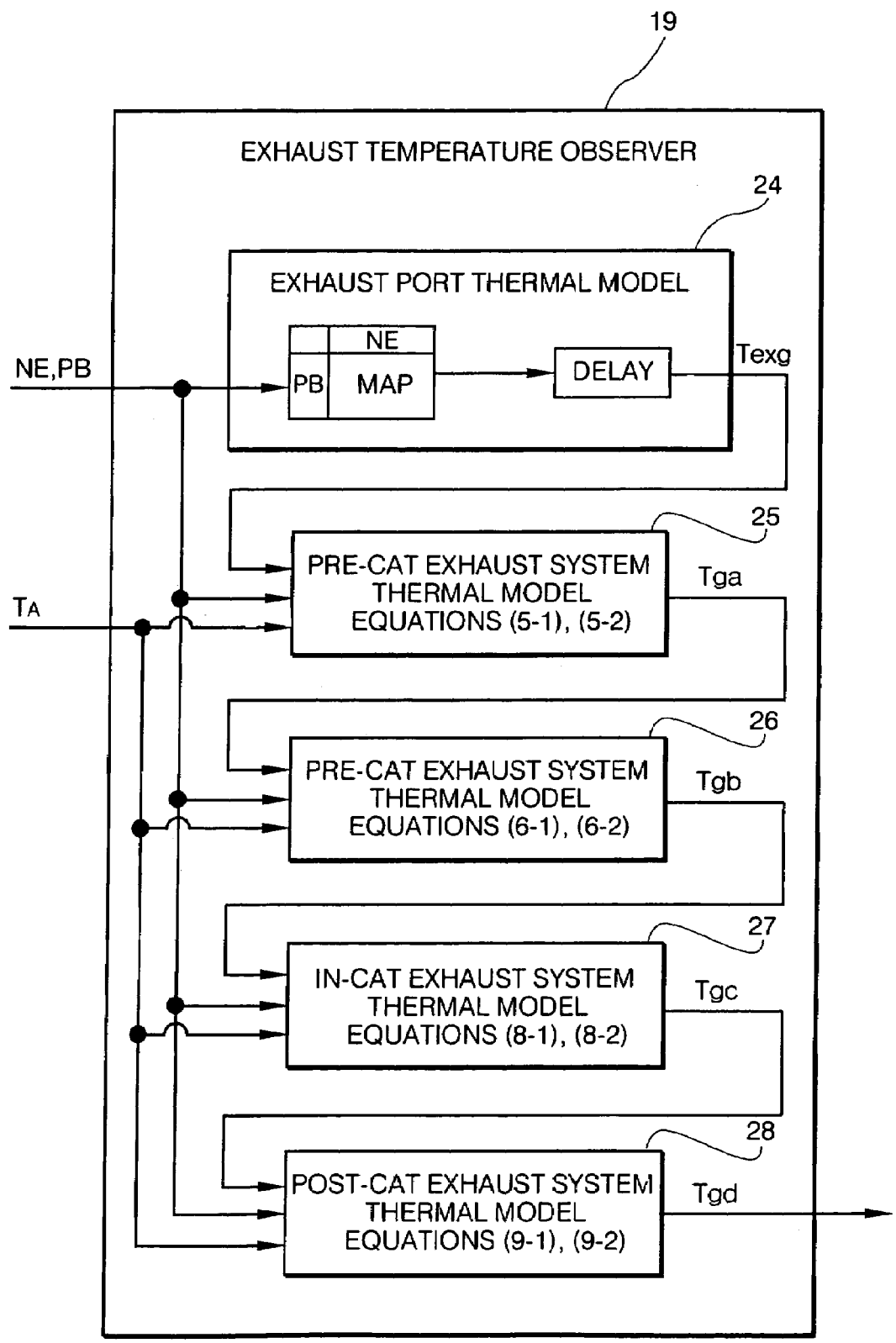
FIG. 6 is a block diagram showing a functional arrangement of the exhaust temperature observer in the sensor temperature control means shown in FIG. 4.

The algorithm of the estimating process of the exhaust temperature observer 19 is shown in block form in FIG. 6. In FIG. 6, the model equation (1) is referred to as an exhaust port thermal model 24, the model equations (5-1), (5-2) and the model equations (6-1), (6-2) as pre-CAT exhaust system thermal models 25, 26, respectively, the model equations (8-1), (8-2) as an in-CAT exhaust system thermal model 27, and the model equations (9-1), (9-2) as a post-CAT exhaust system thermal model 28. As shown in FIG. 6, each of the thermal models 24 through 28 is supplied with the detected values of the rotational speed NE and the intake pressure PB of the engine 1. The detected values of the rotational speed NE and the intake pressure PB which are supplied to the exhaust port thermal model 24 are used to determine the basic exhaust gas temperature TMAP, and the detected values of the rotational speed NE and the intake pressure PB which are supplied to the exhaust system thermal models 25 through 28 are used to determine the value of the gas speed parameter Vg. Each of the thermal models 24 through 28 is also supplied with the detected value of the atmospheric temperature TA. The pre-CAT exhaust system thermal model 25, the pre-CAT exhaust system thermal model 26, the in-CAT exhaust system thermal model 27, and the post-CAT exhaust system thermal model 28 are supplied with the estimated values of the exhaust gas temperatures Texg, Tga, Tgb, Tgc, respectively, which are outputted from the higher-level thermal models 24, 25, 26, 27. The post-CAT exhaust system thermal model 28 eventually produces the estimated value of the exhaust gas temperature Tgd in the vicinity of the location of the $O_2$ sensor 8.

In the present embodiment, the detected value produced by the atmospheric temperature sensor on the engine 1 is used to estimate the temperatures of the passage-defining members (the exhaust pipe 6a, the catalyst 7 in the catalytic converter 4, and the exhaust pipe 6b) which define the partial exhaust passageways 3a, 3b, 3c, 3d. However, the detected value produced by an atmospheric sensor which is disposed outside of the exhaust passage 3 may be used to estimate the temperatures of those passage-defining members.

The element temperature observer 20 will be described below. The element temperature observer 20 estimates the temperature $T_{O2}$ of the active element 10 of the $O_2$ sensor 8 sequentially in given cycle times in view of the thermal transfer between the active element 10 and the exhaust gas held in contact therewith and the thermal transfer between the active element 10 and the ceramic heater 13 (hereinafter referred to simply as "heater 13") which heats the active element 10. The element temperature observer 20 also estimates the temperature Tht of the heater 13 in order to estimate the temperature $T_{O2}$ of the active element 10. In estimating the temperature Tht of the heater 13, the element temperature observer 20 takes into account the heat transfer between the heater 13 and the active element 13 and also the heating of the heater 13 based on the electric energy supplied to the heater 13. The element temperature observer 20 has an estimating algorithm for estimating the temperature $T_{O2}$ and the temperature Tht, which is constructed as follows:

The element temperature observer 20 determines an estimated value of the temperature $T_{O2}$ of the active element 10 (hereinafter referred to as "element temperature $T_{O2}$") and an estimated value of the temperature Tht of the heater 13 (hereinafter referred to as "heater temperature Tht") sequentially in given cycle times respectively according to the following model equations (10-1)., (10-2):

$$T_{O2}(k+1)=T_{O2}(k)+Ax \cdot dt \cdot (Tgd(k))-T_{O2}(k))+Bx \cdot dt \cdot (Tht(k)-T_{O2}(k)) \quad (10\text{-}1)$$

$$Tht(k+1)=Tht(k)-Cx \cdot dt \cdot (Tht(k)-T_{O2}(k))+Dx \cdot dt \cdot DUT(k) \quad (10\text{-}2)$$

The equation (10-1) indicates that the temperature change of the active element 10 in each cycle time depends on a temperature change component (the second term on the right side of the equation (10-1)) depending on the difference between the exhaust gas temperature Tgd in the vicinity of the location of the O2 sensor 8 (the exhaust gas temperature in the partial exhaust passageway 3d) and the element temperature TO2, i.e., a temperature change component which is caused by the heat transfer between the active element 10 and the exhaust gas held in contact therewith, and a temperature change component (the third term on the right hand of the equation (10-1)) depending on the difference between the element temperature TO2 and the heater temperature Tht, i.e., a temperature change component which is caused by the heat transfer between the active element 10 and the ceramic heater 13, i.e., the sum of those temperature change components.

The equation (10-2) indicates that the temperature change of the heater 13 in each cycle time depends on a temperature change component (the second term on the right side of the equation (10-2)) depending on the difference between the element temperature TO2 and the heater temperature Tht, i.e., a temperature change component which is caused by the heat transfer between the active element 10 and the heater 13, and a temperature change component depending on the duty cycle DUT that is generated by the heat controller 22 as described later on, i.e., a temperature change component which is caused by the heating of the heater 13 based on the electric energy supplied thereto, i.e., the sum of those temperature change components.

In the equations (10-1), (10-2), Ax, Bx, Cx, Dx represent model coefficients whose values are set (identified) in advance by way of experimentation or simulation, and dt represents the period (cycle time) of the processing sequence of the element temperature observer 20. In the present embodiment, the period dt is set to the same value as the cycle time (represented by dt in the equations (5-1) through (9-2)) of the processing sequence of the exhaust temperature observer 19.

The duty cycle DUT(k) which is required in the calculation of the equation (10-2) is of the latest value of the duty cycle DUT that is calculated by the heater controller 22 as described later on. In the present embodiment, the initial values TO2 (0), Tht(0) of the element temperature TO2 and the heater temperature Tht are equal to the detected value of the atmospheric temperature at the time the engine 1 has started to operate.

The element temperature observer 20 sequentially calculates the estimated values of the element temperature TO2 and the heater temperature Tht according to the estimating algorithm described above.

The heater controller 22 will be described below. The heater controller 22 sequentially generates the duty cycle DUT as a control input (manipulated variable) for controlling the heater 13 according to an optimum predictive control algorithm, and controls the electric energy supplied to the heater 13 with the generated duty cycle DUT.

According to the present embodiment, attention is paid to the difference between the element temperature TO2 and a target value therefore, a change per given time in the difference (corresponding to a rate of change of the difference), and a change per given time in the heater temperature Tht (corresponding to a rate of change of the heater temperature Tht), and model equations for an object to be controlled by the heater controller 22 are introduced using the above differences and changes as state quantities relative to the object to be controlled by the heater controller 22. The heater controller 22 has its algorithm constructed as described below.

First, model equations for the object to be controlled by the heater controller 22 will be described below. Changes ΔTO2, Δht per given time in the element temperature TO2 and the heater temperature Tht are expressed by the following equations (11-1), (11-2) based on the respective model equations (10-1), (10-2) with respect to the element temperature observer 20:

$$\Delta T_{O2}(k+1) = \Delta T_{O2}(k) + Ax \cdot dt \cdot (\Delta Tgd(k) - \Delta T_{O2}(k)) + \quad (11\text{-}1)$$
$$Bx \cdot dt \cdot (\Delta Tht(k) - \Delta T_{O2}(k))$$
$$= (1 - Ax \cdot dt - Bx \cdot dt) \cdot \Delta T_{O2}(k) +$$
$$Ax \cdot dt \cdot \Delta Tgd(k) + Bx \cdot dt \cdot \Delta Tht(k)$$

-continued $$\Delta Tht(k+1) = \Delta Tht(k) - Cx \cdot dt \cdot (\Delta Tht(k) - \Delta T_{O2}(k)) + \quad (11\text{-}2)$$
$$Dx \cdot dt \cdot \Delta DUT(k)$$
$$= (1 - Cx \cdot dt) \cdot \Delta Tht(k) + Cx \cdot dt \cdot \Delta T_{O2}(k) +$$
$$Dx \cdot dt \cdot \Delta DUT(k)$$

In the above equations (11-1), (11-2), $\Delta T_{O2}(k)=T_{O2}(k+1)-T_{O2}(k)$, $\Delta Tht(k)=Tht(k+1)-Tht(k)$, $\Delta Tgd(k)=Tgd(k+1)-Tgd(k)$, $\Delta DUT(k)=DUT(k+1)-DUT(k)$.

A target value for the element temperature $T_{O2}$ is represented by R, and the difference e between the element temperature $T_{O2}$ and the target value R, i.e., the difference in each cycle time (hereinafter referred to as "element temperature difference e"), is defined according to the following equation (12):

$$e(k) = T_{O2}(k) - R(k) \quad (12)$$

A change $\Delta e$ in the element temperature difference e in each cycle time (hereinafter referred to as "element temperature difference change $\Delta e$") is expressed by the following equation (13) based on the above equations (11-1), (12):

$$\Delta e(k+1) = \Delta T_{O2}(k+1) - \Delta R(k+1) \quad (13)$$
$$= (1 - Ax \cdot dt - Bx \cdot dt) \cdot \Delta e(k) + Ax \cdot dt \cdot \Delta Tgd(k) +$$
$$Bx \cdot dt \cdot \Delta Tht(k) - \Delta R(k+1) +$$
$$(1 - Ax \cdot dt - Bx \cdot dt) \cdot \Delta R(k)$$

In the equation (13), $\Delta e(k)=e(k+1)-e(k)$, $\Delta R(k)=R(k+1)-R(k)$. In deriving the equation (13), the equation $\Delta T_{O2}=\Delta e(k)+\Delta R(k)$ (based on the equation (12)) is employed.

The equation $\Delta T_{O2}=\Delta e(k)+\Delta R(k)$ is applied to the equation (11-2), and the resulting equation is modified into the following equation (14):

$$\Delta Tht(k+1)=(1-Cx \cdot dt) \cdot \Delta Tht(k)+Cx \cdot dt \cdot \Delta e(k)+$$
$$Dx \cdot dt \cdot \Delta DUT(k)+Cx \cdot dt \cdot \Delta R(k) \quad (14)$$

If a state quantity vector $X0(k)=(e(k), \Delta e(k), \Delta Tht(k))^T$ (T represents a transposition) is introduced, then the following equation (15) is obtained from the equations (14), (15) and the equation $e(k+1)=e(k)+\Delta e(k)$:

$$X0(k+1) = \Phi \cdot X0(k) + G \cdot \Delta DUT(k) + \quad (15)$$
$$Gd \cdot \Delta Tgd(k) + Gr \cdot R0(k+1)$$

where $$X0(k) = (e(k), \Delta e(k), \Delta Tht(k))^T,$$
$$R0(k+1) = (\Delta R(k+1), \Delta R(k))^T,$$
$$G = (0, 0, Dx \cdot dt)^T,$$
$$Gd = (0, Ax \cdot dt, 0)^T,$$
$$\Phi = \begin{bmatrix} 1 & 1 & 0 \\ 0 & 1 - Ax \cdot dt - Bx \cdot dt & Bx \cdot dt \\ 0 & Cx \cdot dt & 1 - Cx \cdot dt \end{bmatrix}$$

$$Gr = \begin{bmatrix} 0 & 0 \\ -1 & 1 - Ax \cdot dt - Bx \cdot dt \\ 0 & Cx \cdot dt \end{bmatrix}$$

In the equation (15), R0, G, Gd represent vectors defined in the above definition clause, and $\Phi$, Gr represent matrixes defined in the above definition clause.

The above equation (15) is a basic equation of the model of the object to be controlled by the heater controller 22.

In the above description, the period of the control process of the heater controller 22 is the same as the period dt of the processing sequences of the exhaust temperature observer 19 and the element temperature observer 20. Therefore, the period dt is used in the vectors G, Gd and the matrixes $\Phi$, Gr in the equation (15). It is preferable to carry out the processing sequences of the exhaust temperature observer 19 and the element temperature observer 20 in a relatively short period (e.g., a period of 20 through 50 msec.) in order to increase the accuracy with which to estimate the temperatures. However, the period of the control process of the heater controller 22 may be longer than the period dt of the processing sequences of the exhaust temperature observer 19 and the element temperature observer 20 because the response speed of a change in the element temperature in response to the control input (duty cycle DUT) is relatively low (several Hz in terms of frequencies). According to an optimum predictive control process to be described later on, since future values of the target value R of the element temperature $T_{O2}$ need to be stored and held for a certain time, the storage capacity of a memory for storing the target value R becomes large if the period of the control process of the heater controller 22 is short.

According to the present embodiment, the period (cycle time) of the control process of the heater controller 22 is set to a value dtc (e.g., 300 through 500 msec.) longer than the period dt of the processing sequences of the exhaust temperature observer 19 and the element temperature observer 20.

In the present embodiment, the model equation of the object to be controlled by the heater controller 22 is rewritten from the equation (15) into the following equation (16), using the period dtc of the control process of the heater controller 22:

$$X0(n+1) = \Phi \cdot X0(n) + G \cdot \Delta DUT(n) + Gd \cdot \Delta Tgd(n) + Gr \cdot R0(n+1) \quad (16)$$

where $$X0(n) = (e(n), \Delta e(n), \Delta Tht(n))^T,$$
$$R0(n+1) = (\Delta R(n+1), \Delta R(n))^T,$$
$$G = (0, 0, Dx \cdot dtc)^T,$$
$$Gd = (0, Ax \cdot dtc, 0)^T,$$
$$\Phi = \begin{bmatrix} 1 & 1 & 0 \\ 0 & 1 - Ax \cdot dtc - Bx \cdot dtc & Bx \cdot dtc \\ 0 & Cx \cdot dtc & 1 - Cx \cdot dtc \end{bmatrix}$$
$$Gr = \begin{bmatrix} 0 & 0 \\ -1 & 1 - Ax \cdot dtc - Bx \cdot dtc \\ 0 & Cx \cdot dtc \end{bmatrix}$$

The equation (16) is a model equation of the object to be controlled which is actually used in the algorithm of the control process of the heater controller 22. In the equation (16), n represents the ordinal number of the period dtc of the control process of the heater controller 22.

Using the above model equation, the algorithm of the control process of the heater controller 22, i.e., the algorithm of the optimum predictive control process, is constructed as follows: It is assumed that the target value R of the element temperature $T_{O2}$ is set for the future until after Mr steps (until after a multiple by Mr of the period dtc of the control process of the heater controller 22), and the exhaust gas temperature Tgd which acts as a disturbance input is kept at the present value for the future until after Md steps (until after a multiple by Md of the period dtc of the control process of the heater controller 22). The value Mr will be referred to as a target value predicting time Mr, and the value Md as an exhaust gas temperature predicting time Md. These predicting times Mr, Md are represented by integers whose unit is one period dtc of the control process of the heater controller 22.

A controller for generating a control input ΔDUT for minimizing the value of an evaluating function J0 according to the following equation (17) serves as an optimum predictive servo controller:

$$J0 = \sum_{n=-M+1}^{\infty} [X0^T(n) \cdot Q0 \cdot X0(n) + \Delta DUT^T(n) \cdot H0 \cdot \Delta DUT(n)] \quad (17)$$

where M represents a larger one of the target value predicting time Mr And the exhaust gas temperature predicting time Md, i.e., M=max(Mr,Md), and Q0, H0 weighted matrixes for adjusting the convergence of the state quantity vector X0 and the power (size) of the control input ΔDUT. Q0 represents a 3-row, 3-column diagonal matrix as X0 is a cubic matrix, and H0 is a Scalar quantity as ΔDUT is a Scalar quantity. In the present embodiment, in order to reduce the power consumption of the heater 13, Q0 is set to a unit matrix (a diagonal matrix whose all diagonal components are "1") and H0 is set to a value (e.g., 1000) greater than the diagonal components of the matrix Q0. The target value predicting time Mr is set to 20, for example, and the exhaust gas temperature predicting time Md is set to 10, for example, with the period of the control process of the heater controller 22 being in the range from 300 to 500 msec.

The control input ΔDUT for minimizing the value of the evaluating function according to the equation (17) is expressed by the following equation (18):

$$\Delta DUT(n) = F0 \cdot X0(n) + \sum_{i=1}^{Mr}[Fr0(i) \cdot R0(n+1)] + Fdt \cdot \Delta Tgd(n) \quad (18)$$

In the equation (18), F0 in the first term on the right side represents a cubic row vector (Fs0,Fe0,Fx0), Fr0(i) (i=1, 2, ..., Mr) in the second term (the term of Σ) on the right side represent quadratic row vectors (Fr01(i), Fr02(i), and Fdt in the third term on the right side represents a Scalar quantity. They are expressed by the following equations (19-1) through (19-3):

$$F0 \equiv (Fs0, Fe0, Fx0) \quad (19-1)$$
$$= -[H0 + G^T \cdot P \cdot G]^{-1} \cdot G^T \cdot P \cdot \Phi$$

$$Fr0(i) \equiv (Fr01(i), Fr02(i))(i = 1, 2, ..., Mr) \quad (19-2)$$
$$= -[H0 + G^T \cdot P \cdot G]^{-1} \cdot G^T \cdot (\zeta^T)^{i-1} \cdot P \cdot Gr$$

$$Fdt = \sum_{i=0}^{Md}\{-[H0 + G^T \cdot P \cdot G]^{-1} \cdot G^T \cdot (\zeta^T)^i \cdot P \cdot Gd\} \quad (19-3)$$

where P represents a matrix (a 3-row, 3-column matrix) satisfying the following Ricatti equation (20-1), and ζ represents a matrix (a 3-row, 3-column matrix) expressed by the following equation (20-2):

$$P = Q0 + \Phi^T \cdot P \cdot \Phi - \Phi \cdot P \cdot G \cdot [H0 + G^T \cdot P \cdot G]^{-1} \cdot G^T \cdot P \cdot \Phi \quad (20\text{-}1)$$

$$\zeta = \Phi + G \cdot F0 \quad (20\text{-}2)$$

G, Gr, Gd, and Φ in the equations (19-2) through (19-3) and the equations (20-1), (20-2) are defined in the definition clause for the equation (16), and H0, Q0 in those equations represent weighted matrixes of the evaluating function J0 according to the equation (17) (H0 is a Scalar quantity).

The second term (the term of Σ) on the right side of the equation (18) is rewritten using the components of Fr0, R0 (see the definition clauses for the equations (19-2), (16)), and then modified into the following equation (21):

$$\sum_{i=1}^{Mr}[Fr0(i) \cdot R0(n+1)] = \sum_{i=1}^{Mr}[Fr(i) \cdot \Delta R(n+1)] \quad (21)$$

where $$Fr(i) = \begin{bmatrix} Fr02(1) & : i = 0 \\ Fr01(i) + Fr02(i+1) & : i = 1, 2, ..., Mr-1 \\ Fr01(Mr) & : i = Mr \end{bmatrix}$$

By putting the equation (21) into the equation (18) and rewriting the first term on the right side of the equation (18) using the components of F0, X0 (see the definition clauses for the equations (19-1), (16)), the equation (18) is expressed by the following equation (22):

$$\Delta DUT(n) = Fs0 \cdot e(n) + Fe0 \cdot \Delta e(n) + Fx0 \cdot \Delta Tht(n) + \quad (22)$$
$$\sum_{i=0}^{Mr}[Fr(i) \cdot \Delta R(n+1)] + Fdt \cdot \Delta Tgd(n)$$

Since the control input DUT(n) to be generated by the heater controller 22 is represented by the sum of its initial value DUT(0) and ΔDUT(1), ΔDUT(2), ΔDUT(n) cumulatively added thereto, the following equation (23) is obtained from the above equation (22):

$$DUT(n) = Fs0 \cdot \sum_{j=1}^{n} e(j) + Fe0 \cdot e(n) + Fx0 \cdot Tht(n) + \quad (23)$$
$$\sum_{i=0}^{Mr}[Fr(i) \cdot R(n+1)] + Fdt \cdot Tgd(n) -$$

-continued $$Fe0 \cdot e(0) - Fx0 \cdot Tht(0) - \sum_{i=0}^{Mr}[Fr(i) \cdot R(0+i)] - Fdt \cdot Tgd(0) + DUT(0)$$

By setting the initial value terms of the equation (23), i.e., the sixth term (the term of Fe0·e(0)) through-the tenth term (DUT(0)), to "0", the following equation (24) is obtained as an equation for calculating the control input DUT(n) to be actually generated by the heater controller 22:

$$DUT(n) = Fs0 \cdot \sum_{j=1}^{n} e(j) + Fe0 \cdot e(n) + Fx0 \cdot Tht(n) + \sum_{i=0}^{Mr}[Fr(i) \cdot R(n+1)] + Fdt \cdot Tgd(n) \quad (24)$$

Figure 7:
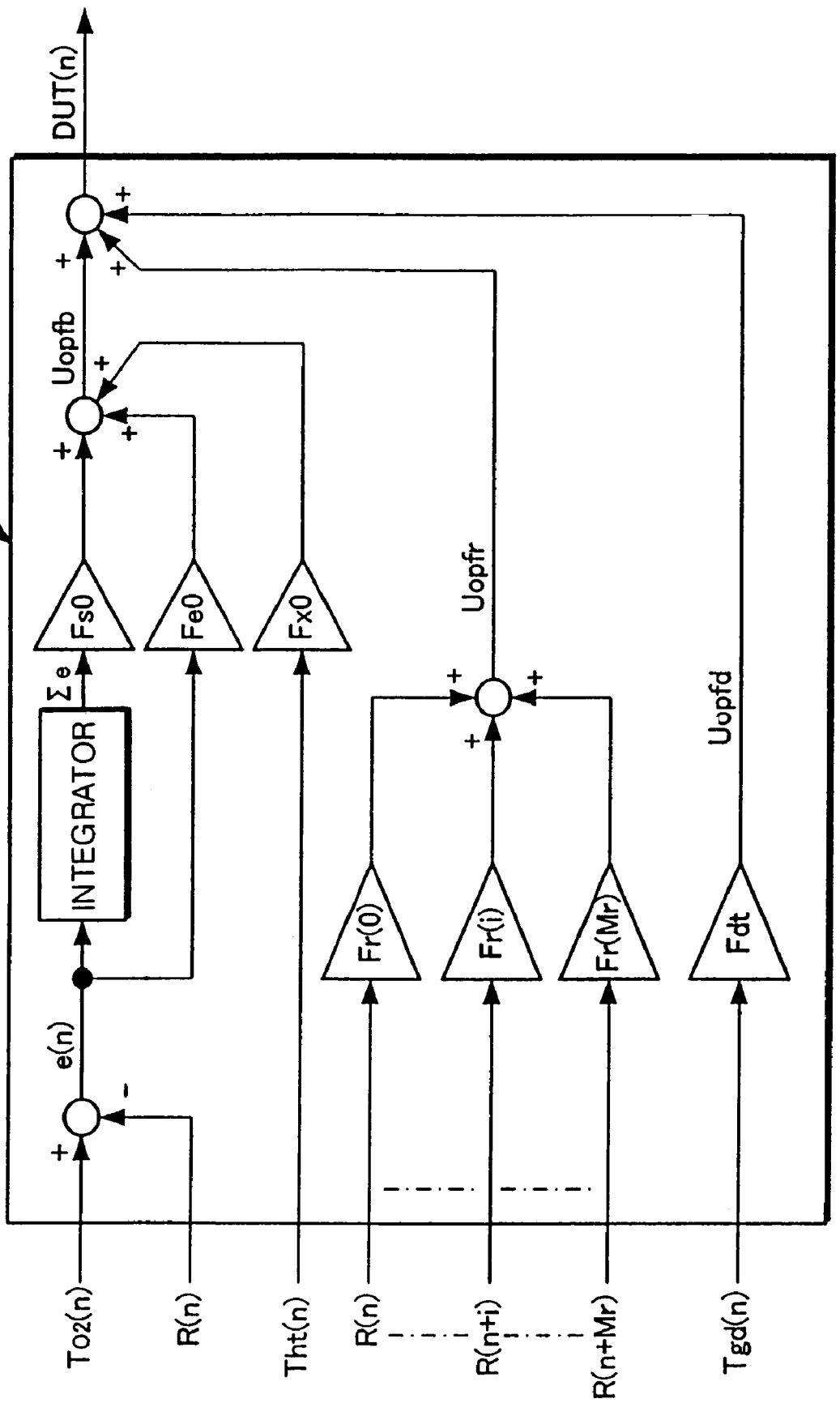
FIG. 7 is a block diagram showing a functional arrangement of a heater controller in the sensor temperature control means shown in FIG. 4.

The equation (24) is a formula for calculating the control input DUT(n) (duty cycle) for controlling the heater 13 with the heater controller 22. Specifically, the heater controller 22 sequentially calculates the control input DUT(n) according to the equation (24) in each cycle time (period) of the control process of the heater controller 22, and applies a pulsed voltage having the duty cycle DUT(n) to the heater energization circuit (not shown) to adjust the electric energy supplied to the heater 13. The first through third terms (the term including Σe(j) through the term including Tht(n)) of the-equation (24) represent a control input component (a feedback component which will hereinafter be referred to as "optimum F/B component Uopfb") depending on the element temperature difference e and the heater temperature Tht. The fourth term (the term of ΣFr(i)·R(n+1)) on the right side of the equation (24) represents a control input component (a feed-forward component which will hereinafter be referred to as "optimum target value F/F component Uopfr") depending on the target value. The fifth term (the term including Tgd(n)) represents a control input component (a feed-forward component which will hereinafter be referred to as "optimum disturbance F/F component Uopfd") depending on the exhaust gas temperature Tgd (which functions as a disturbance on the object to be controlled). The heater controller 22 which determines DUT as a control input according to the equation (24) is expressed in block form as shown in FIG. 7.

Fs0, Fe0, Fx0 which are required to determine the control input DUT(n) according to the equation (24) are of values calculated in advance according to the equation (19-1). Fr(i) (i=0, 1, ..., Mr) is of values calculated in advance according to the equations (21), (19-2). Fdt is of a value calculated in advance according to the equation (19-3). These coefficients Fs0, Fe0, Fx0, Fr(i), Fdt may not necessarily be of the values according to the defining equations, but may be adjusted by way of simulation or exhaust perimentation.

The heater temperature Tht and the exhaust gas temperature Tgd which are required in the calculation of the equation (24) are of the latest estimated value of the heater temperature Tht determined by the element temperature observer 20 and the latest estimated value of the exhaust gas temperature Tgd determined by the exhaust temperature observer 19.

The element temperature difference e required in the calculation of the equation (24) is calculated from the latest estimated value of the element temperature $T_{O2}$ determined by the element temperature observer 20 and the target value R which has been set in a cycle time prior to the target value predicting time Mr by the target value setting means 21.

The target value setting means 21 basically sets a temperature (e.g., 800° C. in the present embodiment) equal to or higher than 750° C. at which the output characteristics of the $O_2$ sensor 8 are stably good, as the target value R for the temperature of the active element 10 in the same cycle time as the cycle time (period) of the processing sequence of the heater controller 22. In order to perform the processing sequence of the heater controller 22 according to the algorithm of the optimum predictive control process, the target value setting means 21 sets the target value R in each cycle time as a target value R(n+Mr) after the target value predicting time Mr from the present cycle time, and stores a series of target values R(n+Mr) for the target value predicting time Mr. Specifically, the target value setting means 21 stores Mr+1 target values R(n), R(n+1), ..., R(n+Mr) while sequentially updating them. The target value R used to determine the element temperature difference e that is required in the calculation of the equation (24) is the value R(n) set and stored by the target value setting means 21 as described above in the cycle time prior to the target value predicting time Mr. The target values R(n), R(n+1), ..., R(n+Mr) stored as described above are used to determine the value of the fourth term (the term of Σ including R(n+i)) of the equation (24).

If the target value R of the element temperature $T_{O2}$ is set to a high temperature such as 800° C. from the start of operation of the engine 1, then the active element 10 tends to be damaged due to stresses caused by quick heating if water is applied to the active element 10 of the $O_2$ sensor 8 when the engine 1 starts to operate. In the present invention, therefore, until a certain time (e.g., 15 seconds) elapses from the start of operation of the engine 1, the target value setting means 21 sets the target value R of the element temperature $T_{O2}$ to a temperature lower than 750° C., e.g., 600° C.

Overall operation of the apparatus, particularly, the sensor temperature control means 18, according to the present embodiment will be described below.

Figure 8:
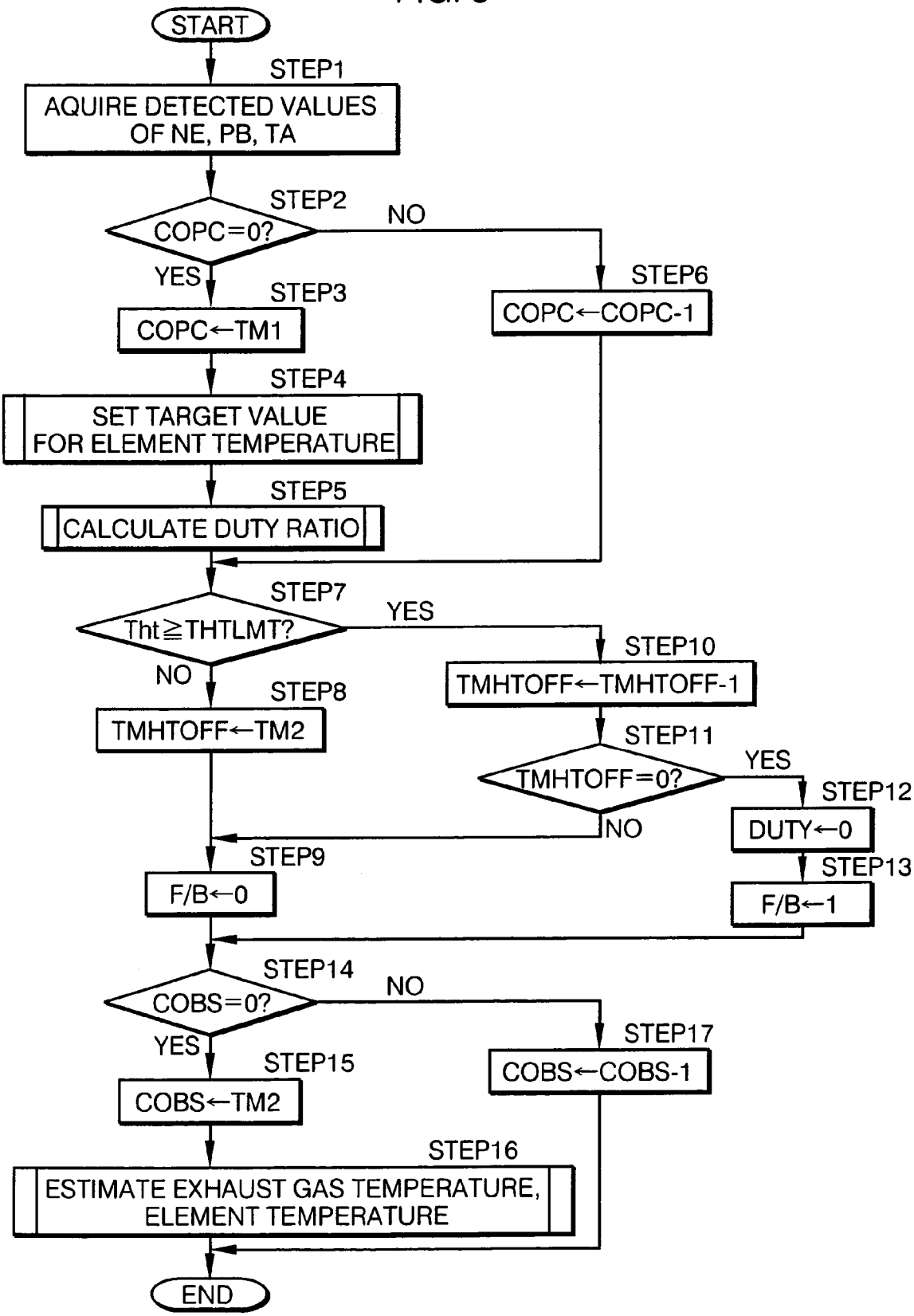
FIG. 8 is a flowchart of an overall processing sequence of the sensor temperature control means in the apparatus shown in FIG. 1.

When the engine 1 starts to operate, the sensor temperature control means 18 executes a main routine shown in FIG. 8 in a predetermined cycle time. The period in which the main routine is executed is shorter than the period dt of the processing sequence of the element temperature observer 20 and hence shorter than the period dtc of the processing sequence of the target value setting means 21 and the heater controller 22.

The sensor temperature control means 18 acquires detected values of the rotational speed NE and the intake pressure PB of the engine 1 and the atmospheric temperature $T_A$ in STEP1, and then determines the value of a countdown timer COPC for measuring the time dtc of one period of the processing sequence of the target value setting means 21 and the heater controller 22 in STEP2. The value of the countdown timer COPC has been initialized to "0" at the time when the engine 1 starts to operate.

If COPC=0, then the sensor temperature control means 18 newly sets the value of the countdown timer COPC to a timer setting time TM1 which corresponds to the period dtc of the control processes of the target value setting means 21 and the heater controller 22 in STEP3. Thereafter, the target value setting means 21 carries out a process of setting a target value R for the element temperature $T_{O2}$ of the $O_2$ sensor 8 in STEP4, and the heater controller 22 carries out a process of calculating a duty cycle DUT of the heater 13 in STEP5. If COPC≈0 in STEP2, then the sensor temperature control means 18 counts down the value of the countdown timer COPC in STEP6, and skips the processing in STEP4 and STEP5. Therefore, the processing in STEP4 and STEP5 is carried out at the period dtc determined by the timer setting time TM1.

Figure 9:
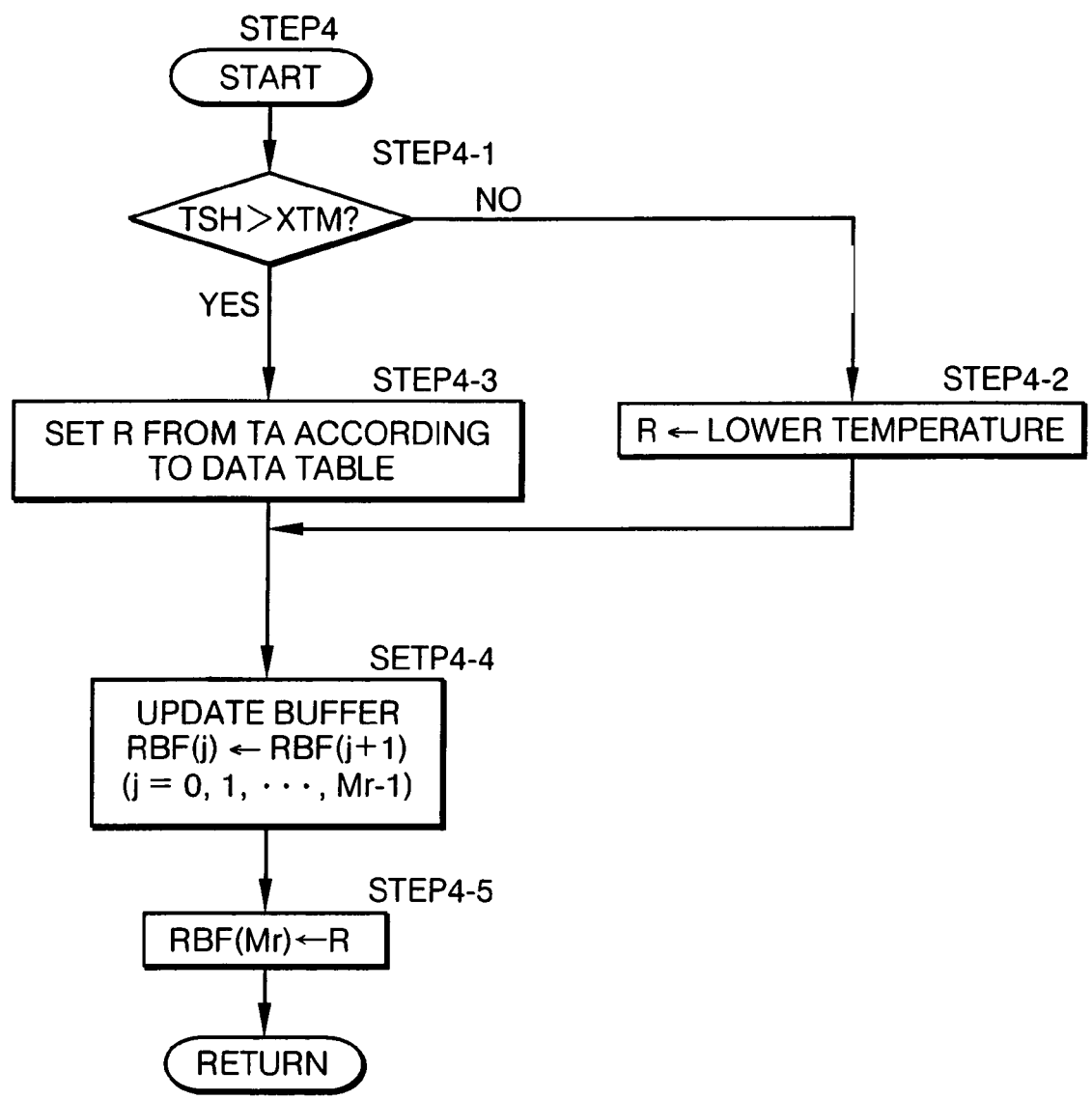
FIG. 9 is a flowchart of a subroutine of the processing sequence shown in FIG. 8.

The processing in STEP4 and STEP5 is specifically carried out as follows: First, the processing in STEP4 is carried out by the target value setting means 21 as shown in FIG. 9.

The target value setting means 21 compares the value of a parameter TSH representative of the time that has elapsed from the start of the engine 1 with a predetermined value XTM in STEP4-1. If TSM≦XTM, i.e., if the engine 1 is in a state immediately after it has started to operate, then the target value setting means 21 sets the target value R for the element temperature $T_{O2}$ to a low temperature (e.g., 600° C.) in order to prevent damage to the active element 10 of the $O_2$ sensor 8 in STEP4-2. Specifically, the target value R that is set at this time is a target value R(n+Mr) after the target value predicting time Mr from the present.

If TSH>XTM in STEP4-1, then the target value setting means 21 sets the target value R for the element temperature $T_{O2}$ from the present detected value (acquired in STEP1 shown in FIG. 8) of the atmospheric temperature TA based on a predetermined table in STEP4-3. The target value R that is set at this time is basically a predetermined value (800° C. in the present embodiment) equal to or higher than 750° C. if the atmospheric temperature TA is a normal temperature (e.g., TA≧0° C.). When the atmospheric temperature TA is low (e.g., TA<0° C.) as when the engine 1 is operating in a cold climate, if the target value R for the element temperature $T_{O2}$ is a high temperature of 800° C., the temperature of the heater 13 is liable to be excessively high. In the present embodiment, when the temperature of the heater 13 becomes excessively high, the heater 13 is forcibly de-energized by an overheating prevention process (described later on) to prevent itself from a failure (a disconnection, a melt-away, or the like). In STEP4-3, according to the present embodiment, when the atmospheric temperature TA is low (e.g., TA<0° C.), the target value R for the element temperature $T_{O2}$ is set to a value slightly lower than the normal value (e.g., 750° C.≦R<800° C.).

Specifically, as with the target value R set in STEP4-2, the target value R set in STEP4-3 is a target value R(n+Mr) after the target value predicting time Mr from the present.

After having set the target value R (=R(n+Mr)) in STEP4-2 or STEP4-3, the target value setting means 21 updates the values of Mr+1 buffers RBF(0), RBF(1), . . . , RBF(Mr) for storing target values R for the target value predicting time Mr in STEP4-4, STEP4-5. The processing in STEP4 is now finished.

In STEP4-4, specifically, the Mr buffers RBF(j) (j=0, 1, . . . , Mr–1) are updated from the values of RBF(j) to the values of RBF(j+1), and the value held in the buffer RBF(0) so far is erased. In STEP4-5, the buffer RBF(Mr) is updated to the target value newly set in STEP4-2 or STEP4-3. The values of the buffers RBF(0), RBF(1), . . . , RBF(Mr) thus updated correspond respectively to R(n), R(n+1), . . . , R(n+Mr) in the fourth term of the equation (24). The values of the buffers RBF(0), RBF(1), . . . , RBF(Mr) have been initialized to a predetermined value (e.g., the target value set in STEP4-2) at the time the engine 1 has started to operate.

Figure 10:
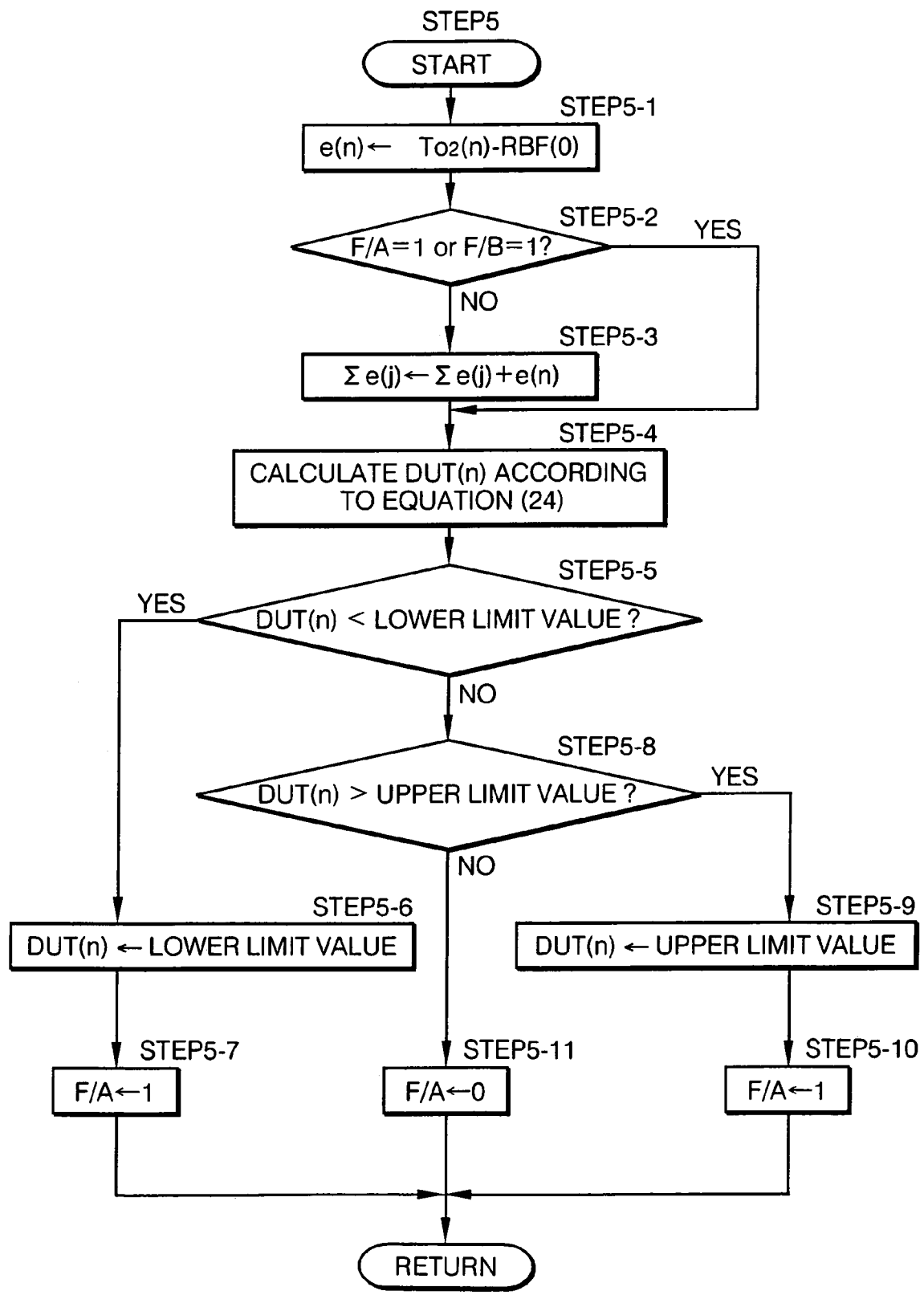
FIG. 10 is a flowchart of a subroutine of the processing sequence shown in FIG. 8.

The processing in STEP5 is carried out by the heater controller 22 as shown in FIG. 10. The heater controller 22 calculates an element temperature difference e(n)=$T_{O2}$(n)−RBF(0) between the present estimated value $T_{O2}$(n) of the element temperature $T_{O2}$ and the value of the buffer RBF(0) (=R(n)), i.e., the target value R set by the target value setting means 21 prior to the target value predicting time Mr in STEP5-1.

Then, the heater controller 22 determines the values of flags F/A, F/B in STEP5-2. The flag F/A is set to "0" or "1" in a limiting process (described later on9 for limiting the duty cycle DUT. The flag F/A which is set to "1" means that the duty cycle DUT is forcibly limited to a predetermined upper or lower limit value, and the flag F/B which is set to "0" means that the duty cycle DUT is not limited to the predetermined upper or lower limit value (the upper limit value<DUT<the lower limit value). The flag F/B is set to "1" when the heater 13 is forcibly de-energized by the overheating prevention process. The flags F/A, F/B are initially set to "0".

If F/A=F/B=0 in STEP5-2, then the heater controller 22 adds the present value of Σe(j) in the first term of the equation (24) to the difference e(n) calculated in STEP5-1 in STEP5-3. In this manner, the difference e(n) is cumulatively added (integrated) in each cycle time dtc of the processing sequence of the heater controller 22. The initial value of Σe(j) is "0".

If F/A=1 or F/B=1 in STEP5-2, then since the present value of the duty cycle DUT is not a normal value, the heater controller 22 skips the processing in STEP5-3, but goes to STEP5-4, holding the present value of Σe(j).

Then, the heater controller 22 calculates the equation (24) using the present value (latest value) of the element temperature difference e(n) determined in STEP5-2 and the present accumulated value of Σe(j), thus calculating the present value DUT(n) of the control input DUT for the heater 13 in STEP5-4. specifically, the heater controller 22 calculates the duty cycle DUT(n) according to the equation (24) from the present value of the difference e(n) determined in STEP5-1, the present accumulated value Σe(j), the present estimated value Tht(n) of the heater temperature Tht, the present values (=R(n), R(n+1), . . . , R(n+Mr)) of the buffers RBF(0), RBF(1), . . . , RBF(Mr), the present estimated value Tgd(n) of the exhaust gas temperature Tgd (the exhaust gas temperature at the location of the $O_2$ sensor 8), and the values of predetermined coefficients Fs0, Fe0, Fx0, Fr(i) (i=0, 1, . . . , Mr), Fdt. When the engine 1 starts to operate, the estimated value of the heater temperature Tht and the estimated value of the exhaust gas temperature Tgd are set to the atmospheric temperature TA as an initial value which is detected at the start of the engine 1. These initial values of the heater temperature Tht and the exhaust gas temperature Tgd are used in the calculation of the equation (24) when the processing sequences of exhaust temperature observer 19 and the element temperature observer 20 are not executed. After the processing sequences of exhaust temperature observer 19 and the element temperature observer 20 are executed, the latest estimated values determined in the processing sequences of exhaust temperature observer 19 and the element temperature observer 20 are used in the calculation of the equation (24).

Then, the heater controller 22 carries out a limiting process for limiting the duty cycle DUT(n) calculated in STEP5-4 in STEP5-5 through STEP5-11. Specifically, the heater controller 22 determines whether the duty cycle DUT(n) is smaller than a predetermined lower limit value (e.g., "0") or not in STEP5-5. If DUT(n)<the lower limit value, then the heater controller 22 forcibly sets the value of DUT(n) to the lower limit value in STEP5-6. Thereafter, the value of the flag F/A (the flag used in STEP5-2) is set to "1" in STEP5-7.

If DUT(n)≧the lower limit value, then the heater controller 22 determines whether the duty cycle DUT(n) is greater than a predetermined upper limit value (e.g., 100%) or not in STEP5-8. If DUT(n)>the upper limit value, then the heater controller 22 forcibly sets the value of DUT(n) to the upper limit value in STEP5-9. Thereafter, the value of the flag F/A is set to "1" in STEP5-10. If the lower limit value≦DUT(n)≦the upper limit value, then the heater controller 22 holds the value of DUT(n), and sets the flag F/A to "0" in STEP5-11. The processing in STEP5 is not finished.

Control then returns to the main routine shown in FIG. 8. The sensor temperature control means 18 carries out the processing in STEP7 through STEP13. The processing in STEP7 through STEP13 represents a process of preventing the heater 13 from being overheated. In STEP7, the sensor temperature control means 18 determines whether or not the present estimated value (latest value) of the heater temperature Tht is equal to or higher than a predetermined upper limit value THTLMT (e.g., 930° C.). In the present embodiment, if Tht≧THTLMT, the sensor temperature control means 18 forcibly de-energizes the heater 13 to prevent the heater 13 from being damaged. However, the estimated value of Tht may temporarily rise to a value equal to or higher than the upper limit value THTLMT due to a disturbance or the like. According to the present embodiment, therefore, the sensor temperature control means 18 forcibly de-energizes the heater 13 if the state in which Tht≧THTLMT has continued for a predetermined time (e.g., 3 seconds, hereinafter referred to as "heater OFF delay time").

If Tht<THTLMT in STEP7, then the sensor temperature control means 18 sets the value of a countdown timer TMHTOFF for measuring the heater OFF delay time to a predetermined value TM2 corresponding to the heater OFF delay time in STEP8. Since the sensor temperature control means 18 does not forcibly de-energize the heater 13 at this time, the sensor temperature control means 18 sets the value of the flag F/B (the flag used in STEP5-2 shown in FIG. 10) to "0" in STEP9.

If Tht≧THTLMT in STEP7, then the sensor temperature control means 18 counts down the value of the countdown timer TMHTOFF by "1" in STEP10. Then, the sensor temperature control means 18 determines whether the value of the countdown timer TMHTOFF is "0" or not, i.e., whether the heater OFF delay time has elapsed with Tht≧THTLMT or not in STEP11.

If TMHTOFF≈0, then the sensor temperature control means 18 sets the flag F/B to "0" in STEP9. If TMHTOFF=0, then the sensor temperature control means 18 forcibly sets the present value of the duty cycle DUT to "0" in STEP12, and then sets the value of the flag F/B to "1" in STEP13.

When the flag F/B is set to "0" in STEP9, the sensor temperature control means 18 applies a pulsed voltage to the heater energization circuit according to the present value of the duty cycle DUT (the latest value calculated in STEP5), energizing the heater 13 with the electric energy depending on the duty cycle DUT. When the value of the flag F/B is set to "1" in STEP12, the sensor temperature control means 18 does not apply a pulsed voltage to the heater energization circuit, thus de-energizing the heater 13.

After having thus executed the processing in STEP7 through STEP13, i.e., the process of preventing the heater 13 from being overheated, the sensor temperature control means 18 determines the value of a countdown timer COBS for measuring the time dt of one period of the processing sequences of the exhaust temperature observer 19 and the element temperature observer 20 in STEP14. The value of the countdown timer COBS is initially set to "0" when the engine 1 has started to operate.

If COBS=0, then the sensor temperature control means 18 newly sets the value of COBS to a timer setting time TM3 (shorter than TM1 in STEP3) which corresponds to the period dt of the processing sequences of the exhaust temperature observer 19 and the element temperature observer 20 in STEP15. Then, the exhaust temperature observer 19 carries out a process of estimating the exhaust gas temperature Tgd (the exhaust gas temperature in the vicinity of the location of the $O_2$ sensor 8), and the element temperature observer 20 carries out a process of estimating the element temperature $T_{O2}$ (including a process of estimating the heater temperature Tht) in STEP16. If COBS≈0 in STEP14, the exhaust temperature observer 19 skips the processing in STEP15 and STEP16 is skipped, sets the value of COBS to COBS−1 in STEP17. The processing in STEP16 is therefore carried out at a period dt which is determined by the timer setting time TM3. The main routine shown in FIG. 8 is now finished.

Figure 11:
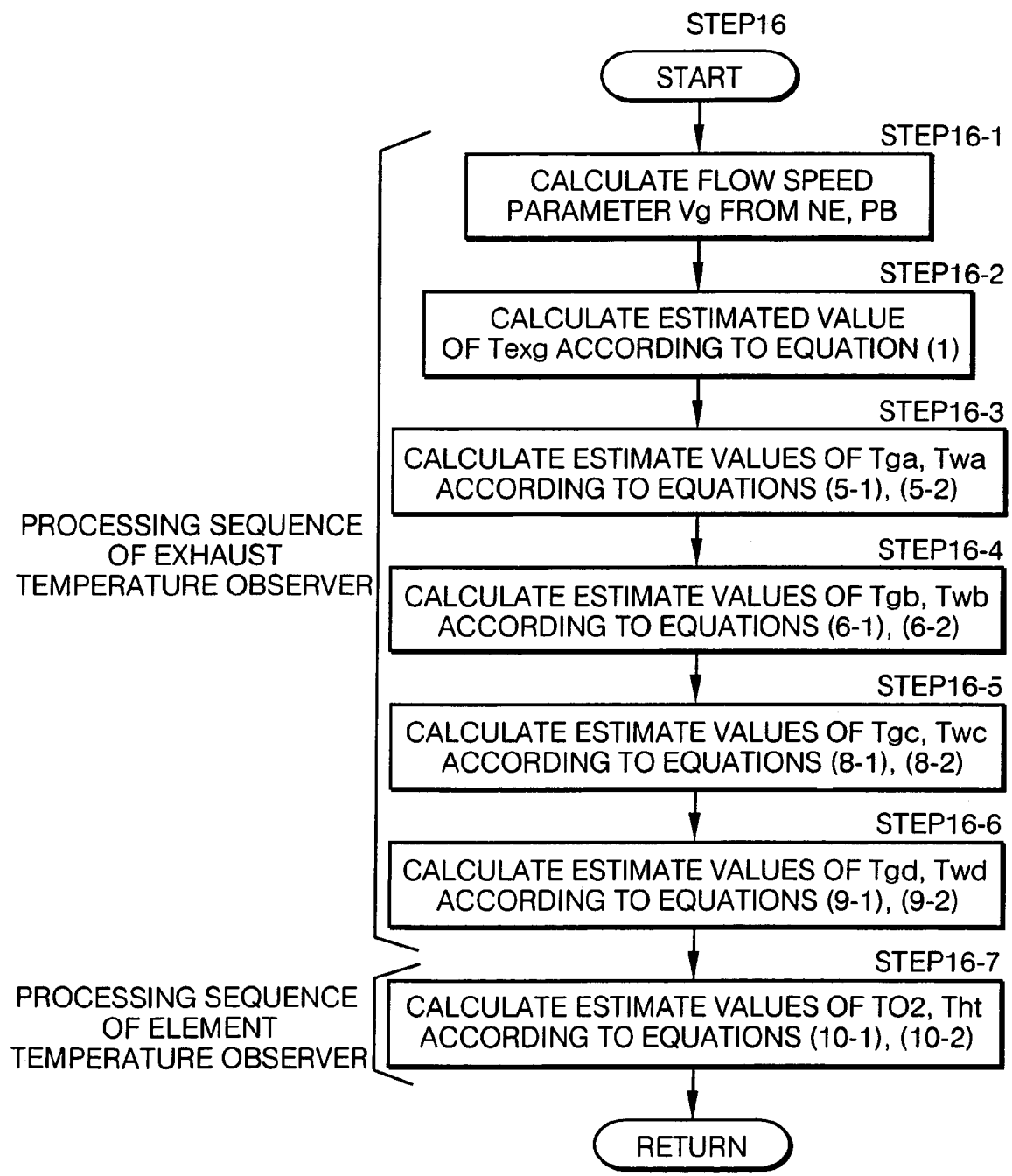
FIG. 11 is a flowchart of a subroutine of the processing sequence shown in FIG. 8.

The processing in STEP16 is specifically carried out as shown in FIG. 11. The exhaust temperature observer 19 successively carries out the processing in STEP16-1 through STEP16-6 to determine an estimated value of the exhaust gas temperature Tgd in the vicinity of the location of the $O_2$ sensor 8. In STEP16-1, the exhaust temperature observer 19 determines a gas speed parameter Vg according to the equation (7) using the present detected values (the latest values acquired in STEP1) of the rotational speed NE and the intake pressure PB of the engine 1. The gas speed parameter Vg is forcibly set to Vg=1 if the result calculated by the equation (7) exceeds "1" due to an excessive rotational speed of the engine 1.

Then, the exhaust temperature observer 19 calculates an estimated value of the exhaust gas temperature Texg at the exhaust port 2 of the engine 1 according to the equation (1) in STEP16-2. Specifically, the exhaust temperature observer 19 determines a basic exhaust gas temperature TMAP(NE, PB) from the present detected values of the rotational speed NE and the intake pressure PB of the engine 1 based on the predetermined map, and thereafter calculates the right side of the equation (1) using the basic exhaust gas temperature TMAP(NE,PB), the present estimated value Texg(k−1) (determined in STEP16-2 in the preceding cycle time) of the exhaust gas temperature Texg, and the value of a predetermined coefficient Ktex, thus calculating a new estimated value Texg(k) of the exhaust gas temperature Texg. In the present embodiment, while the engine 1 is idling and also while the supply of fuel to the engine 1 is being cut off, the basic exhaust gas temperature TMAP used in the calculation of the equation (1) is set to predetermined values corresponding to the respective engine operating states. When the engine 1 starts to operate, the atmospheric temperature TA detected at this time is set as an initial value Texg(0) of the estimated value of the exhaust gas temperature Texg. When the equation (1) is calculated for the first time after the engine 1 has started to operate, the initial value Texg(0) is used as the value of Texg(k−1).

Then, the exhaust temperature observer 19 calculates an estimated value of the exhaust gas temperature Tga and an estimated value of the exhaust pipe temperature Twa in the partial exhaust passageway 3*a* according to the respective equations (5-1), (5-2) in STEP16-3. Specifically, the exhaust temperature observer 19 determines a new estimated value Tga(k+1) of the exhaust gas temperature Tga by calculating the right side of the equation (5-1) using the present estimated value Tga(k) (determined in STEP16-3 in the preceding cycle time) of the exhaust gas temperature Tga, the present estimated value (determined in STEP16-3 in the preceding cycle time) of the exhaust pipe temperature Twa, the present estimated value of the exhaust gas temperature Texg previously calculated in STEP16-2, the present value of the gas speed parameter Vg calculated in STEP16-1, the value of the predetermined model coefficient Aa, and the value of the period dt of the processing sequence of the exhaust temperature observer 19.

The exhaust temperature observer 19 calculates a new estimated value Twa(k+1) of the exhaust pipe temperature Twa by calculating the right side of the equation (5-2) using the present estimated value Tga(k) (determined in STEP16-3 in the preceding cycle time) of the exhaust gas temperature Tga, the present estimated value (determined in STEP16-3 in the preceding cycle time) of the exhaust pipe temperature Twa, the values of the predetermined model co-efficients Ba, Ca, and the value of the period dt of the processing sequence of the exhaust temperature observer 19.

When the engine 1 starts to operate, the atmospheric temperature $T_A$ detected at this time is set as initial values Tga(0), Twa(0) of the estimated values of the exhaust gas temperature Tga and the exhaust pipe temperature Twa. When the equations (5-1), (5-2) are calculated for the first time after the engine 1 has started to operate, these initial values Tga(0), Twa(0) are used as the respective values of Tga(k−1), Twa(k−1).

Then, the exhaust temperature observer 19 calculates an estimated value of the exhaust gas temperature Tgb and an estimated value of the exhaust pipe temperature Twb in the partial exhaust passageway 3b according to the respective equations (6-1), (6-2) in STEP16-4. Specifically, the exhaust temperature observer 19 determines a new estimated value Tgb(k+1) of the exhaust gas temperature Tgb by calculating the right side of the equation (6-1) using the present estimated value Tgb(k) (determined in STEP16-4 in the preceding cycle time) of the exhaust gas temperature Tgb, the present estimated value (determined in STEP16-4 in the preceding cycle time) of the exhaust pipe temperature Twb, the present estimated value of the exhaust gas temperature Tga previously calculated in STEP16-3, the present value of the gas speed parameter Vg calculated in STEP16-1, the value of the predetermined model coefficient Ab, and the value of the period dt of the processing sequence of the exhaust temperature observer 19.

The exhaust temperature observer 19 calculates a new estimated value Twb(k+1) of the exhaust pipe temperature Twb by calculating the right side of the equation (6-2) using the present estimated value Tgb(k) (determined in STEP16-4 in the preceding cycle time) of the exhaust gas temperature Tgb, the present estimated value (determined in STEP16-4 in the preceding cycle time) of the exhaust pipe temperature Twb, the values of the predetermined model co-efficients Bb, Cb, and the value of the period dt of the processing sequence of the exhaust temperature observer 19.

When the engine 1 starts to operate, the atmospheric temperature $T_A$ detected at this time is set as initial values Tgb(0), Twb(0) of the estimated values of the exhaust gas temperature Tgb and the exhaust pipe temperature Twb. When the equations (6-1), (6-2) are calculated for the first time after the engine 1 has started to operate, these initial values Tgb(0), Twb(0) are used as the respective values of Tgb(k−1), Twb(k−1).

Then, the exhaust temperature observer 19 calculates an estimated value of the exhaust gas temperature Tgc and an estimated value of the exhaust pipe temperature Twc in the partial exhaust passageway 3c according to the respective equations (8-1), (8-2) in STEP16-5. Specifically, the exhaust temperature observer 19 determines a new estimated value Tgc(k+1) of the exhaust gas temperature Tgc by calculating the right side of the equation (8-1) using the present estimated value Tgc(k) (determined in STEP16-5 in the preceding cycle time) of the exhaust gas temperature Tgc, the present estimated value (determined in STEP16-5 in the preceding cycle time) of the exhaust pipe temperature Twc, the present estimated value of the exhaust gas temperature Tgb previously calculated in STEP16-4, the present value of the gas speed parameter Vg calculated in STEP16-1, the value of the predetermined model coefficient Ac, and the value of the period dt of the processing sequence of the exhaust temperature observer 19.

The exhaust temperature observer 19 calculates a new estimated value Twc(k+1) of the catalyst temperature Twc by calculating the right side of the equation (8-2) using the present estimated value Tgc(k) (determined in STEP16-5 in the preceding cycle time) of the exhaust gas temperature Tgc, the present estimated value (determined in STEP16-5 in the preceding cycle time) of the catalyst temperature Twc, the present value of the gas speed parameter Vg calculated in STEP16-1, the values of the predetermined model coefficients Bc, Cc, Dc, and the value of the period dt of the processing sequence of the exhaust temperature observer 19.

When the engine 1 starts to operate, the atmospheric temperature $T_A$ detected at this time is set as initial values Tgc(0)., Twc(0) of the estimated values of the exhaust gas temperature Tgc and the exhaust pipe temperature Twc. When the equations (8-1), (8-2) are calculated for the first time after the engine 1 has started to operate, these initial values Tgc(0), Twc(0) are used as the respective values of Tgc(k−1), Twc(k−1).

Then, the exhaust temperature observer 19 calculates an estimated value of the exhaust gas temperature Tgd and an estimated value of the exhaust pipe temperature Twd in the partial exhaust passageway 3d (near the location of the $O_2$ sensor 8) according to the respective equations (9-1), (9-2) in STEP16-6. Specifically, the exhaust temperature observer 19 determines a new estimated value Tgd(k+1) of the exhaust gas temperature Tgd by calculating the right side of the equation (9-1) using the present estimated value Tgd(k) (determined in STEP16-6 in the preceding cycle time) of the exhaust gas temperature Tgd, the present estimated value (determined in STEP16-6 in the preceding cycle time) of the exhaust pipe temperature Twd, the present estimated value of the exhaust gas temperature Tgc previously calculated in STEP16-5, the present value of the gas speed parameter Vg calculated in STEP16-1, the value of the pre-determined model coefficient Ad, and the value of the period dt of the processing sequence of the exhaust temperature observer 19.

The exhaust temperature observer 19 calculates a new estimated value Twd(k+1) of the exhaust pipe temperature Twd by calculating the right side of the equation (9-2) using the present estimated value Tgd(k) (determined in STEP16-6 in the preceding cycle time) of the exhaust gas temperature Tgd, the present estimated value (determined in STEP16-6 in the preceding cycle time) of the exhaust pipe temperature Twd, the values of the predetermined model co-efficients Bd, Cd, and the value of the period dt of the processing sequence of the exhaust temperature observer 19.

When the engine 1 starts to operate, the atmospheric temperature $T_A$ detected at this time is set as initial values Tgd(0), Twd(0) of the estimated values of the exhaust gas temperature Tgd and the exhaust pipe temperature Twd.

When the equations (9-1), (9-2) are calculated for the first time after the engine 1 has started to operate, these initial values Tgd(0), Twd(0) are used as the respective values of Tgd(k−1), Twd(k−1).

Then, the element temperature observer 20 exhaust ecutes the processing in STEP16-7 to determine estimated values of the element temperature $T_{O2}$ of the $O_2$ sensor 8 and the heater temperature Tht according to the equations (10-1), (10-2). Specifically, the element temperature observer 20 determines a new estimated value $T_{O2}$(k+1) of the device temperature $T_{O2}$ by calculating the right side of the equation (10-1) using the present estimated value $T_{O2}$(k) (determined in STEP16-7 in the preceding cycle time) of the element temperature $T_{O2}$, the present estimated value Tht(k) (determined in STEP16-7 in the preceding cycle time) of the heater temperature Tht, the present estimated value of the exhaust gas temperature Tgd previously calculated in STEP16-6, the values of the predetermined model coefficients Ax, Bx, and the value of the period dt (=the period of the processing sequence of the exhaust temperature observer 19) of the processing sequence of the element temperature observer 20.

Then, the element temperature observer 20 determines a new estimated value Tht(k+1) of the heater temperature Tht by calculating the right side of the equation (10-2) using the present estimated value $T_{O2}$(k) (determined in STEP16-7 in the preceding cycle time) of the element temperature $T_{O2}$, the present estimated value Tht(k) (determined in STEP16-7 in the preceding cycle time) of the heater temperature Tht, the present value DUT(k) of the duty cycle DUT, the values of the predetermined model coefficients Cx, Dx, and the value of the period dt of the processing sequence of the element temperature observer 20.

When the engine 1 starts to operate, the atmospheric temperature TA detected at this time is set as initial values $T_{O2}$(0) Tht(0) of the estimated values of the element temperature $T_{O2}$ and the heater temperature Tht. When the equations (10-1), (10-2) are calculated for the first time after the engine 1 has started to operate, these initial values $T_{O2}$(0), Tht(0) are used as the respective values of $TO_2$(k−1), Tht(k−1). The duty cycle DUT(k) used in the equation (10-2) is basically of the latest value determined by the heater controller 22 in STEP5. However, if the value of the duty cycle DUT is limited in STEP12 to de-energize the heater 13, then the limited value of the duty cycle DUT is used in the equation (10-2).

The above processing sequence of the sensor temperature control means 18 controls the electric energy supplied to the heater 13 of the $O_2$ sensor 8 in order to keep the element temperature $T_{O2}$ of the $O_2$ sensor 8 at the target value R. Except immediately after the engine 1 has started to operate and when the atmospheric temperature TA is considerably low, the target value R is normally set to 800° C. As a result, the output characteristics of the $O_2$ sensor 8 can be maintained stably as the characteristics suitable for controlling the air-fuel ratio of the engine 1, i.e., for controlling the air-fuel ratio thereof for the catalytic converter 4 to perform a better exhaust purifying capability, and the air-fuel ratio of the engine 1 can well be controlled to allow the catalytic converter 4 to perform a better exhaust purifying capability.

In the present embodiment, the exhaust gas temperature Tgd in the vicinity of the location of the $O_2$ sensor 8 is estimated by the exhaust temperature observer 19, and the estimated value of the exhaust gas temperature Tgd is used to calculate the duty cycle DUT for the heater controller 22 to control the energization of the heater 13. More specifically, the duty cycle DUT as a control input for the object to be controlled by the heater controller 22 is calculated as including a control input component (the first term (the term including $\Sigma e(j)$) and the second term (the term including e(n)) of the equation (24)) depending on the element temperature $T_{O2}$ (the estimated value thereof in the present embodiment) and also a control input component depending on the estimated value of the exhaust gas temperature Tgd which serves as a disturbance for changing the element temperature $T_{O2}$, i.e., an optimum disturbance F/F component Uopfd. The coefficient Fdt relative to the optimum disturbance F/F component Uopfd is determined by a predictive control algorithm based on the assumption that the present exhaust gas temperature continues until after the exhaust gas temperature predicting time Md. As a consequence, the stability of the process of controlling the element temperature $T_{O2}$ at the target value R is effectively increased, and hence the stability of the output characteristics of the $O_2$ sensor 8 is also effectively increased.

In the present embodiment, furthermore, the control input DUT is calculated as including the control input component depending on the target value R for the element temperature $T_{O2}$ (the target value R from the present until after the target value predicting time Mr), i.e., the optimum target value F/F component Uopfr. When the target value R changes from a low temperature (600° C.) immediately after the engine 1 has started to operate to a normal high temperature (750° C. through 800° C.) in particular, the control input DUT is prevented from becoming temporarily large excessively, i.e., the element temperature $T_{O2}$ is prevented from overshooting with respect to the target value R. The stability of the output characteristics of the $O_2$ sensor 8 is also effectively increased.

The exhaust passage 3 extending from the exhaust port 2 to the $O_2$ sensor 8 is divided into the plural partial exhaust passageways 3a, 3b, 3c, 3d. The exhaust gas temperature Texg at the exhaust port 2 of the engine 1, which serves as an inlet of the most upstream partial exhaust passageway 3a, is estimated using the detected values of the rotational speed NE and the intake pressure PB which serve as parameters indicative of the operating state of the engine 1, and the exhaust gas temperatures Tga, Tgb, Tgc, Tgd in the partial exhaust passageways 3a, 3b, 3c, 3d are estimated successively downstream using the estimated values of the exhaust gas temperatures Texg, Tga, Tgb, Tgc upstream of the respective partial exhaust passageways 3a, 3b, 3c, 3d. At this time, furthermore, the exhaust gas temperatures Tga, Tgb, Tgc, Tgd, together with the temperatures (the exhaust pipe temperatures Twa, Twb, Twd and the catalyst temperature Twc) of the passage-defining members (the exhaust pipe 6a, the catalyst 7 in the catalytic converter 4, the exhaust pipe 6b) of the partial exhaust passageways 3a, 3b, 3c, 3d, are estimated taking into account the heat transfer between those passage-defining members and the exhaust gas, and also in view of the heat radiation from the passage-defining members into the atmosphere. In addition, the heating of the catalyst 7 in the catalytic converter 4 is also taken into account in estimating the catalyst temperature Twc. As a result, the exhaust gas temperatures Texg, Tga, Tgb, Tgc, Tgd can be determined successively with accuracy.

Since the exhaust gas temperatures Texg, Tga, Tgb, Tgc, Tgd, or particularly, the exhaust gas temperature Tgd in the vicinity of the location of the $O_2$ sensor 8, can be estimated accurately, the optimum disturbance F/F component Uopfd depending on the estimated value of the exhaust gas temperature Tgd is appropriate for compensating for a change in the element temperature $T_{O2}$ which is caused by a change in the exhaust gas temperature Tgd. As a result, the element temperature $T_{O2}$ can well be controlled at the target value R.

In the illustrated embodiment, the exhaust passage 3 extending from the exhaust port 2 to the $O_2$ sensor 8 is divided into the four partial exhaust passageways 3a, 3b, 3c, 3d. However, the number of the partial exhaust passageways is not necessarily limited to four, but may be selected dependent on the length and layout of the exhaust system, the accuracy of required estimated values, the calculation loads, etc. For example, the exhaust passage 3 in the exhaust pipe 6a may be divided into three or more partial exhaust passageways, or the exhaust passage 3 in the catalytic converter 4 may be divided into two or more partial exhaust passageways.

In the present embodiment, the atmospheric temperature TA detected when the engine 1 starts to operate is used as an initial estimated value for the exhaust gas temperatures Texg, Tga, Tgb, Tgc, Tgd, the exhaust pipe temperatures Twa, Twb, Twd, the catalyst temperature Twc, the element temperature $T_{O2}$, and the heater temperature Tht. However, the engine temperature detected when the engine 1 starts to operate may be used as such an initial estimated value. Alternatively, the initial estimated value may be established depending on both the atmospheric temperature TA and the engine temperature. Further alternatively, the atmospheric temperature may be used as the initial estimated value when the engine 1 starts to operate, and the engine temperature may be used as the initial estimated value when the engine 1 restarts soon after it has been shut off. These modifications apply to other embodiments to be described below.

A second embodiment of the present invention will be described below with reference to FIGS. 12 and 13. The second embodiment and other embodiments to be described later on are partly different in arrangement or function from the first embodiment described above, and those structural or functional parts of the second embodiment and other embodiments which are identical to those of the first embodiment are denoted by identical reference characters, and will not be described in detail below.

Figure 12:
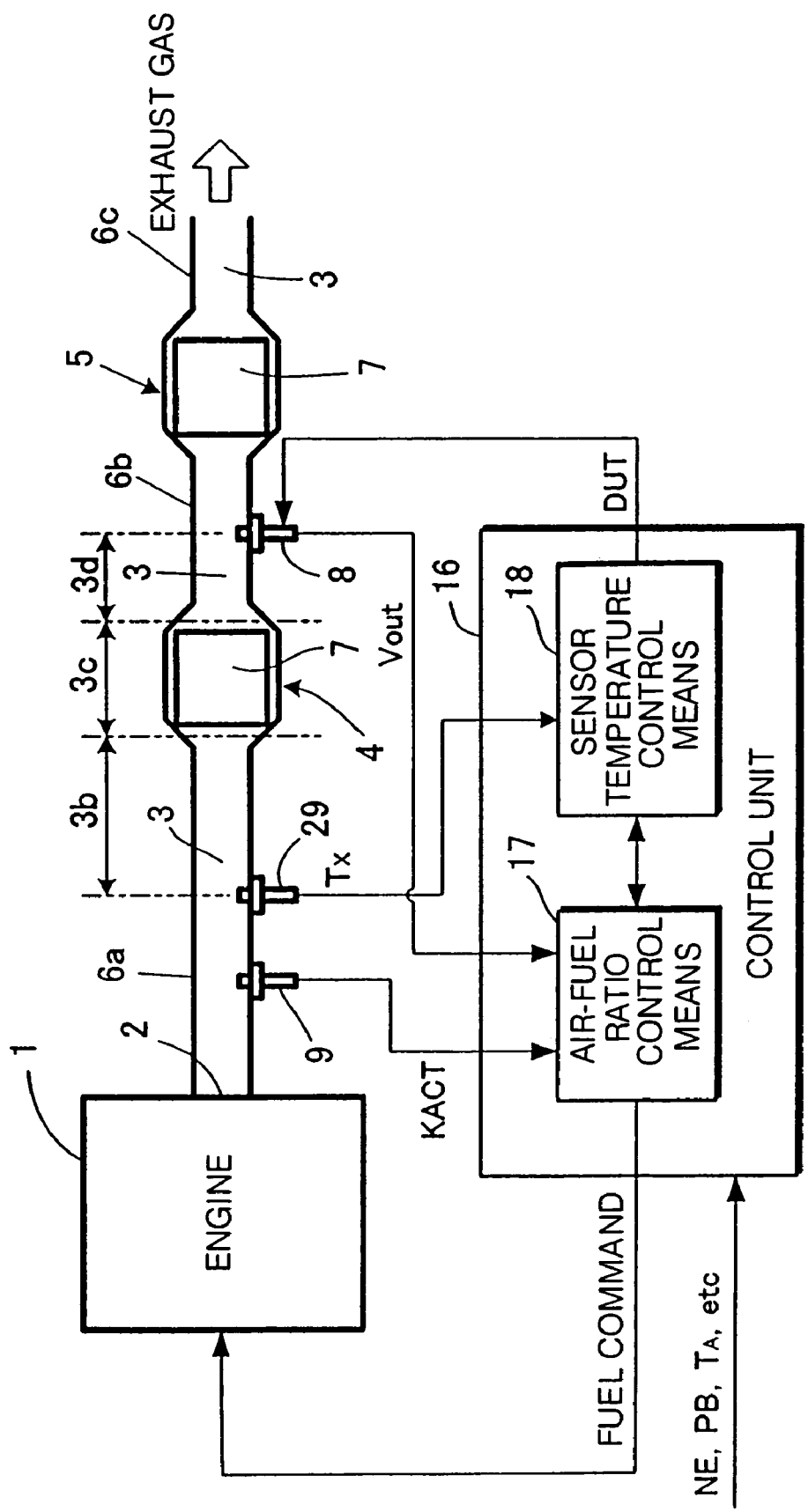
FIG. 12 is a block diagram of an apparatus for controlling the temperature of an exhaust gas sensor according to a second embodiment of the present invention.

In the second embodiment, as shown in FIG. 12, an exhaust gas temperature sensor 29 for detecting an exhaust gas temperature Tx is mounted on an intermediate portion of the exhaust pipe 6a of the exhaust passage 3. A detected value of the exhaust gas temperature Tx is supplied from the exhaust gas temperature sensor 29 to the sensor temperature control means 18 (specifically, the exhaust temperature observer 19) of the control unit 16 for estimating the exhaust gas temperature Tgd in the vicinity of the location of the $O_2$ sensor 8. The exhaust gas temperature sensor 29 is not required to be dedicated for the process of controlling the element temperature $T_{O2}$ of the $O_2$ sensor 8, but may be an existing temperature sensor provided for performing another purpose than the controlling of the element temperature $T_{O2}$, i.e., for performing a process of controlling the exhaust gas temperature to protect the catalyst against enrichment of the air-fuel ratio.

In the second embodiment, the exhaust temperature observer 19 estimates the exhaust gas temperature Tgd in the vicinity of the location of the $O_2$ sensor 8 using the detected value of the exhaust gas temperature Tx supplied from the exhaust gas temperature sensor 29, as follows:

In the second embodiment, the exhaust passage 3 extending from the location of the exhaust gas temperature sensor 29 to the $O_2$ sensor 8 is divided into three partial exhaust passageways 3b, 3c, 3d. The partial exhaust passageways 3c, 3d are identical to those of the first embodiment, and the partial exhaust passageway 3b is either identical to or different in length only from the partial exhaust passageway 3b of the first embodiment. As shown in FIG. 13, the exhaust temperature observer 19 has its algorithm constructed of a pre-CAT exhaust system thermal model 26 represented by the model equations (6-1), (6-2), an in-CAT exhaust system thermal model 27 represented by the model equations (8-1), (8-2), and a post-CAT exhaust system thermal model 28 represented by the model equations (9-1), (9-2), respectively associated with the three partial exhaust passageways 3b, 3c, 3d.

Figure 13:
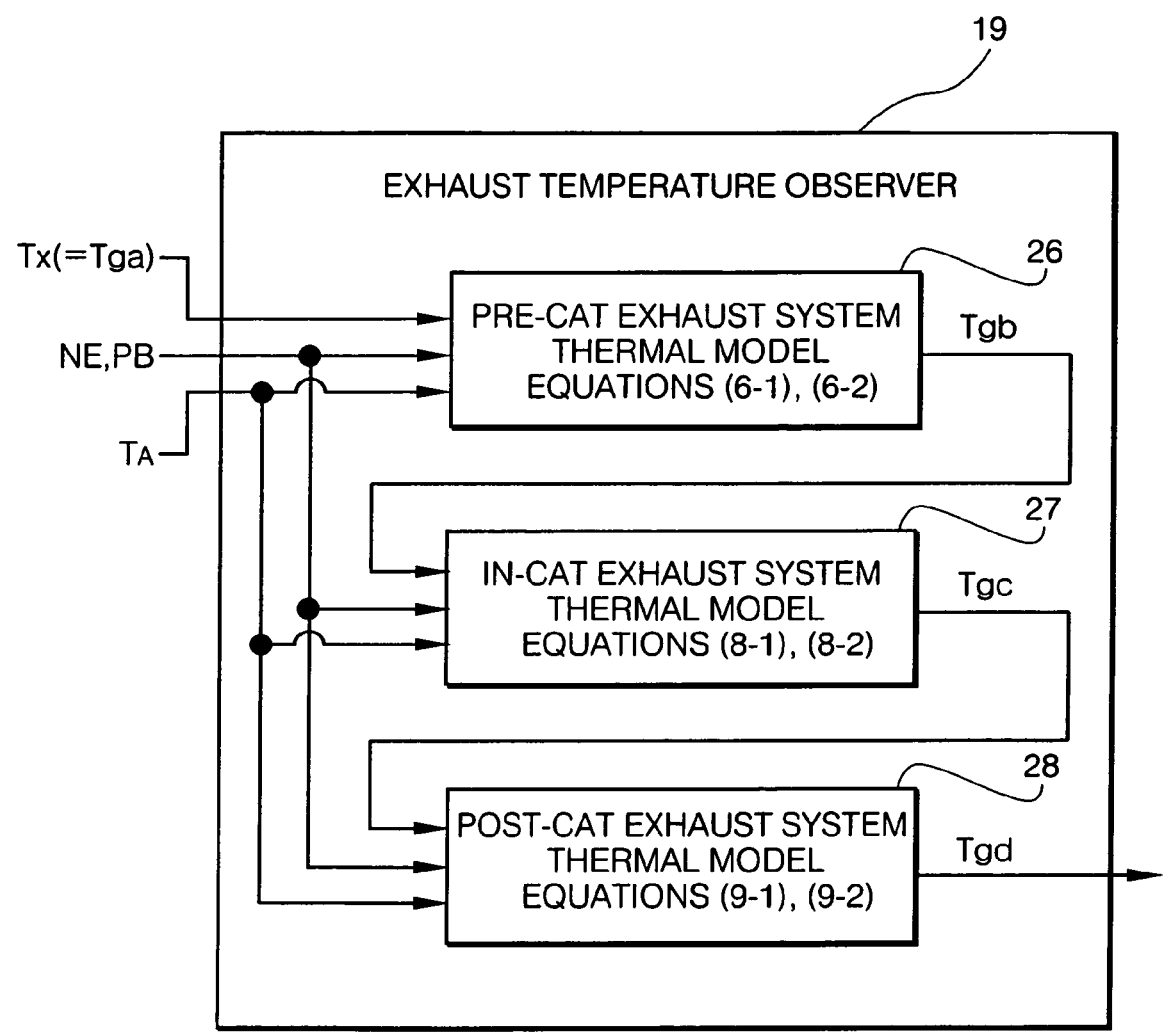
FIG. 13 is a block diagram showing a functional arrangement of an exhaust temperature observer in a sensor temperature control means in the apparatus shown in FIG. 12.

A comparison between FIGS. 6 and 13 indicates that the algorithm of the exhaust temperature observer 19 according to the second embodiment does not have the exhaust port thermal model 24 and the pre-CAT exhaust system thermal model 25 according to the first embodiment. In the second embodiment, the pre-CAT exhaust system thermal model 26 is supplied with the detected value Tx of the exhaust gas temperature from the exhaust gas temperature sensor 29, as the value of "Tga" used in the calculation of the equation (6-1). The algorithm of the exhaust temperature observer 19 according to the second embodiment differs from the algorithm of the exhaust temperature observer 19 according to the first embodiment only in that regard. Specifically, the pre-CAT exhaust system thermal model 26 sequentially determines an estimated value of the exhaust gas temperature Tgb at the downstream end of the partial exhaust passageway 3b, using the detected value Tx (latest value) of the exhaust gas temperature from the exhaust gas temperature sensor 29, as the value of "Tga" in the equation (6-1).

The other details of the processing sequence of the sensor temperature control means 18 according to the first embodiment other than the above difference are identical to those of the processing sequence of the sensor temperature control means 18 according to the first embodiment. The second embodiment differs from the first embodiment only in that the detected value Tx of the exhaust gas temperature from the exhaust gas temperature sensor 29 is used to estimate the exhaust gas temperature Tgd in the vicinity of the location of the $O_2$ sensor 8. According to the second embodiment, the exhaust gas temperature Tgd in the vicinity of the location of the $O_2$ sensor 8 can be estimated properly and accurately. The second embodiment thus offers the same advantages as the first embodiment.

In the second embodiment, the exhaust gas temperature sensor 29 is mounted on the intermediate portion of the exhaust pipe 6a. However, the exhaust gas temperature sensor 29 may be positioned in another location. For example, as shown in FIG. 14(a), if the exhaust gas temperature sensor 29 is located for detecting the exhaust gas temperature Tx in the vicinity of the exhaust port 2 of the engine 1 according to a third embodiment, then the exhaust port thermal model 24 shown in FIG. 6 is dispensed with, and the detected value Tx (latest value) of the exhaust gas temperature from the exhaust gas temperature sensor 29 is supplied as the value of "Texg" for use in the calculation of the equation (5-1) to the pre-CAT exhaust system thermal model 25. This arrangement allows the exhaust gas temperature Tgd to be estimated in the vicinity of the location of the $O_2$ sensor 8.

If the exhaust gas temperature sensor 29 is located for detecting the exhaust gas temperature Tx in the vicinity of the inlet of the catalytic converter 4 according to a fourth embodiment, as shown in FIG. 14(b), then the exhaust port thermal model 24 and the pre-CAT exhaust system thermal models 25, 26 are dispensed with, and the detected value Tx (latest value) of the exhaust gas temperature from the exhaust gas temperature sensor 29 is supplied as the value of "Tgb" for use in the calculation of the equation (8-1) to the in-CAT exhaust system thermal model 27. This arrangement allows the exhaust gas temperature Tgd to be estimated in the vicinity of the location of the $O_2$ sensor 8.

Figure 14:
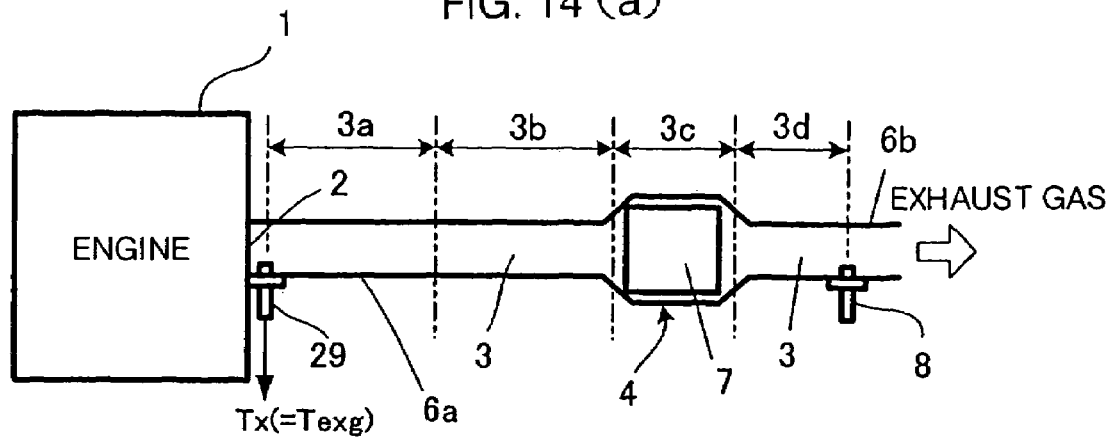
FIG. 14(a) is a block diagram of an apparatus for controlling the temperature of an exhaust gas sensor according to a third embodiment of the present invention.
FIG. 14(b) is a block diagram of an apparatus for controlling the temperature of an exhaust gas sensor according to a fourth embodiment of the present invention.
FIG. 14(c) is a block diagram of an apparatus for controlling the temperature of an exhaust gas sensor according to a fifth embodiment of the present invention.
Figure 14:
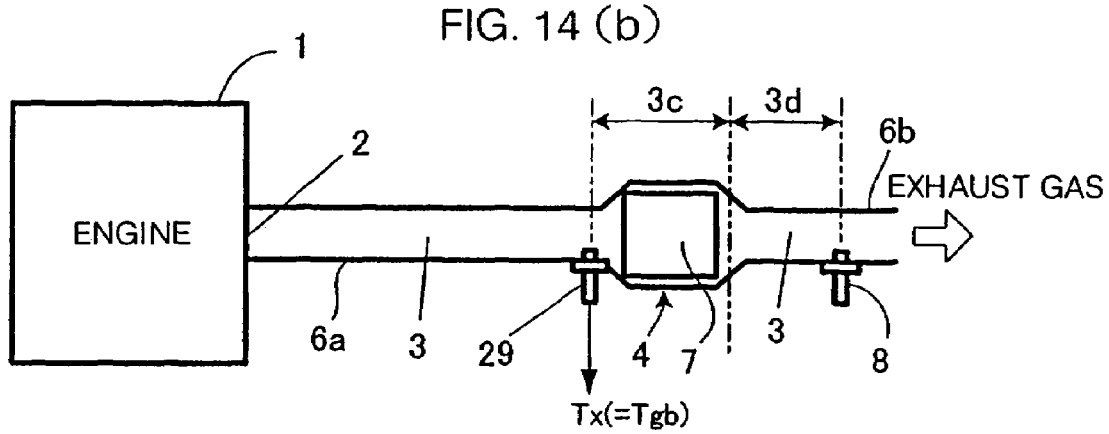
Figure 14:
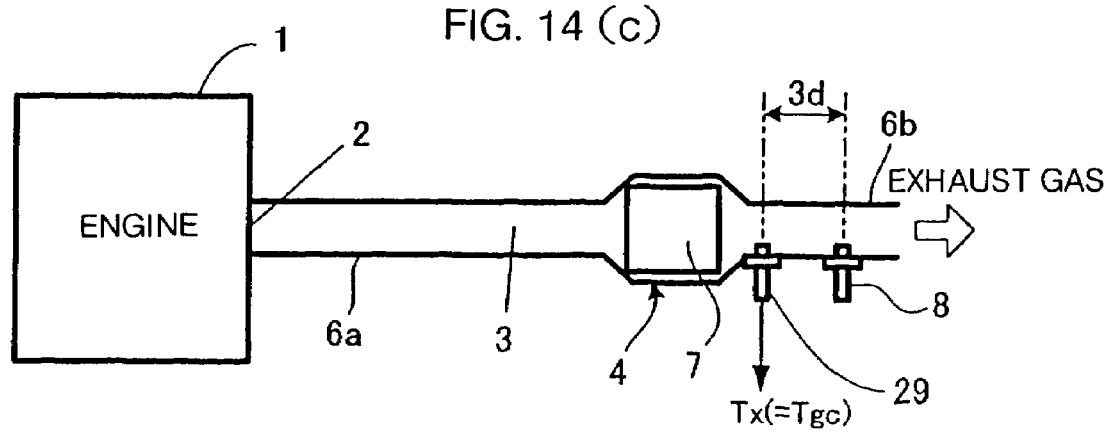

If the exhaust gas temperature sensor 29 is located for detecting the exhaust gas temperature Tx in the vicinity of the outlet of the catalytic converter 4 according to a fifth embodiment, as shown in FIG. 14(*c*), then the exhaust port thermal model 24, the pre-CAT exhaust system thermal models 25, 26, and the in-CAT exhaust system thermal model 27 are dispensed with, and the detected value Tx (latest value) of the exhaust gas temperature from the exhaust gas temperature sensor 29 is supplied as the value of "Tgb" for use in the calculation of the equation (9-1) to the in-CAT exhaust system thermal model 27. This arrangement allows the exhaust gas temperature Tgd to be estimated in the vicinity of the location of the $O_2$ sensor 8.

In any of the third through fifth embodiments, the other details of the processing sequence of the sensor temperature control means 18 than the process of estimating the exhaust gas temperature Tgd may be identical to those of the first embodiment.

Although not described in detail, even if the exhaust gas temperature sensor is positioned downstream of the $O_2$ sensor 8, the exhaust gas temperature in the vicinity of the location of the $O_2$ sensor 8 may be estimated using the detected value of the exhaust gas temperature from the exhaust gas temperature sensor. Specifically, as can be seen from the equation (4-1), if an exhaust gas temperature Tg(z) in a position z in the exhaust passage, i.e., a position in the direction in which the exhaust gas flows, is detected and recognized, then it is possible to estimate an exhaust gas temperature Tg(z·Δz) in a position z−Δz upstream of the position z. Consequently, the exhaust gas temperature in the vicinity of the location of the $O_2$ sensor 8 can be estimated using the detected value of the exhaust gas temperature from the exhaust gas temperature sensor which is disposed downstream of the $O_2$ sensor 8.

Figure 15:
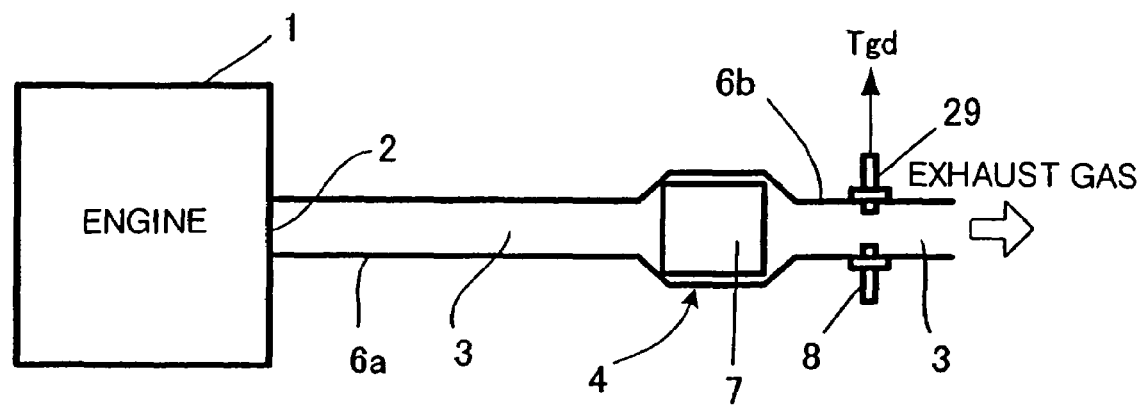
FIG. 15 is a block diagram of an apparatus for controlling the temperature of an exhaust gas sensor according to a sixth embodiment of the present invention.
Figure 16:
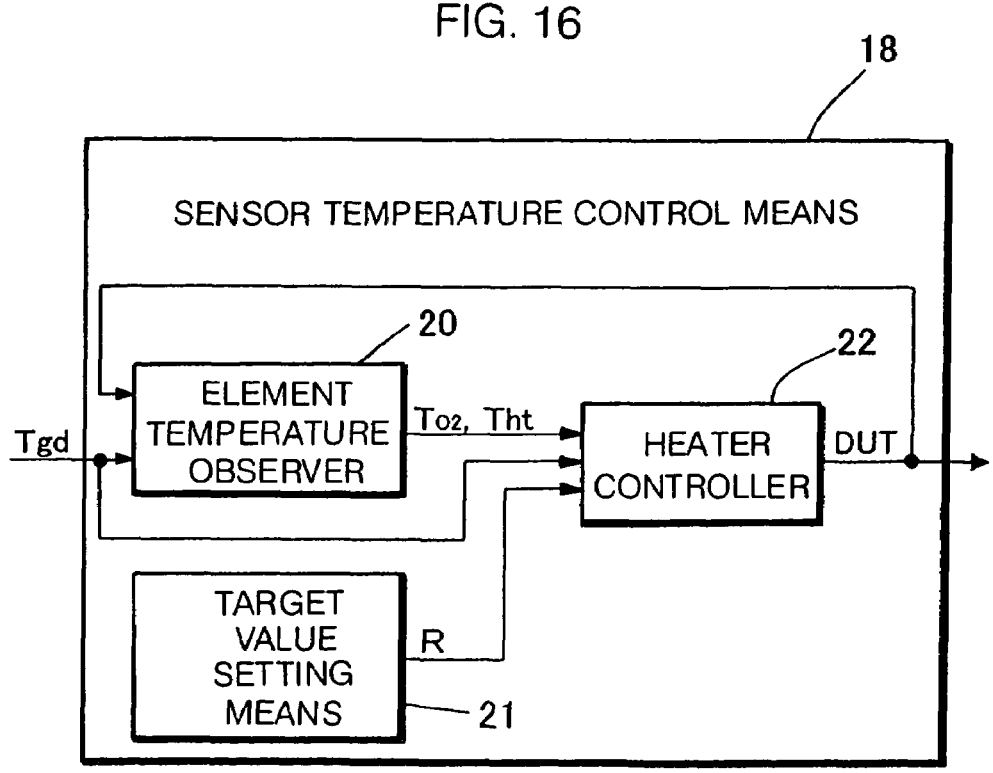
FIG. 16 is a block diagram showing a functional arrangement of a sensor temperature control means in the apparatus according to the sixth embodiment of the present invention.

As shown in FIG. 15, if the exhaust gas temperature sensor 29 is located for directly detecting the exhaust gas temperature Tx in the vicinity of the location of the $O_2$ sensor 8 according to a sixth embodiment, then the sensor temperature control means 18 does not need to have the exhaust temperature observer. In this embodiment, the element temperature observer 20 and the heater controller 22 are supplied with the detected value of the exhaust gas temperature from the exhaust gas temperature sensor 29. For determining an estimated value of the element temperature $T_{O2}$ according to the equation (10-1), the element temperature observer 20 uses the detected value (latest value) of the exhaust gas temperature Tgd from the exhaust gas temperature sensor 29 as the value of "Tgd" on the right side of the equation (10-1). For determining the duty cycle DUT according to the equation (24), the heater controller 22 uses the detected value (latest value) of the exhaust gas temperature Tgd from the exhaust gas temperature sensor 29 as the value of "Tgd" on the right side of the equation (24). The other details of the processing sequence of the sensor temperature control means 18 than the above process may be identical to those of the first embodiment.

Figure 17:
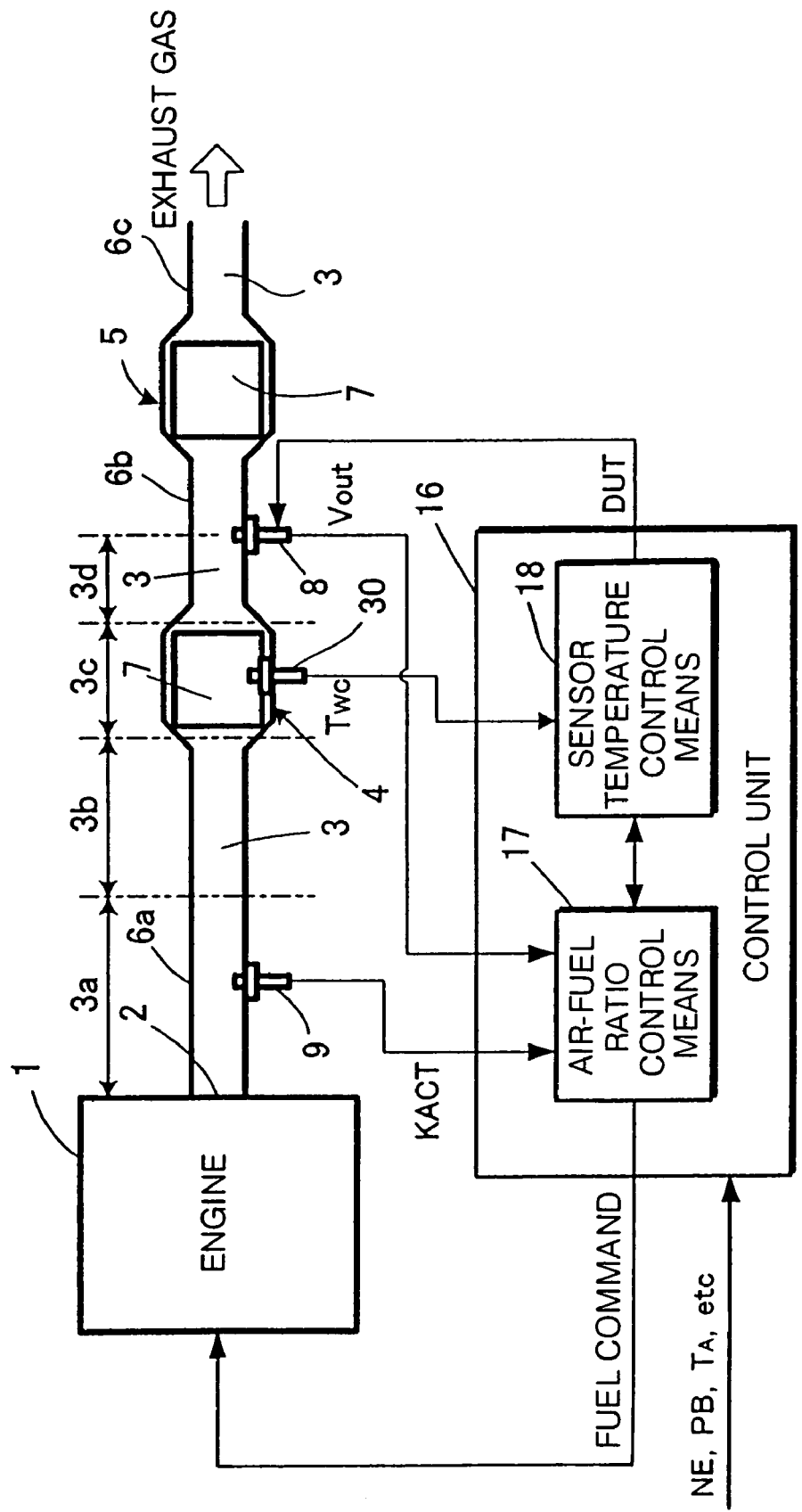
FIG. 17 is a block diagram of an apparatus for controlling the temperature of an exhaust gas sensor according to a seventh embodiment of the present invention.
Figure 18:
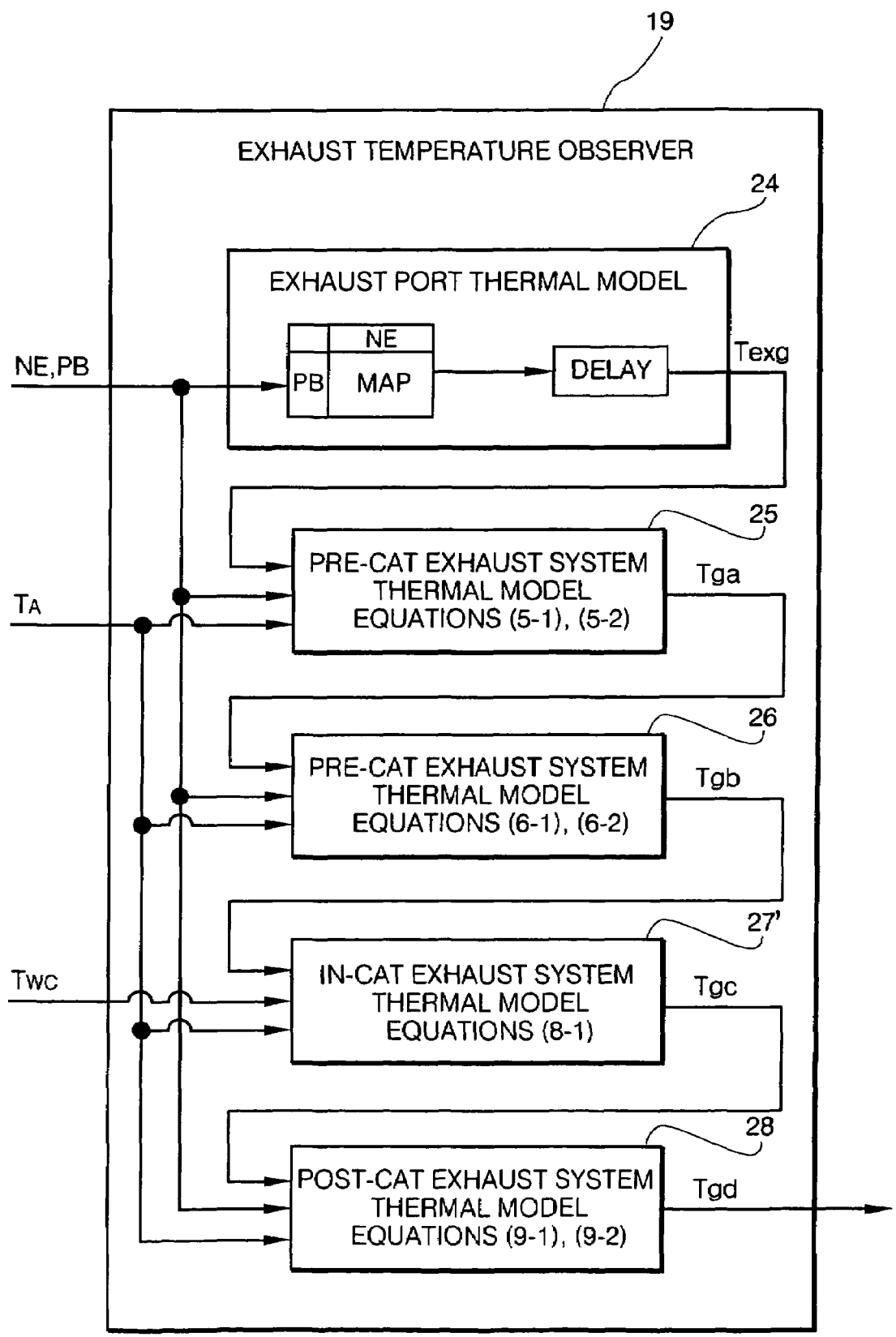
FIG. 18 is a block diagram showing a functional arrangement of an exhaust temperature observer in the apparatus according to the seventh embodiment of the present invention.

A seventh embodiment of the present invention will be described below with reference to FIGS. 17 and 18. According to the seventh embodiment, a catalyst temperature sensor 30 for detecting the temperature of the catalyst 7 (which defines the partial exhaust passageway 3*c*) in the catalytic converter 4, i.e., the catalyst temperature Twc, is mounted on the catalytic converter 4. The detected value of the catalyst temperature Twc from the catalyst temperature sensor 30 is supplied to the sensor temperature control means 18 (specifically, the exhaust temperature observer 19) of the control unit 16 for estimating the exhaust gas temperature Tgd in the vicinity of the location of the $O_2$ sensor 8.

In the present embodiment, the exhaust temperature observer 19 has its algorithm basically identical to the exhaust temperature observer 19 according to the first embodiment. Specifically, the algorithm of the exhaust temperature observer 19 has an exhaust port thermal model 24 corresponding to the exhaust port 2 of the engine 1, pre-CAT exhaust system thermal models 25, 26 corresponding respectively to the partial exhaust passageways 3*a*, 3*b*, an in-CAT exhaust system thermal model 27' corresponding to the partial exhaust passageway 3*c*, and a post-CAT exhaust system thermal model 28 corresponding to the partial exhaust passageway 3*d*. The thermal models 24, 25, 26, 27' exhaust cept the in-CAT exhaust system thermal model 27' are exactly identical to those of the first embodiment.

In the present embodiment, the in-CAT exhaust system thermal model 27' is constructed only of the equation (8-1). The detected value (latest value) of the catalyst temperature Twc from the catalyst temperature sensor 30 is given as the value of "Twc" required in the calculation of the equation (8-1). Specifically, the in-CAT exhaust system thermal model 27' sequentially determines the exhaust gas temperature Tgc by calculating the equation (8-1) using the detected value (latest value) of the catalyst temperature Twc. Since the in-CAT exhaust system thermal model 27' does not calculate the equation (8-2) to estimate the catalyst temperature Twc, the in-CAT exhaust system thermal model 27' is not supplied with the detected value of the atmospheric temperature $T_A$.

As described above, the in-CAT exhaust system thermal model 27' of the exhaust temperature observer 19 employs the detected value of the catalyst temperature Twc from the catalyst temperature sensor 30 in order to determine the estimated value of the exhaust gas temperature Tgc. The seventh embodiment differs from the first embodiment only in that regard.

According to the seventh embodiment, the exhaust gas temperature Tgd in the vicinity of the location of the $O_2$ sensor 8 can be estimated properly and accurately. The seventh embodiment thus offers the same advantages as the first embodiment.

In the second embodiment, the catalyst temperature Twc is detected. However, the temperature of the exhaust pipes 6*a*, 6*b* which define the partial exhaust passageways 3*a*, 3*b*, 3*d* may be detected, and the processing sequence of the exhaust temperature observer 19 may be carried out using the detected temperature. For example, if the temperature of the exhaust pipe 6*a* of the partial exhaust passageway 3*a* is detected by a temperature sensor, then the detected value (latest value) from the temperature sensor may be used as the value of "Twa" in the equation (5-1), and the exhaust gas temperature Tga may be estimated according to the equation (5-1) only.

In each of the embodiments described above, the temperature of the active element 10 of the $O_2$ sensor 8 is controlled at the target value R according to the optimum predictive control algorithm. However, the control input DUT may be generated according to another control algorithm, e.g., an algorithm for generating the control input DUT based on an ordinary PI or PID control process including a feed-forward component depending on the exhaust gas temperature Tgd.

In each of the embodiments described above, the element temperature $T_{O2}$ of the $O_2$ sensor 8 and the heater temperature Tht are estimated. However, both the element temperature $T_{O2}$ and the heater temperature Tht may be detected directly by temperature sensors. Alternatively, one of the element temperature $T_{O2}$ and the heater temperature Tht may be detected directly by a temperature sensor, and the other estimated using the detected temperature.

In each of the embodiments described above, the element temperature $T_{O2}$ of the $O_2$ sensor 8 is controlled. However, the present invention is also applicable to an exhaust gas sensor other than the $O_2$ sensor 8, e.g., the wide-range air-fuel ratio sensor 9 or a humidity sensor for generating an output signal representative of the water content of the exhaust gas. In this case, an algorithm for estimating the exhaust gas temperature in the vicinity of the location of the exhaust gas sensor may suitably be constructed depending on the location of the exhaust gas sensor. For example, if the exhaust gas sensor is disposed on an intermediate portion of the exhaust pipe 6a shown in FIG. 1, then the exhaust gas temperature in the vicinity of the location of the exhaust gas sensor may be estimated according to the thermal model based on the equation (1) and the equations (5-1), (5-2).

The internal combustion engine to which the present invention is applicable may be an ordinary port-injected internal combustion engine, a spark-ignition internal combustion engine with direct fuel injection into cylinders, a diesel engine, an internal combustion engine for use as an outboard engine on a boat, etc.

Although certain preferred embodiments of the present invention have been shown and described in detail, it should be understood that various changes and modifications may be made therein without departing from the scope of the appended claims.

What is claimed is:

1. An apparatus for controlling the temperature of an exhaust gas sensor disposed in an exhaust passage of an internal combustion engine and having an active element for contacting an exhaust gas flowing through the exhaust passage and a heater for heating the active element, said apparatus comprising:
   an exhaust gas temperature sensor disposed in said exhaust passage for detecting the temperature of the exhaust gas flowing through the exhaust passage; and
   heater control means for controlling said heater to equalize the temperature of the active element of said exhaust gas sensor with a predetermined target temperature, using a detected value of the temperature of the exhaust gas from said exhaust gas temperature sensor.

2. An apparatus according to claim 1, wherein said exhaust gas temperature sensor is disposed in the vicinity of the active element of said exhaust gas sensor.

3. An apparatus according to claim 1, wherein said heater control means comprises means for sequentially acquiring data representative of the temperature of the active element of said exhaust gas sensor, sequentially calculating a control input for said heater by adding at least a control input component depending on the temperature of the active element of said exhaust gas sensor and a control input component depending on the detected value of the temperature of the exhaust gas from said exhaust gas temperature sensor, and controlling said heater depending on the calculated control input.

4. An apparatus according to claim 1, wherein said exhaust gas temperature sensor is disposed in the exhaust passage in spaced relation to said exhaust gas sensor in the direction in which said exhaust gas flows, further comprising exhaust gas temperature estimating means for sequentially estimating the temperature of the exhaust gas in the vicinity of the location of said exhaust gas sensor using the detected value of the temperature of the exhaust gas from said exhaust gas temperature sensor, wherein said heater control means comprises means for controlling said heater using an estimated value of the temperature of the exhaust gas in the vicinity of the location of said exhaust gas sensor, rather than the detected value of the temperature of the exhaust gas.

5. An apparatus according to claim 4, wherein said heater control means comprises means for sequentially acquiring data representative of the temperature of the active element of said exhaust gas sensor, sequentially calculating a control input for said heater by adding at least a control input component depending on the temperature of the active element of said exhaust gas sensor and a control input component depending on the estimated value of the temperature of the exhaust gas from said exhaust gas temperature estimating means, and controlling said heater depending on the calculated control input.

6. An apparatus according to claim 4, wherein said exhaust gas temperature estimating means comprises means for estimating the temperature of the exhaust gas in the vicinity of the location of said exhaust gas sensor using at least the detected value of the temperature of the exhaust gas from said exhaust gas temperature sensor and data representative of the speed of the exhaust gas.

7. An apparatus according to claim 4, wherein said exhaust passage from a position in the vicinity of the location of said exhaust gas temperature sensor to a position in the vicinity of the location of said exhaust gas sensor is divided into a plurality of partial exhaust passageways along the direction in which said exhaust gas flows, and said exhaust gas temperature estimating means comprises means for estimating the temperature of the exhaust gas in one of said partial exhaust passageways which is closest to said exhaust gas temperature sensor using the detected value of the temperature of the exhaust gas from said exhaust gas temperature sensor and data representative of the speed of the exhaust gas, estimating the temperatures of the exhaust gas in the partial exhaust passageways other than the partial exhaust passageway which is closest to said exhaust gas temperature sensor using the estimated value of the temperature of the exhaust gas in the partial exhaust passageway which is adjacent to the partial exhaust passageways on the side of said exhaust gas temperature sensor and data representative of the speed of the exhaust gas, and acquiring the temperature of the exhaust gas in the partial exhaust passageway which is closest to said exhaust gas sensor as the estimated value of the temperature of the exhaust gas in the vicinity of the location of said exhaust gas sensor.

8. An apparatus according to claim 4, wherein said exhaust gas temperature estimating means comprises means for estimating the temperature of the exhaust gas in the vicinity of the location of said exhaust gas sensor according to an estimating algorithm which is constructed taking into account at least a heat transfer between a passage-defining member which defines the exhaust passage in the vicinity of the location of said exhaust gas sensor and the exhaust gas flowing through said passage-defining member.

9. An apparatus according to claim 4, wherein said exhaust gas temperature estimating means comprises means for estimating the temperature of the exhaust gas in the vicinity of the location of said exhaust gas sensor according to an estimating algorithm which is constructed taking into account at least a heat transfer between a passage-defining member which defines the exhaust passage from a position in the vicinity of the location of said exhaust gas sensor to a position in the vicinity of said exhaust gas temperature sensor and the exhaust gas flowing through said passage-defining member.

10. An apparatus according to claim 7, wherein said exhaust gas temperature estimating means comprises means for estimating the temperatures of the exhaust gas in said partial exhaust passageways according to an estimating algorithm which is constructed taking into account at least a heat transfer between passage-defining members which define the partial exhaust passageways and the exhaust gas flowing through said passage-defining members.

11. An apparatus according to claim 4, wherein said exhaust gas temperature estimating means comprises means for estimating the temperature of the exhaust gas in the vicinity of the location of said exhaust gas sensor according to an estimating algorithm which is constructed taking into account at least a heat radiation from a passage-defining member which defines the exhaust passage in the vicinity of the location of said exhaust gas sensor, into the atmosphere outside of said passage-defining member.

12. An apparatus according to claim 4, wherein said exhaust gas temperature estimating means comprises means for estimating the temperature of the exhaust gas in the vicinity of the location of said exhaust gas sensor according to an estimating algorithm which is constructed taking into account at least a heat transfer between a passage-defining member which defines the exhaust passage in the vicinity of the location of said exhaust gas sensor and the exhaust gas flowing through said passage-defining member and a heat radiation from said passage-defining member into the atmosphere outside of said passage-defining member.

13. An apparatus according to claim 4, wherein said exhaust gas temperature estimating means comprises means for estimating the temperature of the exhaust gas in the vicinity of the location of said exhaust gas sensor according to an estimating algorithm which is constructed taking into account at least a heat radiation from a passage-defining member which defines the exhaust passage from a position in the vicinity of the location of said exhaust gas sensor to a position in the vicinity of said exhaust gas temperature sensor, into the atmosphere outside of said passage-defining member.

14. An apparatus according to claim 4, wherein said exhaust gas temperature estimating means comprises means for estimating the temperature of the exhaust gas in the vicinity of the location of said exhaust gas sensor according to an estimating algorithm which is constructed taking into account at least a heat transfer between a passage-defining member which defines the exhaust passage from a position in the vicinity of the location of said exhaust gas sensor to a position in the vicinity of said exhaust gas temperature sensor and the exhaust gas flowing through said passage-defining member, and a heat radiation from said passage-defining member into the atmosphere outside of said passage-defining member.

15. An apparatus according to claim 7, wherein said exhaust gas temperature estimating means comprises means for estimating the temperatures of the exhaust gas in the partial exhaust passageways according to an estimating algorithm which is constructed taking into account at least a heat radiation from passage-defining members which define the partial exhaust passageways into the atmosphere outside of said passage-defining members.

16. An apparatus according to claim 4, wherein the exhaust passage from a position in the vicinity of the location of said exhaust gas sensor to a position in the vicinity of said exhaust gas temperature sensor includes a catalyst for purifying the exhaust gas, as a passage-defining member which defines a portion of said exhaust passage, and said exhaust gas temperature estimating means comprises means for estimating the temperature of the exhaust gas in the vicinity of the location of said exhaust gas sensor according to an estimating algorithm which is constructed taking into account at least heating of said catalyst.

17. An apparatus according to claim 4, wherein the exhaust passage from a position in the vicinity of the location of said exhaust gas sensor to a position in the vicinity of said exhaust gas temperature sensor includes a catalyst for purifying the exhaust gas, as a passage-defining member which defines a portion of said exhaust passage, and said exhaust gas temperature estimating means comprises means for estimating the temperature of the exhaust gas in the vicinity of the location of said exhaust gas sensor according to an estimating algorithm which is constructed taking into account a heat transfer between a passage-defining member which defines the exhaust passage from the position in the vicinity of the location of said exhaust gas sensor to the position in the vicinity of said exhaust gas temperature sensor and the exhaust gas flowing through said passage-defining member, a heat radiation from said passage-defining member into the atmosphere outside of said passage-defining member, and heating of said catalyst.

18. An apparatus according to claim 7, wherein at least one of said partial exhaust passageways includes a catalyst for purifying the exhaust gas, as a passage-defining member which defines a portion of said exhaust passage, and said exhaust gas temperature estimating means comprises means for estimating the temperature of the exhaust gas in the partial exhaust passageway which includes said catalyst according to an estimating algorithm which is constructed taking into account at least heating of said catalyst.

19. An apparatus according to claim 7, wherein at least one of said partial exhaust passageways includes a catalyst for purifying the exhaust gas, as a passage-defining member which defines a portion of said exhaust passage, and said exhaust gas temperature estimating means comprises means for estimating the temperature of the exhaust gas in the partial exhaust passageway which includes said catalyst according to an estimating algorithm which is constructed taking into account at least a heat transfer between a passage-defining member which defines said partial exhaust passageway and the exhaust gas flowing through said passage-defining member, a heat radiation from said passage-defining member into the atmosphere outside of said passage-defining member, and heating of said catalyst, and estimating the temperature of the exhaust gas in one of the partial exhaust passageways which does not include said catalyst according to an estimating algorithm which is constructed taking into account at least a heat transfer between a passage-defining member which defines said one partial exhaust passageway and the exhaust gas flowing through said passage-defining member, and a heat radiation from said passage-defining member into the atmosphere outside of said passage-defining member.

20. An apparatus according to claim 4, wherein said exhaust gas temperature estimating means comprises means for sequentially acquiring at least data representative of the temperature of a passage-defining member which defines the exhaust passage in the vicinity of the location of said exhaust gas sensor, and estimating the temperature of the exhaust gas in the vicinity of the location of said exhaust gas sensor using the data representative of the temperature of the passage-defining member.

21. An apparatus according to claim 7, wherein said exhaust gas temperature estimating means comprises means for sequentially acquiring data representative of the temperatures of passage-defining members which define the partial exhaust passageways, and estimating the temperatures of the exhaust gas in the partial exhaust passageways using the data representative of the temperatures of the passage-defining members.

22. An apparatus according to claim 20, wherein said exhaust gas temperature estimating means comprises means for sequentially determining a change in the temperature of the exhaust gas in the vicinity of the location of said exhaust gas sensor based on a thermal model in which a change per predetermined time in the temperature of the exhaust gas in the vicinity of the location of said exhaust gas sensor is expressed as at least the sum of a temperature change component depending on a temperature gradient in the direction in which the exhaust gas flows in the vicinity of the location of said exhaust gas sensor and the speed of the exhaust gas, and a temperature change component depending on the difference between the temperature of the exhaust gas in the vicinity of the location of said exhaust gas sensor and the temperature of said passage-defining member, and estimating the temperature of the exhaust gas in the vicinity of the location of said exhaust gas sensor by cumulatively adding the determined change in the temperature to an initial value set when said internal combustion engine has started to operate.

23. An apparatus according to claim 21, wherein said exhaust gas temperature estimating means comprises means for sequentially determining changes in the temperature of the exhaust gas in the partial exhaust passageways based on a thermal model in which changes per predetermined time in the temperatures of the exhaust gas in the partial exhaust passageways are expressed as at least the sum of temperature change components depending on temperature gradients in the direction in which the exhaust gas flows in the partial exhaust passageways and the speed of the exhaust gas, and temperature change components depending on the difference between the temperatures of the exhaust gas in the partial exhaust passageways and the temperatures of said passage-defining members which defines the partial exhaust passageways, and estimating the temperatures of the exhaust gas in the partial exhaust passageways by cumulatively adding the determined changes in the temperature to initial values set for the respective partial exhaust passageways when said internal combustion engine has started to operate.

24. An apparatus according to claim 20, wherein said exhaust gas temperature estimating means comprises means for sequentially estimating the temperature of said passage-defining member using at least the estimated value of the temperature of the exhaust gas in the vicinity of the location of said exhaust gas sensor and data representative of an atmospheric temperature outside of said passage-defining member, and using the estimated temperature of said passage-defining member as said data representative of the temperature of the passage-defining member.

25. An apparatus according to claim 21, wherein said exhaust gas temperature estimating means comprises means for sequentially estimating the temperatures of said passage-defining members which define said partial exhaust passageways using at least the estimated values of the temperatures of the exhaust gas in the partial exhaust passageways and data representative of an atmospheric temperature outside of said passage-defining members, and using the estimated temperatures of said passage-defining members as said data representative of the temperatures of the passage-defining members.

26. An apparatus according to claim 24, wherein said exhaust gas temperature estimating means comprises means for sequentially estimating a change in the temperature of said passage-defining member based on a thermal model in which a change per predetermined time in the temperature of said passage-defining member is expressed as including at least a temperature change component depending on the difference between the temperature of the exhaust gas in the vicinity of the location of said exhaust gas sensor and the temperature of said passage-defining member and a temperature change component depending on the difference between the temperature of said passage-defining member and the atmospheric temperature, and estimating the temperature of the passage-defining member by cumulatively adding the estimated value of the change in the temperature of said passage-defining member to an initial value set when said internal combustion engine has started to operate.

27. An apparatus according to claim 25, wherein said exhaust gas temperature estimating means comprises means for sequentially estimating changes in the temperatures of said passage-defining members which define said partial exhaust passageways based on a thermal model in which changes per predetermined time in the temperatures of said passage-defining members are expressed as including at least temperature change components depending on the difference between the temperatures of the exhaust gas in the passage-defining members and the temperatures of said passage-defining members and temperature change components depending on the difference between the temperatures of said passage-defining members and the atmospheric temperature, and estimating the temperatures of the passage-defining members by cumulatively adding the estimated values of the changes in the temperatures of said passage-defining members to initial values set for the respective partial exhaust passageways when said internal combustion engine has started to operate.

28. An apparatus according to claim 27, wherein at least one of said partial exhaust passageways includes a catalyst for purifying the exhaust gas, as a passage-defining member which defines a portion of said exhaust passage, and said thermal model which corresponds to the passage-defining member including said catalyst comprises a model in which a change per predetermined time in the temperature of said passage-defining member which defines said partial exhaust passageway is expressed as the sum of at least a temperature change component depending on the difference between the temperature of the exhaust gas in the partial exhaust passageway and the temperature of said passage-defining member, a temperature change component depending on the difference between the temperature of said passage-defining member and the atmospheric temperature, and a temperature change component depending on the speed of the exhaust gas.

29. An apparatus according to claim 22, wherein said initial value is set depending on at least the atmospheric temperature and/or the engine temperature of said internal combustion engine when the internal combustion engine starts to operate.

30. An apparatus according to claim 23, wherein said initial value is set depending on at least the atmospheric temperature and/or the engine temperature of said internal combustion engine when the internal combustion engine starts to operate.

31. An apparatus according to claim 26, wherein said initial value is set depending on at least the atmospheric temperature and/or the engine temperature of said internal combustion engine when the internal combustion engine starts to operate.

32. An apparatus according to claim 27, wherein said initial value is set depending on at least the atmospheric temperature and/or the engine temperature of said internal combustion engine when the internal combustion engine starts to operate.

33. A method of controlling the temperature of an exhaust gas sensor disposed in an exhaust passage of an internal combustion engine and having an active element for contacting an exhaust gas flowing through the exhaust passage and a heater for heating the active element, said method comprising the steps of:
  detecting the temperature of the exhaust gas flowing through the exhaust passage with an exhaust gas temperature sensor disposed in said exhaust passage; and
  controlling said heater to equalize the temperature of the active element of said exhaust gas sensor with a predetermined target temperature, using a detected value of the temperature of the exhaust gas.

34. A method according to claim 33, wherein said exhaust gas temperature sensor is disposed in the vicinity of the active element of said exhaust gas sensor.

35. A method according to claim 33, wherein said step of controlling said heater comprises the steps of sequentially acquiring data representative of the temperature of the active element of said exhaust gas sensor, sequentially calculating a control input for said heater by adding at least a control input component depending on the temperature of the active element of said exhaust gas sensor and a control input component depending on the detected value of the temperature of the exhaust gas from said exhaust gas temperature sensor, and controlling said heater depending on the calculated control input.

36. A method according to claim 33, wherein said exhaust gas temperature sensor is disposed in the exhaust passage in spaced relation to said exhaust gas sensor in the direction in which said exhaust gas flows, further comprising the step of sequentially estimating the temperature of the exhaust gas in the vicinity of the location of said exhaust gas sensor using the detected value of the temperature of the exhaust gas, wherein said step of controlling said heater comprises the step of controlling said heater using an estimated value of the temperature of the exhaust gas in the vicinity of the location of said exhaust gas sensor, rather than the detected value of the temperature of the exhaust gas.

37. A method according to claim 36, wherein said step of controlling said heater comprises the steps of sequentially acquiring data representative of the temperature of the active element of said exhaust gas sensor, sequentially calculating a control input for said heater by adding at least a control input component depending on the temperature of the active element of said exhaust gas sensor and a control input component depending on the estimated value of the temperature of the exhaust gas from said exhaust gas temperature estimating means, and controlling said heater depending on the calculated control input.

38. A method according to claim 36, wherein said step of sequentially estimating the temperature of the exhaust gas comprises the step of estimating the temperature of the exhaust gas in the vicinity of the location of said exhaust gas sensor using at least the detected value of the temperature of the exhaust gas from said exhaust gas temperature sensor and data representative of the speed of the exhaust gas.

39. A method according to claim 36, wherein said exhaust passage from a position in the vicinity of the location of said exhaust gas temperature sensor to a position in the vicinity of the location of said exhaust gas sensor is divided into a plurality of partial exhaust passageways along the direction in which said exhaust gas flows, and said step of sequentially estimating the temperature of the exhaust gas comprises the steps of estimating the temperature of the exhaust gas in one of said partial exhaust passageways which is closest to said exhaust gas temperature sensor using the detected value of the temperature of the exhaust gas from said exhaust gas temperature sensor and data representative of the speed of the exhaust gas, estimating the temperatures of the exhaust gas in the partial exhaust passageways other than the partial exhaust passageway which is closest to said exhaust gas temperature sensor using the estimated value of the temperature of the exhaust gas in the partial exhaust passageway which is adjacent to the partial exhaust passageways on the side of said exhaust gas temperature sensor and data representative of the speed of the exhaust gas, and acquiring the temperature of the exhaust gas in the partial exhaust passageway which is closest to said exhaust gas sensor as the estimated value of the temperature of the exhaust gas in the vicinity of the location of said exhaust gas sensor.

40. A method according to claim 36, wherein said step of sequentially estimating the temperature of the exhaust gas comprises the step of estimating the temperature of the exhaust gas in the vicinity of the location of said exhaust gas sensor according to an estimating algorithm which is constructed taking into account at least a heat transfer between a passage-defining member which defines the exhaust passage in the vicinity of the location of said exhaust gas sensor and the exhaust gas flowing through said passage-defining member.

41. A method according to claim 36, wherein said step of sequentially estimating the temperature of the exhaust gas comprises the step of estimating the temperature of the exhaust gas in the vicinity of the location of said exhaust gas sensor according to an estimating algorithm which is constructed taking into account at least a heat transfer between a passage-defining member which defines the exhaust passage from a position in the vicinity of the location of said exhaust gas sensor to a position in the vicinity of said exhaust gas temperature sensor and the exhaust gas flowing through said passage-defining member.

42. A method according to claim 39, wherein said step of sequentially estimating the temperature of the exhaust gas comprises the step of estimating the temperatures of the exhaust gas in said partial exhaust passageways according to an estimating algorithm which is constructed taking into account at least a heat transfer between passage-defining members which define the partial exhaust passageways and the exhaust gas flowing through said passage-defining members.

43. A method according to claim 36, wherein said step of sequentially estimating the temperature of the exhaust gas comprises the step of estimating the temperature of the exhaust gas in the vicinity of the location of said exhaust gas sensor according to an estimating algorithm which is constructed taking into account at least a heat radiation from a passage-defining member which defines the exhaust passage in the vicinity of the location of said exhaust gas sensor, into the atmosphere outside of said passage-defining member.

44. A method according to claim 36, wherein said step of sequentially estimating the temperature of the exhaust gas comprises the step of estimating the temperature of the exhaust gas in the vicinity of the location of said exhaust gas sensor according to an estimating algorithm which is constructed taking into account at least a heat transfer between a passage-defining member which defines the exhaust passage in the vicinity of the location of said exhaust gas sensor and the exhaust gas flowing through said passage-defining member and a heat radiation from said passage-defining member into the atmosphere outside of said passage-defining member.

45. A method according to claim 36, wherein said step of sequentially estimating the temperature of the exhaust gas comprises the step of estimating the temperature of the exhaust gas in the vicinity of the location of said exhaust gas sensor according to an estimating algorithm which is constructed taking into account at least a heat radiation from a passage-defining member which defines the exhaust passage from a position in the vicinity of the location of said exhaust gas sensor to a position in the vicinity of said exhaust gas temperature sensor, into the atmosphere outside of said passage-defining member.

46. A method according to claim 36, wherein said step of sequentially estimating the temperature of the exhaust gas comprises the step of estimating the temperature of the exhaust gas in the vicinity of the location of said exhaust gas sensor according to an estimating algorithm which is constructed taking into account at least a heat transfer between a passage-defining member which defines the exhaust passage from a position in the vicinity of the location of said exhaust gas sensor to a position in the vicinity of said exhaust gas temperature sensor and the exhaust gas flowing through said passage-defining member, and a heat radiation from said passage-defining member into the atmosphere outside of said passage-defining member.

47. A method according to claim 39, wherein said step of sequentially estimating the temperature of the exhaust gas comprises the step of estimating the temperatures of the exhaust gas in the partial exhaust passageways according to an estimating algorithm which is constructed taking into account at least a heat radiation from passage-defining members which define the partial exhaust passageways into the atmosphere outside of said passage-defining members.

48. A method according to claim 36, wherein the exhaust passage from a position in the vicinity of the location of said exhaust gas sensor to a position in the vicinity of said exhaust gas temperature sensor includes a catalyst for purifying the exhaust gas, as a passage-defining member which defines a portion of said exhaust passage, and said step of sequentially estimating the temperature of the exhaust gas comprises the step of estimating the temperature of the exhaust gas in the vicinity of the location of said exhaust gas sensor according to an estimating algorithm which is constructed taking into account at least heating of said catalyst.

49. A method according to claim 36, wherein the exhaust passage from a position in the vicinity of the location of said exhaust gas sensor to a position in the vicinity of said exhaust gas temperature sensor includes a catalyst for purifying the exhaust gas, as a passage-defining member which defines a portion of said exhaust passage, and said step of sequentially estimating the temperature of the exhaust gas comprises the step of estimating the temperature of the exhaust gas in the vicinity of the location of said exhaust gas sensor according to an estimating algorithm which is constructed taking into account a heat transfer between a passage-defining member which defines the exhaust passage from the position in the vicinity of the location of said exhaust gas sensor to the position in the vicinity of said exhaust gas temperature sensor and the exhaust gas flowing through said passage-defining member, a heat radiation from said passage-defining member into the atmosphere outside of said passage-defining member, and heating of said catalyst.

50. A method according to claim 39, wherein at least one of said partial exhaust passageways includes a catalyst for purifying the exhaust gas, as a passage-defining member which defines a portion of said exhaust passage, and said step of sequentially estimating the temperature of the exhaust gas comprises the step of estimating the temperature of the exhaust gas in the partial exhaust passageway which includes said catalyst according to an estimating algorithm which is constructed taking into account at least heating of said catalyst.

51. A method according to claim 39, wherein at least one of said partial exhaust passageways includes a catalyst for purifying the exhaust gas, as a passage-defining member which defines a portion of said exhaust passage, and said step of sequentially estimating the temperature of the exhaust gas comprises the steps of estimating the temperature of the exhaust gas in the partial exhaust passageway which includes said catalyst according to an estimating algorithm which is constructed taking into account at least a heat transfer between a passage-defining member which defines said partial exhaust passageway and the exhaust gas flowing through said passage-defining member, a heat radiation from said passage-defining member into the atmosphere outside of said passage-defining member, and heating of said catalyst, and estimating the temperature of the exhaust gas in one of the partial exhaust passageways which does not include said catalyst according to an estimating algorithm which is constructed taking into account at least a heat transfer between a passage-defining member which defines said one partial exhaust passageway and the exhaust gas flowing through said passage-defining member, and a heat radiation from said passage-defining member into the atmosphere outside of said passage-defining member.

52. A method according to claim 36, wherein said step of sequentially estimating the temperature of the exhaust gas comprises the steps of sequentially acquiring at least data representative of the temperature of a passage-defining member which defines the exhaust passage in the vicinity of the location of said exhaust gas sensor, and estimating the temperature of the exhaust gas in the vicinity of the location of said exhaust gas sensor using the data representative of the temperature of the passage-defining member.

53. A method according to claim 39, wherein said step of sequentially estimating the temperature of the exhaust gas comprises the steps of sequentially acquiring data representative of the temperatures of passage-defining members which define the partial exhaust passageways, and estimating the temperatures of the exhaust gas in the partial exhaust passageways using the data representative of the temperatures of the passage-defining members.

54. A method according to claim 52, wherein said step of sequentially estimating the temperature of the exhaust gas comprises the steps of sequentially determining a change in the temperature of the exhaust gas in the vicinity of the location of said exhaust gas sensor based on a thermal model in which a change per predetermined time in the temperature of the exhaust gas in the vicinity of the location of said exhaust gas sensor is expressed as at least the sum of a temperature change component depending on a temperature gradient in the direction in which the exhaust gas flows in the vicinity of the location of said exhaust gas sensor and the speed of the exhaust gas, and a temperature change component depending on the difference between the temperature of the exhaust gas in the vicinity of the location of said exhaust gas sensor and the temperature of said passage-defining member, and estimating the temperature of the exhaust gas in the vicinity of the location of said exhaust gas sensor by cumulatively adding the determined change in the temperature to an initial value set when said internal combustion engine has started to operate.

55. A method according to claim 53, wherein said step of sequentially estimating the temperature of the exhaust gas comprises the steps of sequentially determining changes in the temperature of the exhaust gas in the partial exhaust passageways based on a thermal model in which changes per predetermined time in the temperatures of the exhaust gas in the partial exhaust passageways are expressed as at least the sum of temperature change components depending on temperature gradients in the direction in which the exhaust gas flows in the partial exhaust passageways and the speed of the exhaust gas, and temperature change components depending on the difference between the temperatures of the exhaust gas in the partial exhaust passageways and the temperatures of said passage-defining members which defines the partial exhaust passageways, and estimating the temperatures of the exhaust gas in the partial exhaust passageways by cumulatively adding the determined changes in the temperature to initial values set for the respective partial exhaust passageways when said internal combustion engine has started to operate.

56. A method according to claim 52, wherein said step of sequentially estimating the temperature of the exhaust gas comprises the steps of sequentially estimating the temperature of said passage-defining member using at least the estimated value of the temperature of the exhaust gas in the vicinity of the location of said exhaust gas sensor and data representative of an atmospheric temperature outside of said passage-defining member, and using the estimated temperature of said passage-defining member as said data representative of the temperature of the passage-defining member.

57. A method according to claim 53, wherein said step of sequentially estimating the temperature of the exhaust gas comprises the steps of sequentially estimating the temperatures of said passage-defining members which define said partial exhaust passageways using at least the estimated values of the temperatures of the exhaust gas in the partial exhaust passageways and data representative of an atmospheric temperature outside of said passage-defining members, and using the estimated temperatures of said passage-defining members as said data representative of the temperatures of the passage-defining members.

58. A method according to claim 56, wherein said step of sequentially estimating the temperature of the exhaust gas comprises the steps of sequentially estimating a change in the temperature of said passage-defining member based on a thermal model in which a change per predetermined time in the temperature of said passage-defining member is expressed as including at least a temperature change component depending on the difference between the temperature of the exhaust gas in the vicinity of the location of said exhaust gas sensor and the temperature of said passage-defining member and a temperature change component depending on the difference between the temperature of said passage-defining member and the atmospheric temperature, and estimating the temperature of the passage-defining member by cumulatively adding the estimated value of the change in the temperature of said passage-defining member to an initial value set when said internal combustion engine has started to operate.

59. A method according to claim 57, wherein said step of sequentially estimating the temperature of the exhaust gas comprises the steps of sequentially estimating changes in the temperatures of said passage-defining members which define said partial exhaust passageways based on a thermal model in which changes per predetermined time in the temperatures of said passage-defining members are expressed as including at least temperature change components depending on the difference between the temperatures of the exhaust gas in the passage-defining members and the temperatures of said passage-defining members and temperature change components depending on the difference between the temperatures of said passage-defining members and the atmospheric temperature, and estimating the temperatures of the passage-defining members by cumulatively adding the estimated values of the changes in the temperatures of said passage-defining members to initial values set for the respective partial exhaust passageways when said internal combustion engine has started to operate.

60. A method according to claim 59, wherein at least one of said partial exhaust passageways includes a catalyst for purifying the exhaust gas, as a passage-defining member which defines a portion of said exhaust passage, and said thermal model which corresponds to the passage-defining member including said catalyst comprises a model in which a change per predetermined time in the temperature of said passage-defining member which defines said partial exhaust passageway is expressed as the sum of at least a temperature change component depending on the difference between the temperature of the exhaust gas in the partial exhaust passageway and the temperature of said passage-defining member, a temperature change component depending on the difference between the temperature of said passage-defining member and the atmospheric temperature, and a temperature change component depending on the speed of the exhaust gas.

61. A method according to claim 54, wherein said initial value is set depending on at least the atmospheric temperature and/or the engine temperature of said internal combustion engine when the internal combustion engine starts to operate.

62. A method according to claim 55, wherein said initial value is set depending on at least the atmospheric temperature and/or the engine temperature of said internal combustion engine when the internal combustion engine starts to operate.

63. A method according to claim 58, wherein said initial value is set depending on at least the atmospheric temperature and/or the engine temperature of said internal combustion engine when the internal combustion engine starts to operate.

64. A method according to claim 59, wherein said initial value is set depending on at least the atmospheric temperature and/or the engine temperature of said internal combustion engine when the internal combustion engine starts to operate.

* * * * *